(12) United States Patent
Jackson

(10) Patent No.: US 10,486,083 B2
(45) Date of Patent: *Nov. 26, 2019

(54) SEPARATOR FOR FRACTIONAL SEPARATION OF SUPERCRITICAL CARBON DIOXIDE EXTRACTS

(71) Applicant: Kiinja Corporation, Fort Collins, CO (US)

(72) Inventor: Gregory A. Jackson, Fort Collins, CO (US)

(73) Assignee: Kiinja Corporation, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/800,564

(22) Filed: Nov. 1, 2017

(65) Prior Publication Data

US 2018/0071654 A1    Mar. 15, 2018

Related U.S. Application Data

(63) Continuation-in-part of application No. 15/460,113, filed on Mar. 13, 2017.

(60) Provisional application No. 62/319,214, filed on Apr. 6, 2016.

(51) Int. Cl.
  *B01D 11/02* (2006.01)

(52) U.S. Cl.
  CPC .......... *B01D 11/0203* (2013.01); *B01D 11/02* (2013.01); *B01D 11/0207* (2013.01); *B01D 11/0288* (2013.01)

(58) Field of Classification Search
  CPC .................. B01D 11/0288; B01D 11/0203
  See application file for complete search history.

(56) References Cited

U.S. PATENT DOCUMENTS

| 4,018,755 A | 4/1977 | Wang |
| 4,059,604 A | 11/1977 | Kresse |
| 4,083,836 A | 4/1978 | Anjou et al. |
| 4,325,882 A | 4/1982 | Reiners |
| 4,341,713 A | 7/1982 | Stolp et al. |
| 4,466,923 A | 8/1984 | Friedrich |

(Continued)

FOREIGN PATENT DOCUMENTS

| CA | 2636953 | 1/2016 |
| CA | 2696982 | 1/2016 |

(Continued)

OTHER PUBLICATIONS

U.S. Appl. No. 62/319,214, filed Apr. 6, 2016.

(Continued)

*Primary Examiner* — Kevin Joyner
(74) *Attorney, Agent, or Firm* — Craig R. Miles; CR Miles P.C.

(57) ABSTRACT

Generally, an extraction system useful in separating an extract from a matrix using one or more extractants. Specifically, an extractor including one or more of: an extraction vessel having an extractor vessel internal surface which defines an extraction chamber which communicates between open extraction vessel first and second ends, a first piston configured to sealably engage the extractor vessel internal surface of the extraction vessel first end or a second piston adapted to sealably engage the extractor vessel internal surface of the extraction vessel second end.

29 Claims, 40 Drawing Sheets

(56) References Cited

U.S. PATENT DOCUMENTS

| | | | |
|---|---|---|---|
| 4,495,207 A | 1/1985 | Christianson et al. | |
| 4,515,726 A | 5/1985 | Sullivan | |
| 4,576,820 A | 3/1986 | Hussmann | |
| 4,675,133 A | 6/1987 | Eggers et al. | |
| 4,744,926 A | 5/1988 | Rice | |
| 4,859,371 A | 8/1989 | Diosady et al. | |
| 4,898,673 A | 2/1990 | Rice et al. | |
| 4,994,272 A | 2/1991 | Hussmann | |
| 4,996,072 A | 2/1991 | Marschner et al. | |
| 5,097,012 A | 3/1992 | Thies et al. | |
| 5,120,558 A | 6/1992 | Nguyen et al. | |
| 5,138,075 A | 8/1992 | Ohgaki et al. | |
| 5,252,729 A | 10/1993 | De Crosta et al. | |
| 5,498,384 A | 3/1996 | Volk et al. | |
| 5,680,812 A | 10/1997 | Linsgeseder | |
| 5,685,218 A | 11/1997 | Kemper | |
| 5,759,549 A | 6/1998 | Hiltunen et al. | |
| 5,826,500 A | 10/1998 | Kemper | |
| 5,879,634 A * | 3/1999 | Ford | B01D 11/0203 210/446 |
| 5,932,101 A | 8/1999 | Kanel et al. | |
| 5,932,261 A | 8/1999 | Unnithan | |
| 5,997,877 A | 12/1999 | Chang | |
| 6,177,114 B1 | 1/2001 | Unnithan | |
| 6,201,142 B1 | 3/2001 | Maza | |
| 6,248,910 B1 | 6/2001 | Franke | |
| 6,326,035 B1 | 12/2001 | Nakatani et al. | |
| 6,495,175 B2 | 12/2002 | Rao et al. | |
| 6,504,085 B1 | 1/2003 | Howard | |
| 6,570,030 B2 | 5/2003 | Goto et al. | |
| 6,610,867 B2 | 8/2003 | Jakel et al. | |
| 6,648,930 B2 | 11/2003 | Ulrich et al. | |
| 6,664,405 B2 | 12/2003 | Lee | |
| 6,800,316 B1 | 10/2004 | Perrut et al. | |
| 6,814,998 B1 | 11/2004 | Ozawa et al. | |
| 6,936,110 B2 | 8/2005 | Van Thorre | |
| 7,037,548 B2 | 5/2006 | Ozawa et al. | |
| 7,074,449 B1 | 7/2006 | Holley et al. | |
| 7,083,954 B2 | 8/2006 | Jakel et al. | |
| 7,087,720 B2 | 8/2006 | Murray et al. | |
| 7,494,675 B2 | 2/2009 | Abbas et al. | |
| 7,524,522 B2 | 4/2009 | DeLine et al. | |
| 7,612,220 B2 | 11/2009 | DeLine et al. | |
| 8,142,830 B2 | 3/2012 | Marentis | |
| 8,227,012 B2 | 7/2012 | DeLine et al. | |
| 8,557,318 B2 | 10/2013 | Marentis | |
| 8,603,328 B2 | 12/2013 | DeLine et al. | |
| 8,747,106 B2 | 6/2014 | DeLine et al. | |
| 8,747,931 B2 | 6/2014 | DeLine et al. | |
| 8,895,078 B2 | 11/2014 | Mueller | |
| 2003/0019736 A1 | 1/2003 | Garman | |
| 2004/0234649 A1 | 11/2004 | Lewis et al. | |
| 2005/0233030 A1 | 10/2005 | Lewis et al. | |
| 2005/0239181 A1 | 10/2005 | Lewis et al. | |
| 2007/0009646 A1 | 1/2007 | Ulrich et al. | |
| 2007/0037267 A1 | 2/2007 | Lewis et al. | |
| 2014/0046080 A1 | 2/2014 | Marentis | |
| 2014/0134069 A1 | 5/2014 | DeLine et al. | |

FOREIGN PATENT DOCUMENTS

| | | |
|---|---|---|
| CN | 1242416 | 1/2000 |
| CN | 1522596 | 8/2004 |
| EP | 1536810 | 8/2003 |
| FR | 2822720 | 10/2002 |
| GB | 366516 | 1/1932 |
| GB | 707385 | 4/1954 |
| GB | 1058076 | 2/1967 |
| GB | 1398459 | 6/1975 |
| JP | 6136384 | 5/1994 |
| JP | 6299187 | 10/1994 |
| MX | 232822 | 12/2005 |
| WO | WO 2008/020865 | 2/2008 |
| WO | WO 2008/024175 | 2/2008 |
| WO | WO 2008/024266 | 2/2008 |
| WO | WO 2008/115594 | 9/2008 |

OTHER PUBLICATIONS

U.S. Appl. No. 61/000,211, filed Oct. 24, 2007.
U.S. Appl. No. 60/958,472, filed Jul. 6, 2007.
U.S. Appl. No. 60/838,642, filed Mar. 21, 2007.
U.S. Appl. No. 60/858,107, filed Nov. 10, 2006.
Bertucco et al. Simulated moving bed technology for continuous, countercurrent solid-fluid supercritical extraction. J. Supercrit. Fluids, Jun. 1995, vol. 8, Issue 2, pp. 138-148.
Bondioli et al. Squalene recovery from olive oil deodorizer distillates. JAOCS, Aug. 1993, vol. 70, pp. 763-766.
Briones et al. Solvent extraction of fatty acids from natural oils with liquid water at elevated temperatures and pressures. JAOCS, Nov. 1990, vol. 67, pp. 852-857.
Brunner et al. Separation of tocopherols from deodorizer condensates by countercurrent extraction with carbon dioxide. J. Supercrit. Fluids, Apr. 1991, vol. 4, pp. 72-80.
Catchpole et al. Extraction of squalene from shark liver oil in a packed column using supercritical $CO_2$. Ind. Eng. Chem. Res., 1997, vol. 36, No. 10, pp. 4318-4324.
Christianson et al. Supercritical Fluid Extraction of Dry-Milled Corn Germ with Carbon Dioxide. Journal of Food Science, 1984, vol. 49, pp. 229-232.
Guclu-Ustundag et al. Correlating the solubility behavior of minor lipid components in supercritical carbon dioxide. J. Supercrit. Fluids, 2004, vol. 31, pp. 235-253.
Holcomb et al. SFE Extraction of alfatoxins (B1, B2, G1, and G2) from corn and analysis by HPLC. J. Supercrit. Fluids, Jun. 1996, vol. 9, Issue 2, pp. 118-121.
Kleber. Mississippi Renewable Energy Conference—Mar. 25-26, 2003, mg engineering Lurgi PSI, Biodesel Capabilities, Mar. 2003, pp. 1-28.
Kuk et al. Supercritical CO2 Extraction of Rice Bran, JAOCS, 1998, vol. 75, No. 5, pp. 623-628.
Lee et al. Concentration of tocopherols from soybean sludge by supercritical carbon dioxide. JAOCS, Aug. 1991, vol. 68, No. 8, p. 571-573.
Lira. Physical Chemistry of Supercritical Fluids, Supercritical Fluid Extraction and Chromatography Techniques and Applications, American Chemical Society, 1988, pp. 1-25.
Markom et al. Supercritical CO2 fractionation of crude palm oil. J. Supercrit. Fluids, 2001, vol. 20, pp. 45-53.
U.S. Appl. No. 15/460,113, filed Mar. 15, 2017.
Mendes et al. Recovery of the high aggregated compounds present in the deodorizer distillate of vegetable oils using supercritical fluids. J. Supercrit. Fluids, Jun. 2005, vol. 34, No. 2, pp. 157-162.
Osseo et al. Continuous fraction of used frying oil by supercritical CO2. JAOCS, Sep. 2004, vol. 81, No. 9, pp. 879-885.
Otles. Supercritical Fluids and Its Applications in Food Industry. http://eng.ege.edu, originally downloaded Mar. 16, 2007, total 4 pages.
Reverchon et al. Modeling and simulation of the supercritical CO2 extraction of vegetable oils. J. Supercrit. Fluids, 2001, vol. 19, pp. 161-175.
Reverchon et al. Rose concrete fractionation by supercritical CO2. J. Supercrit. Fluids, 1996, vol. 9, pp. 199-204.
Reverchon et al. Supercritical CO2 fractionation of jasmine concrete. J. Supercrit. Fluids, 1995, vol. 8, pp. 60-65.
Ronyai et al. Supercritical fluid extraction of corn germ with carbon dioxide-ethyl alcohol mixture. J. Supercrit. Fluids, Oct. 1998, vol. 14, Issue 1, pp. 75-81.
Rostagno et al. Supercritical fluid extraction of isoflavones from soybean flour, Food Chem., 2002, vol. 78, pp. 111-117.
Smith Jr. et al. Separation of cashew (*Anacardium occidentale* L.) nut shell liquid with supercritical carbon dioxide. Bioresource Technology, 2003, vol. 88, pp. 1-7.
Soares et al. Solubility of triacyclglycerols in supercritical carbon dioxide. J. Supercrit. Fluids, 2007, pp. 2-7.

(56) References Cited

OTHER PUBLICATIONS

Sovova et al. Solubility of two vegetable oils in supercritical carbon dioxide. J. of Supercrit. Fluids, 2001, vol. 20, pp. 15-28.
Taylor et al. Supercritical Fluid Extraction and Fractionation of Corn Bran Oil. Supercritical Fluids for Sustainable Technology, ISSF 2000, 2000, pp. 1-10.
Taylor et al. Determination of Oil Content in Oilseeds by Analytical Supercritical Fluid Extraction. JAOCS, vol. 70 Issue 4, Apr. 1993, pp. 437-439.
U.S. Department of Health and Human Services et al. Botanical Drug Products; Guidance for Industry, Jun. 2004, 52 total pages.
U.S. Appl. No. 15/460,113; Office Action dated Aug. 1, 2019.

* cited by examiner

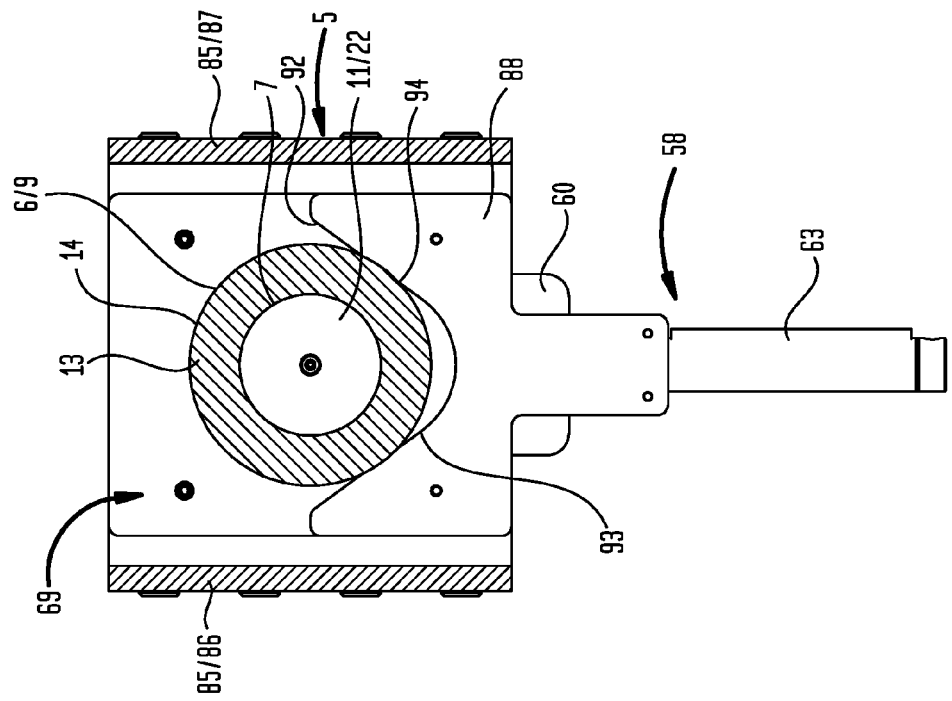
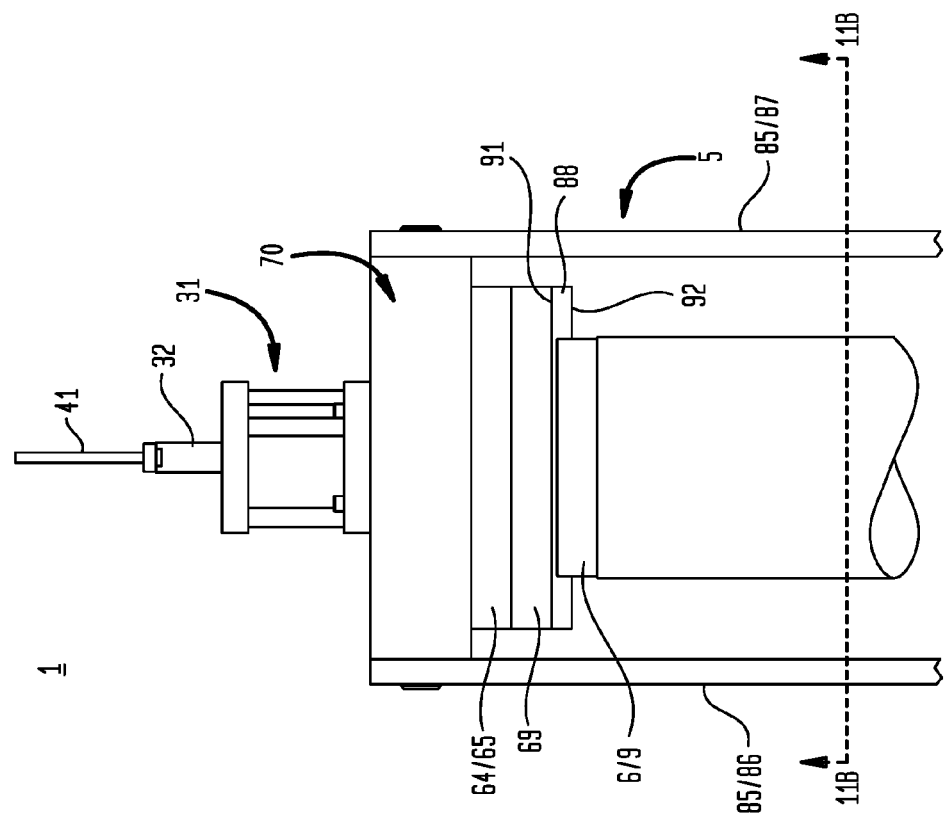

US 10,486,083 B2

SEPARATOR FOR FRACTIONAL SEPARATION OF SUPERCRITICAL CARBON DIOXIDE EXTRACTS

This U.S. Patent Application is a continuation-in-part of U.S. patent application Ser. No. 15/460,113, filed Mar. 15, 2017, which claims the benefit of U.S. Provisional Patent Application No. 62/319,214, filed Apr. 6, 2016, each hereby incorporated by reference herein.

I. SUMMARY

Generally, a system useful in separating an extract from a matrix using one or more extractants and fractionating the extract into one or more fractions. Specifically, a separator including one or more of: a separator vessel having a separator vessel internal surface which defines a separator chamber which communicates between open separator vessel first and second ends, a separator first piston configured to sealably engage the separator vessel internal surface proximate the separator vessel first end or a separator second piston configured to sealably engage the separator vessel internal surface proximate the separator vessel second end.

Naturally, further objects of the invention are disclosed throughout other areas of the specification, drawings, photographs, and claims.

II. BRIEF DESCRIPTION OF THE DRAWINGS

FIG. 11A is front elevation view of the portion of the first extraction vessel shown in FIG. 10.

FIG. 11B is a cross-sectional view 11B-11B of the portion of the first extraction vessel shown in FIG. 11A.

FIG. 37 is an enlarged cross-sectional view of a portion of FIG. 21 showing a particular embodiment of.

III. DETAILED DESCRIPTION OF THE INVENTION

Figure 1:
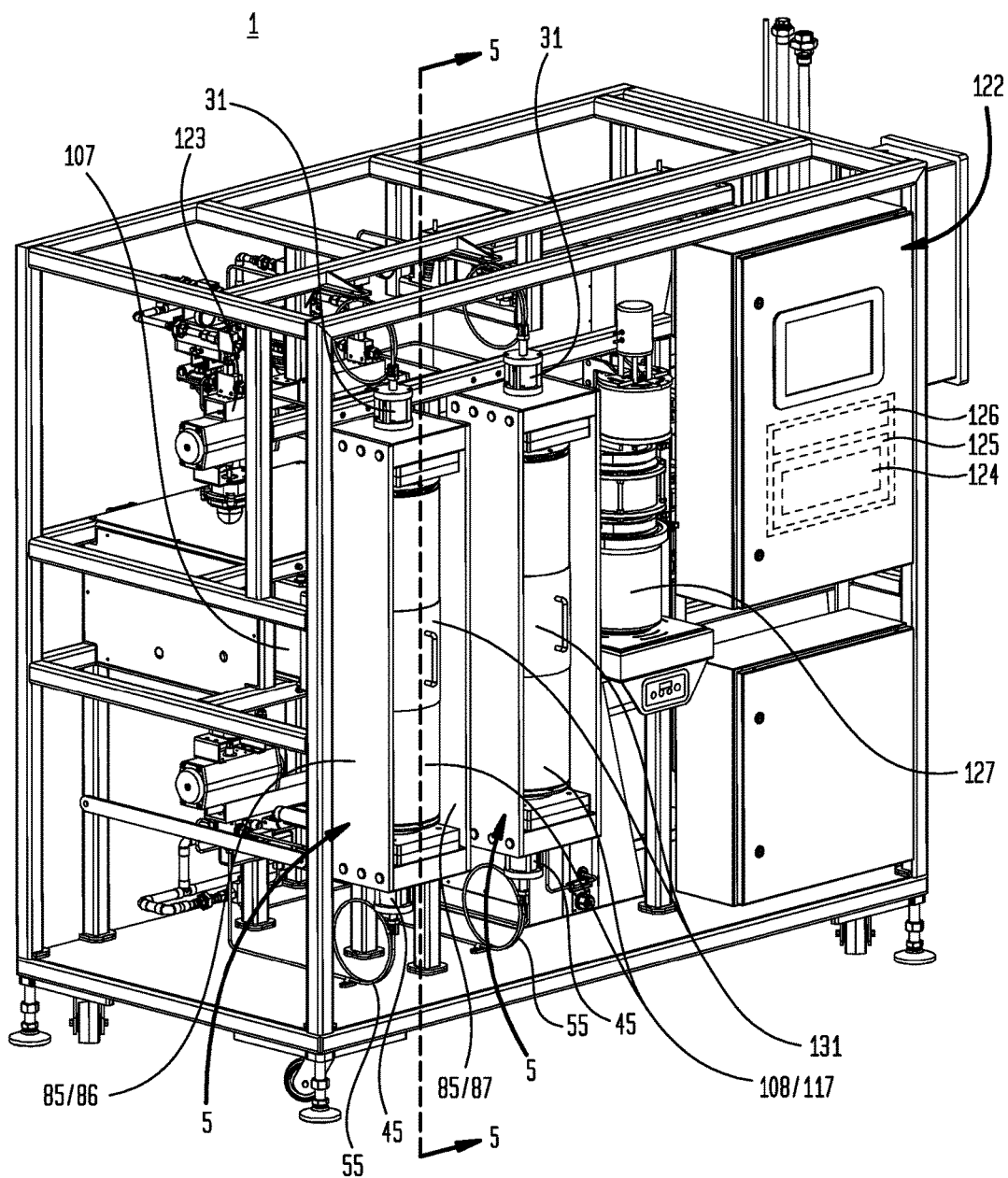
FIG. 1 is a left front side perspective view of an embodiment of an extraction system having a first extraction vessel in a first position having the longitudinal axis in a substantially vertical orientation.

Referring generally to FIGS. 1 through 13 which depict an extraction system (1) useful in separating an extract (2) from a matrix (3) using one or more extractants (4). Specifically, an extractor (5) including one or more of: an extraction vessel (6) having an extractor vessel internal surface (7) which defines an extraction chamber (8) which communicates between open extraction vessel first and second ends (9)(10), a first piston (11) which slidably sealably engages the extractor vessel internal surface (7) proximate the extraction vessel first end (9) or a second piston (12) which slidably sealably engages the extractor vessel internal surface (7) proximate the extraction vessel second end (10).

For the purposes of this invention the term "extractant" encompasses any substance or combination of substances primarily responsible for the transfer of an extract (2) from a matrix (3).

For the purposes of this invention the term "supercritical fluid" means an extractant (2) above its critical temperature ($T_C$) and critical pressure ($P_C$). The critical point represents the highest temperature and pressure at which the extractant (2) can exist as a vapor and liquid in equilibrium which can effuse through the interstices of a matrix (3) like a gas and dissolve an extract (2) contained in the matrix (3) like a liquid and without limitation to the breadth of the foregoing illustrative examples include: carbon dioxide, water, methane, ethane, propane, ethylene, propylene, methanol, ethanol, and acetone, or combinations thereof, above their respective $T_C$ and $P_C$. Illustrative examples of the critical points of various extractants (2) are set out in Table I below.

TABLE I

| Extractant | Critical Temperature (° C.) | Critical Pressure (bar) |
| --- | --- | --- |
| Carbon dioxide | 31.1 | 73.8 |
| Ethane | 32.2 | 48.8 |
| Ethylene | 9.3 | 50.4 |
| Propane | 96.7 | 42.5 |
| Propylene | 91.9 | 46.2 |
| Cyclohexane | 280.3 | 40.7 |
| Isopropanol | 235.2 | 47.6 |
| Benzene | 289.0 | 48.9 |
| Toluene | 318.6 | 41.1 |
| p-Xylene | 343.1 | 35.2 |
| Chlorotrifluoromethane | 28.9 | 39.2 |
| Trichlorofluoromethane | 198.1 | 44.1 |
| Ammonia | 132.5 | 112.8 |
| Water | 374.2 | 220.5 |

For the purposes of this invention the term "subcritical fluid" encompasses an extractant (2) below its critical temperature ($T_C$) and critical pressure ($P_C$), and without limitation to the breadth of the foregoing includes as illustrative examples the extractants (2) set forth in Table I below their critical temperature ($T_C$) and critical pressure ($P_C$).

For the purposes of this invention the term "supercritical conditions" encompasses conditions above an extractant's (2) critical temperature ($T_C$) and critical pressure ($P_C$).

For the purposes of this invention the term "subcritical conditions" encompasses conditions below an extractant's (2) critical temperature ($T_C$) and critical pressure ($P_C$).

For the purposes of this invention, the term "matrix" encompasses any material through which an extractant (2) (whether a subcritical fluid or supercritical fluid) can effuse, and without limitation to the breadth of the foregoing, illustrative examples of matrices (3), include: coffee, seeds (as illustrative examples: grape seeds, rape seeds, sunflower seed, sesame seed, passion fruit seeds, canola seeds, mustard seeds, flax seeds, cranberry seeds, *cannabis* seeds or celery seeds), spices (as illustrative examples: ginger, clove bud, nutmeg, aniseed, coriander, pepper, cinnamon bark, cumin, marjoram, rosemary, sage, and thyme), animal tissues (as illustrative examples: mammalian, bird, fish or crustacean sources), plant materials (whether fresh or dry) (as illustrative examples: bark, wood, leaves, stems, roots, flowers, fruits, seeds, berries or parts thereof and without limitation to the breadth of the forgoing: tobacco plant, eucalyptus plant, rosemary plant, mango plant, tea plant, *cannabis* plant, neem plant, algae, and fungi) and in particular plant flowers (whether fresh or day)(such as lavender flower, chamomile flower, marigold flowers, tea flowers, *magnolia* flower, *cannabis* flowers, and hops flowers), grains (such as corn, wheat, rye, an oats), soil, foods, or combinations thereof, whether whole or comminuted.

For the purposes of this invention, the term "*cannabis* plant(s)" encompasses plants in the *Cannabis* genus and without limitation to the breadth of the foregoing includes *Cannabis sativa, Cannabis indica*, and *Cannabis ruderalis* along with the variants and strains which are the result of genetic crosses, self-crosses or hybrids thereof or genetically modified strains, which may naturally contain different amounts of individual cannabinoids.

For the purposes of this invention, the term "*cannabis* plant material" encompasses plant material derived from one or more *cannabis* plants regardless of the part of the *cannabis* plant or whether fresh or dried *cannabis* biomass.

For the purposes of this invention, the term "extract" encompasses any component contained in a matrix (3) (whether soluble in subcritical or supercritical fluid) and without limitation to the breadth of the foregoing, includes: seed oils (as illustrative examples: corn seed oil, grape seed oil, rape seed oil, sunflower oil, sesame seed oil, passion fruit seed oil, canola seed oil, mustard seed oil, *cannabis* seed oil, flax seed oil), grain oils (as illustrative examples: wheat oil, rye oil, oat oil), spice oils (as illustrative examples: ginger oil, clove bud oil, nutmeg oil, celery seed oil, aniseed oil, coriander oil, pepper oleoresin and oil, cinnamon oil, cumin oil, marjoram oil, rosemary oil, sage oil, thyme oil), botanical drug substances (for example cannabinoids such as $\Delta^9$-tetrahydrocannabinol $\Delta^9$-THC, $\Delta^8$-tetrahydrocannabinol $\Delta^8$-THC, cannabichromene CBC, cannabidiol CBD, cannabigerol CBG, cannabinidiol CBND. cannabinol CBN carboxylic acids thereof) bitters, food colors (such as paprika color), caffeine, nicotine, food colors, lanolin, cholesterol, antioxidants, lipids, free fatty acids, phosphatids (hydratable and non-hydratable), pesticides, or combinations thereof.

For the purposes of this invention, the term "botanical drug substances" encompasses an extract (2) which fulfils the definition of a "botanical drug substance" provided in the Guidance for Industry Botanical Drug Products, June 2004, US Department of Health and Human Services, Food and Drug Administration Centre for Drug Evaluation and Research of: "A drug substance derived from one or more plants, algae, or macroscopic fungi. It is prepared from botanical raw materials by one or more of the following processes: pulverization, decoction, expression, aqueous extraction, ethanolic extraction, or other similar processes."

Now referring generally to FIGS. 1 through 13, an extraction vessel (6) can have an extraction vessel side wall (13) disposed between extraction vessel external and internal surfaces (7)(14). The extraction vessel internal surface (7) defines an extraction chamber (8) which communicates between open extraction vessel first and second ends (9)(10). The extraction vessel (6) can, but need not necessarily, have a cylindrical vessel side wall (13) defining in cross-section orthogonal to the extraction vessel longitudinal axis (15) a circular extraction vessel internal surface (7) between the extraction vessel first and second ends (9)(10). As one example, the extraction vessel (6) can be configured as a cylinder having an internal diameter of about 2 inches (about 51 millimeters) to about 6 inches (about 152 millimeters) and having a length disposed between extraction vessel first and second ends (9)(10) of between about 24 inches (about 610 millimeters) to about 72 inches (about 1829 millimeters). The extraction vessel side wall (13) can have a thickness disposed between the extraction vessel internal surface (7) and extraction vessel external surface (14) of about one half inch (about 13 millimeters) to about one inch (about 25 millimeters) depending upon the material of the extraction vessel (6) and the thickness to contain a supercritical fluid having a pressure of between about 500 pounds per square inch ("psi") to about 20,000 psi at a temperature of between about 20° C. to about 150° C. depending upon the kind and amount of the matrix (3) and the kind and amount of the extract (2) being extracted from the matrix (3). However, this example is not intended to preclude other embodiments of the extraction vessel (6) which can define cross-sections orthogonal to the longitudinal axis (15) that can, but need not necessarily, be polygonal, such as a triangle, a square, a rectangle, or an oval, an ellipse, or combinations thereof.

Now referring primarily to FIGS. 5 through 9 and 13, embodiments of the extraction vessel (6), can but need not necessarily, include first and second porous end assemblies (95)(96) that can be correspondingly removably sealably fitted proximate the extraction vessel first and second ends (9)(10). As to particular embodiments, the first and second porous end assemblies (95)(96) can each include a substantially rigid frit (97) having sufficiently large pores (98) to allow extractants (4) (whether subcritical fluids and supercritical fluids) to flow through the frit (97) but sufficient small to substantially prevent the matrix (3) from passing through the frit (97). The frit porosity may be between about 4 micrometers ("μm") to about 200 μm depending upon the matrix particle size to be extracted which may typically be between about 0.5 millimeter ("mm") to about 5 mm; although the matrix (3) may have a lesser or greater particle size depending upon the application. An annular sealing element (99) can have an inner periphery (100) which can be sealably fitted about the periphery of the frit (97) and an outer periphery (101) which can be disposed in sealably fixed relation with the extractor vessel internal surface (7) proximate the extraction vessel first or second ends (9)(10).

Figure 9:
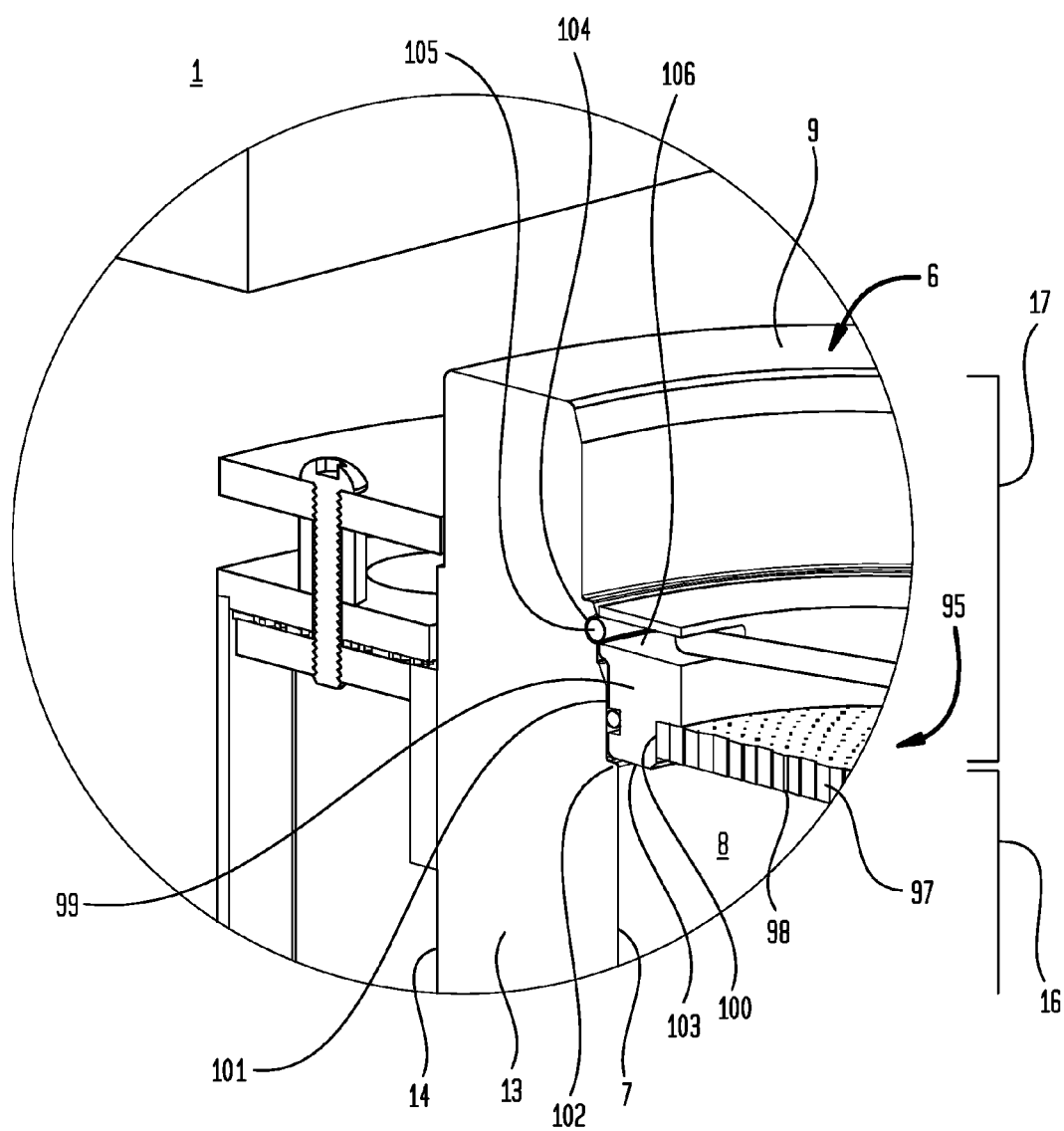
FIG. 9 is an enlarged view of a portion of the extraction vessel shown in FIG. 8.
Figure 10:
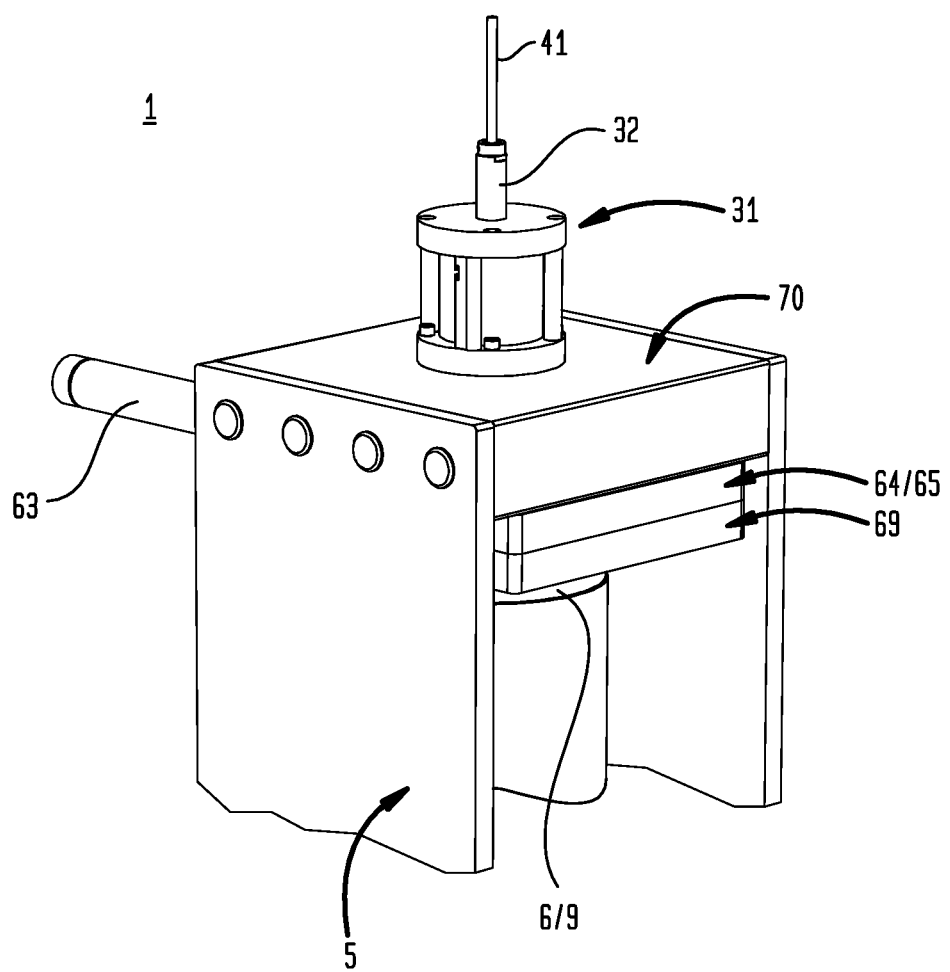
FIG. 10 is an enlarged perspective view of a portion of the first extraction vessel shown in FIG. 1.

As shown in the example of FIG. 9, the extraction vessel internal surface (7) can be configured to provide an annular shoulder (102) which corresponding engages a portion of an annular sealing element first face (103) of the annular sealing element (99). The extraction vessel internal surface (7) can be further configured to provide an annular groove (104) in which a corresponding portion of a frit retaining clip (105) removably inserts to dispose the frit retaining clip (105) against an annular sealing element second face (106) of the annular sealing element (99) to fix the axial location of the annular sealing element (99) in the extraction chamber (8).

Figure 13:
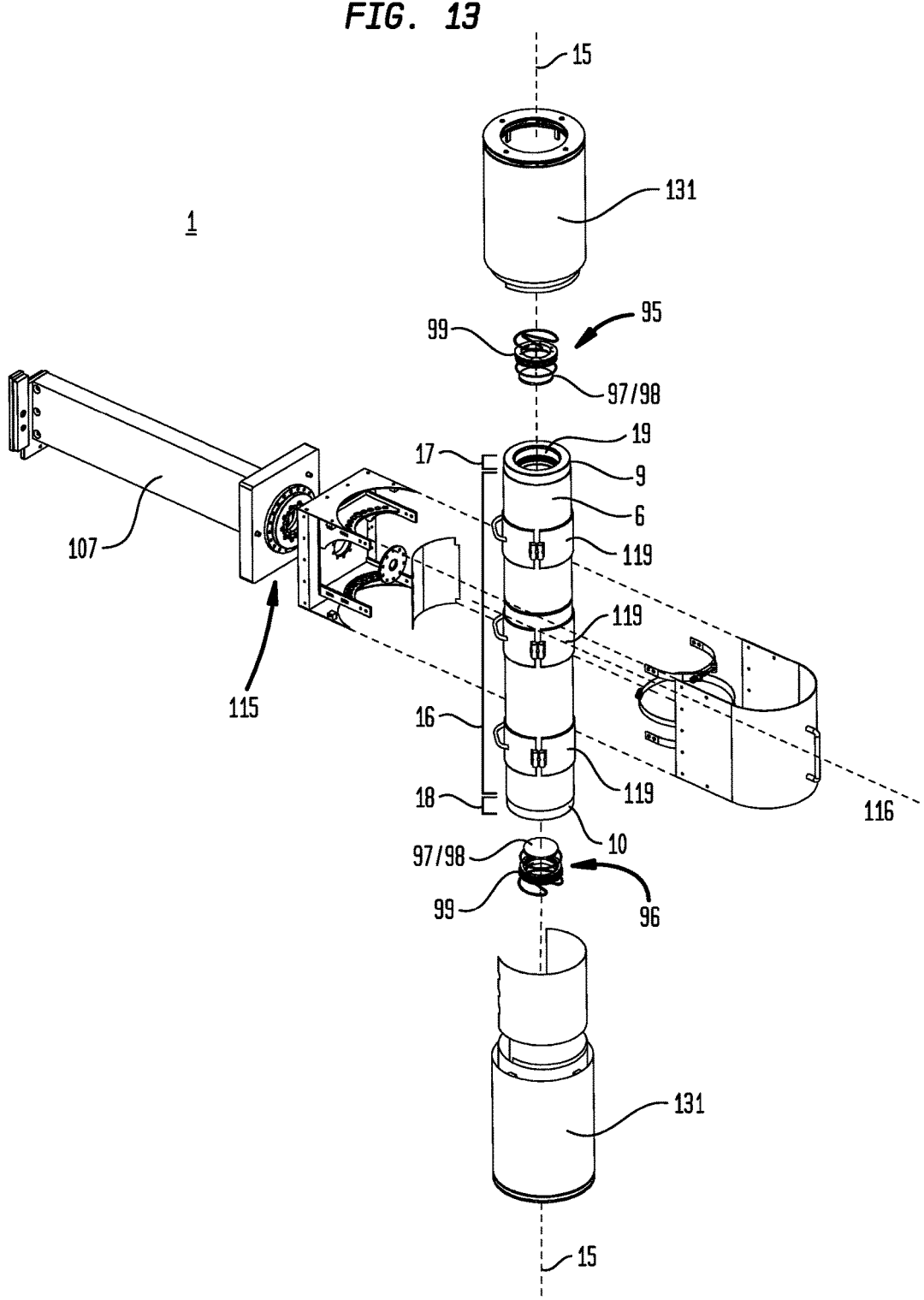
FIG. 13 is an exploded view of a portion of an extractor assembly shown in FIG. 1 including the extraction vessel, first and second porous end assemblies, extraction vessel housing, and extraction vessel support.

Now referring primarily to FIG. 13, the extraction vessel (6) can include a medial portion (16) disposed between first and second terminal portions (17)(18). One or both of the first and second terminal portions (17)(18) can have a corresponding first or second terminal portion internal surface (19)(20) of the extraction vessel internal surface (7). One or both of a first piston (11) or a second piston (12) can correspondingly slidably engage the first or second terminal portion internal surface (19)(20). As shown in the illustrative examples of FIGS. 6 through 8, each of the first and second pistons (11)(12) can be generally configured as cylinders each including generally circular congruent first and a second bases (21)(22) disposed in opposed relation a distance apart connected by a corresponding first or second piston sidewall (23)(24). The first or second piston sidewall (23)(24) can be configured to reciprocally slidably engage and disengage the corresponding first or second terminal portion internal surfaces (19)(20) of the extraction vessel (6). While the figures show the first and second pistons (11)(12) as being generally cylindrical in form, any configuration of the first or second pistons (11)(12) having a corresponding first or second piston sidewall (23)(24) which slidably sealably engages corresponding first or second terminal portion internal surfaces (19)(20) of extraction vessel (6) over the useful operating range of temperature and pressure used to extract matrices with one or more supercritical fluids or subcritical fluids can be utilized in embodiments of the invention. Similarly, while examples of the extraction vessel (6) shown in the Figures comprise generally cylindrical extraction vessels (6) and cylindrical first and second pistons (11)(12), the extraction vessel (6) and sealably engageable first and second pistons (11)(12) can have internal surfaces and corresponding sidewalls that define a triangle, a square, a rectangle, an oval, or other configuration which defines an extraction chamber (8) capable of containing an amount of matrix (3).

Figure 12:
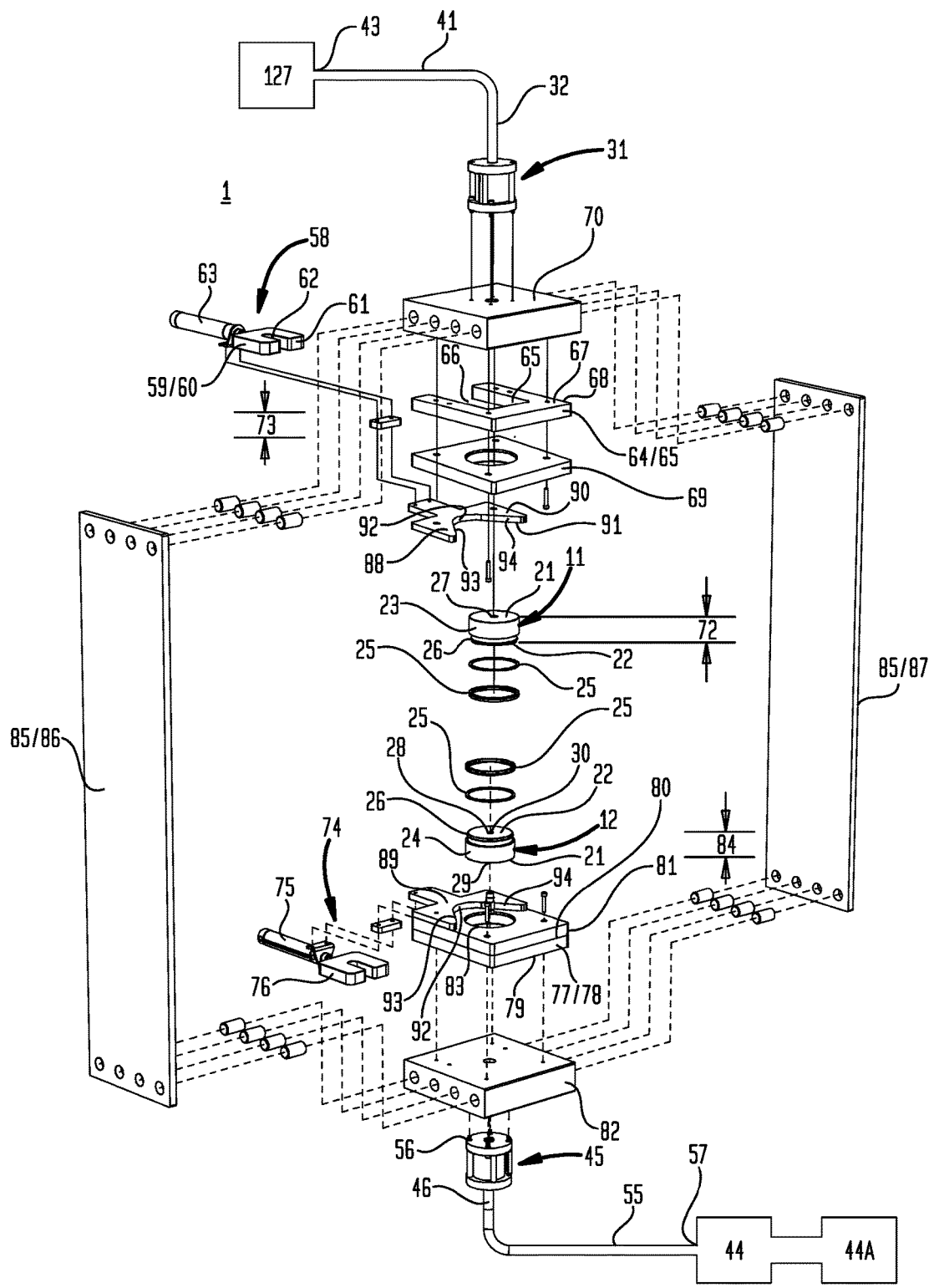
FIG. 12 is an exploded view of a portion of an extractor assembly shown in FIG. 1 including first and second piston retaining assemblies and connecting plates.

Again, referring primarily to FIGS. 9 and 12, configurations of the first or second piston (11)(12) can further include one or more seal elements (25) which can be circumferentially disposed about the first or second piston sidewalls (23)(24) to facilitate sealable engagement between one or both of the first or second piston sidewalls (23)(24) and the corresponding first or second terminal portion internal surfaces (19)(20). As to particular embodiments, the one more seal elements (25) can be coupled to the first or second terminal portion internal surface (19)(20) or can be coupled to the first or second piston sidewall (23)(24). As an illustrative example, one or more circumferential grooves (26) can, but need not necessarily, be disposed in the first or second piston sidewall (23)(24) or in the first or second terminal portion internal surfaces (19)(20). The one or more seal elements (25) can, but need not necessarily, be disposed in the circumferential groove (26) such that a part of the one or more seal elements (25) extend beyond the first or second piston sidewalls (23)(24) or beyond the first or second terminal portion internal surfaces (19)(20) to correspondingly engage the first or second terminal portion internal surfaces (19)(20) or the first or second piston sidewall (23)(24) to correspondingly sealably engage one or both of a first piston (11) and a second piston (12) in relation to the first or second terminal portion internal surfaces (19)(20) of the extraction vessel (6).

Figure 6:
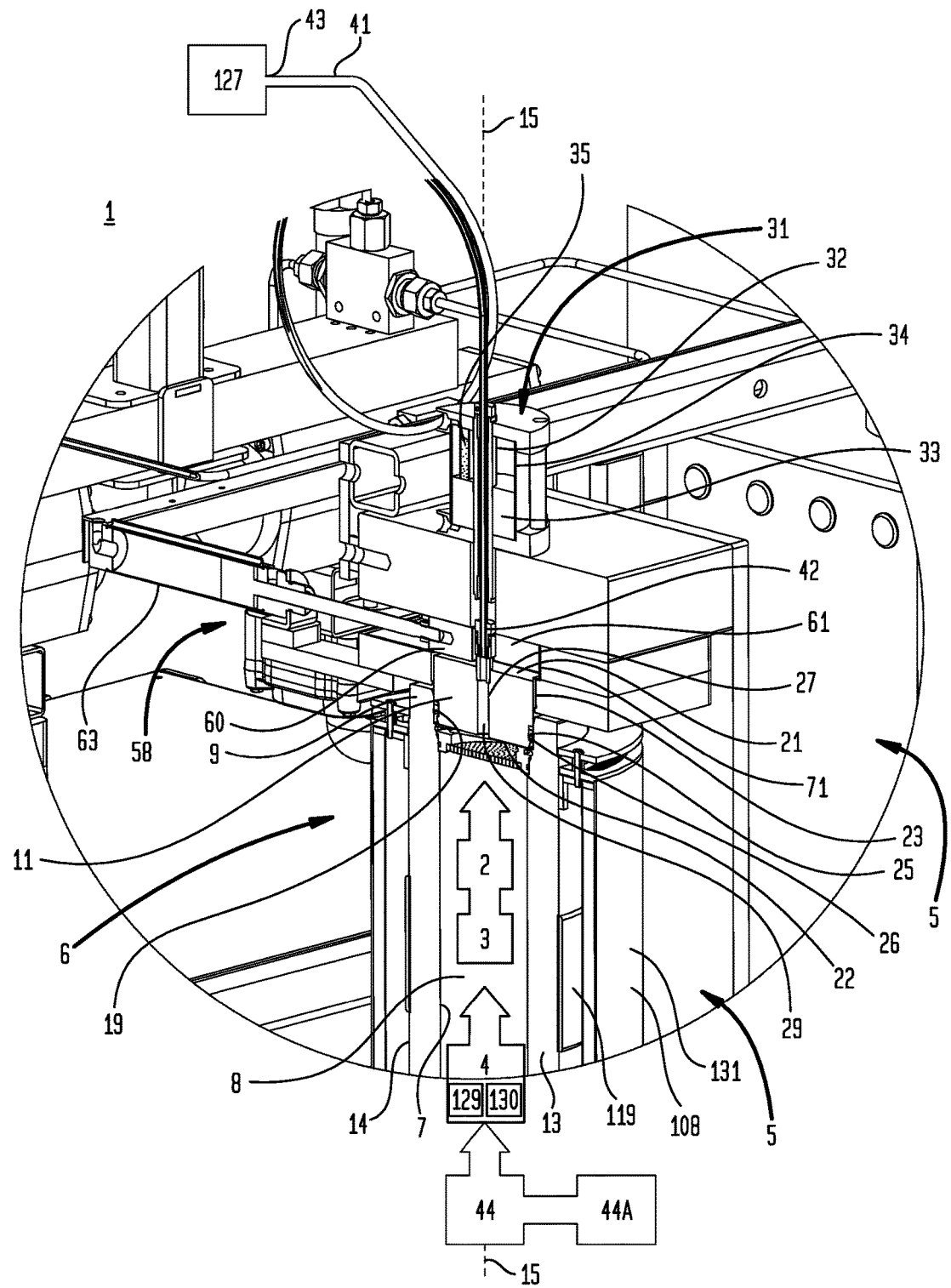
FIG. 6 is an enlarged view of a portion of the extraction system shown in FIG. 5 with a first piston sealably engaged with the internal surface of the first extraction vessel at a first end and retained by a first piston retaining member.
Figure 7:
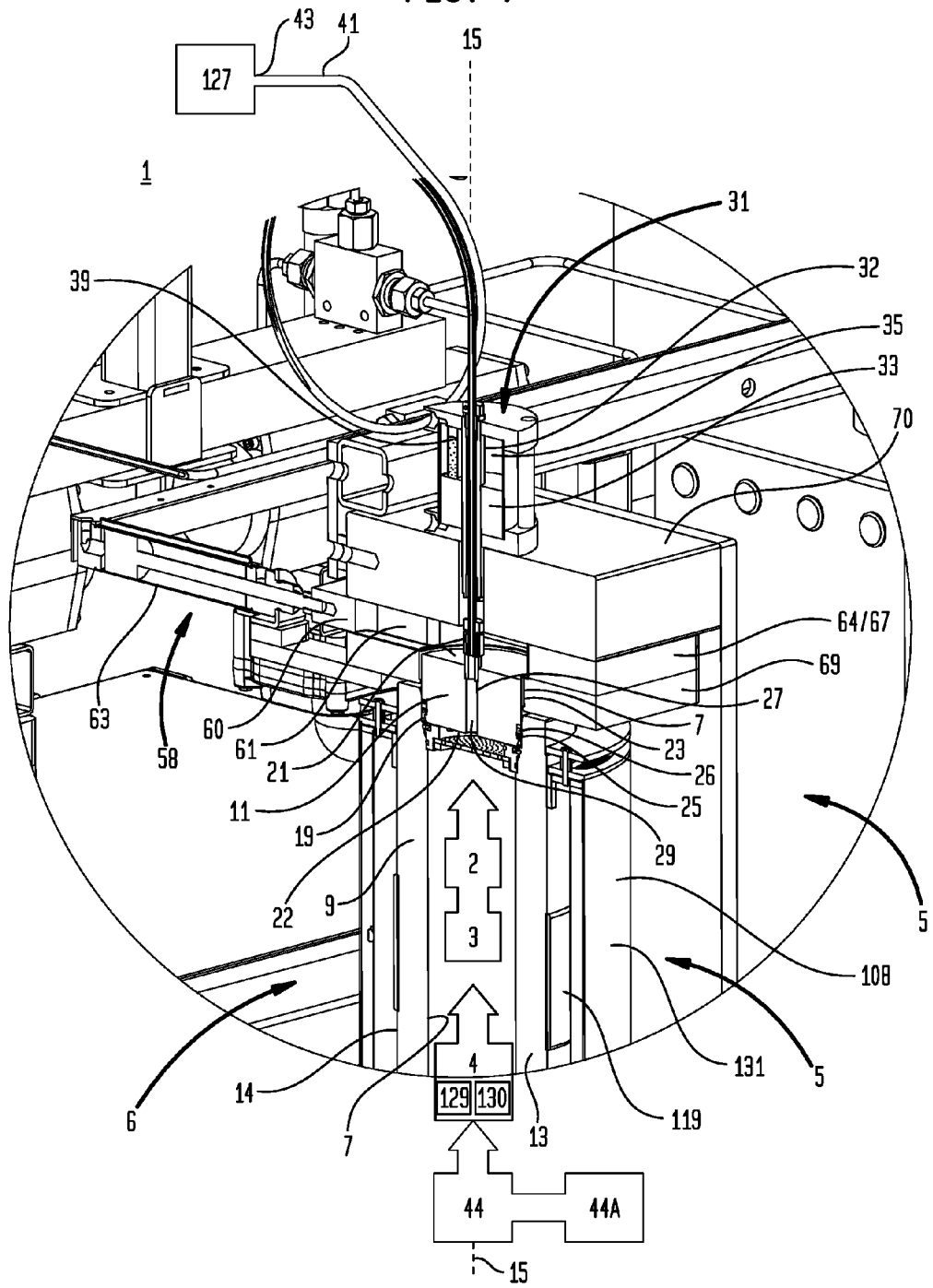
FIG. 7 is the enlarged view of a portion of the extraction system shown in FIG. 5 with the first piston sealably engaged with the internal surface of the first extraction vessel at a first end with the first piston retaining member disengage from the first piston.
Figure 8:
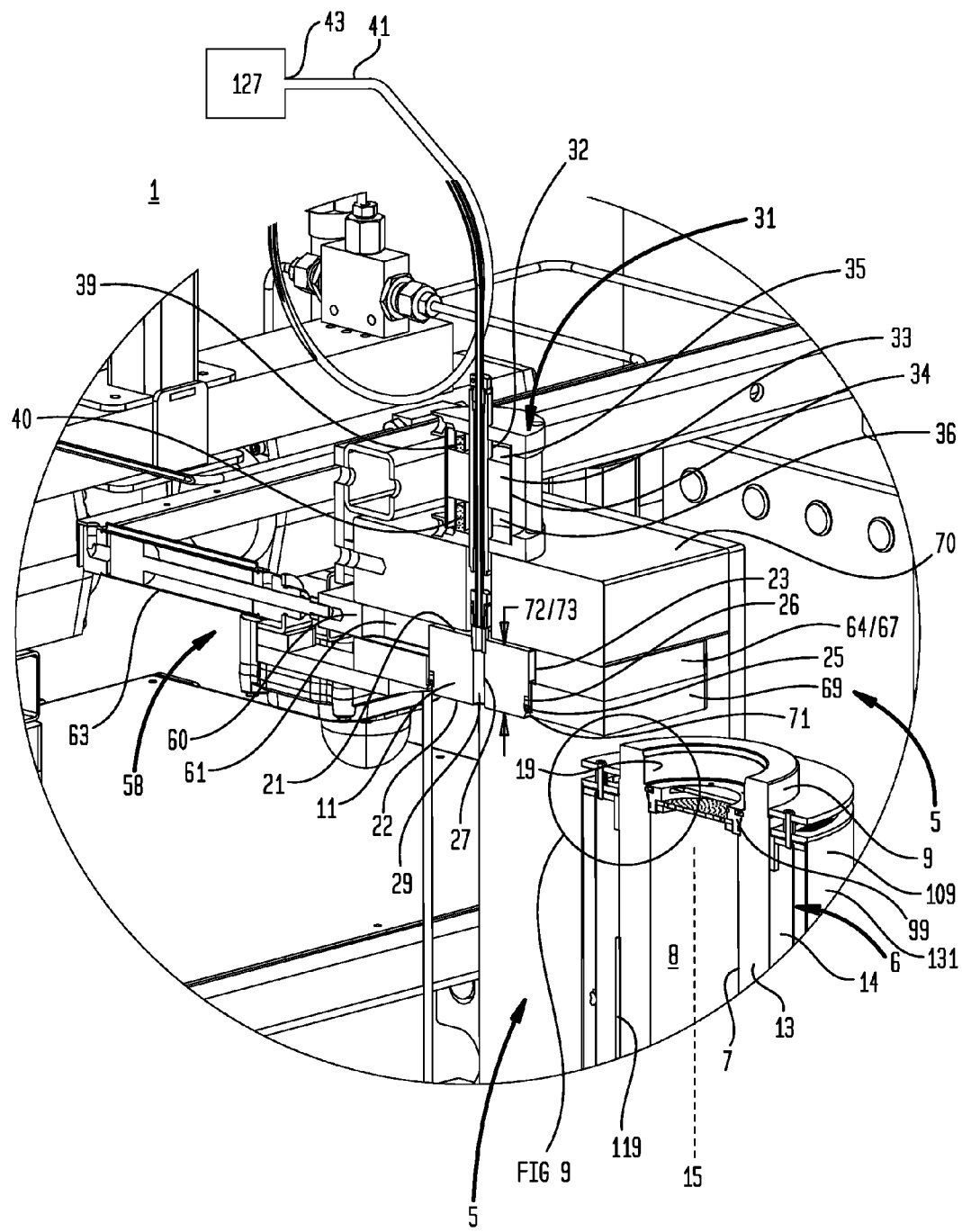
FIG. 8 is the enlarged view of a portion of the extraction system shown in FIG. 5 with the first piston disengaged from the internal surface of the first extraction vessel at a first end and the extraction vessel moved to the extraction vessel second position.

Again, referring primarily to FIGS. 6 through 8, the first and second pistons (11)(12) can, but need not necessarily, correspondingly include a first piston port (27) and a second piston port (28) which communicate between the surfaces of the first and second bases (21)(22) to define a first and second piston passage (29)(30) for the ingress and egress of one or more supercritical fluids (4) or subcritical fluids to or from the extraction vessel (6).

Now referring primarily to FIGS. 6 through 8, 10 and 12, embodiments can, but need not necessarily, include a first piston actuator (31) connected to said first piston (11). The first piston actuator (31) operates to move the first piston (11) to slidably sealably engage the first terminal portion internal surface (19) of the first terminal portion (17) of the extraction vessel. As an illustrative example, the first piston actuator (31) can, but need not necessarily, include a first tubular actuator shaft (32) directly or indirectly connected to the first piston port (27). Operation of the first piston actuator (31) moves the first tubular actuator shaft (32) to correspondingly move the first piston (11) to reciprocally slidably engage and disengage the first piston sidewall (23) with the corresponding first terminal portion internal surface (19). As to the embodiment of the first piston actuator (31) shown in the Figures, the first tubular actuator shaft (32) can be responsive to the corresponding movement of a first actuator piston (33) that travels within a first actuator cylinder (34). The first actuator piston (33) divides the first actuator cylinder (34) to define first and second cylinder chambers (35)(36) on opposite sides of the first actuator piston (33). The first actuator piston (33) within the first actuator cylinder (34) can be reciprocally driven toward opposed first piston actuator cylinder ends (37)(38) by concurrent ingress of a first amount actuator fluid (39), whether liquid or gas, into the first cylinder chamber (35) and egress of a second amount of actuator fluid (40) from the second cylinder chamber (36) followed by concurrent ingress of the second amount of actuator fluid (40) into the second cylinder chamber (36) and egress of the first amount of actuator fluid (39) from the first cylinder chamber (35). A first conduit (41) can be pass within the tubular actuator shaft (32) and have a conduit first end (42) sealably fitted to the first piston port (27). A conduit second end (43) can be coupled to a fluid flow generator (44) adapted to generate a flow of supercritical fluid (4) or subcritical fluid from a fluid source (44) containing an amount supercritical fluid (4) to the first piston port (27). This illustrative example, is not intended to preclude other embodiments of the first piston actuator (31) which can reciprocally move the first piston (11) to sealably engage and disengage the first terminal portion internal surface (19) of the first terminal portion (17) of the extraction vessel (6) with the first conduit (41) sealably fitted to the first piston port (27) allowing conveyance of an amount of supercritical fluid (4) or subcritical fluid from the fluid source (44) into the extraction chamber (8).

Now referring primarily to FIG. 12, embodiments can, but need not necessarily, include a second piston actuator (45) connected to the second piston (12). The second piston actuator (45) operates to move the second piston (12) to sealably engage the second terminal portion internal surface (20) of the second terminal portion (18) of the extraction vessel (6). As to particular embodiments, the second piston actuator (45) can, but need not necessarily, include a second tubular actuator shaft (46) directly or indirectly connected to the second piston port (28). Operation of the second piston actuator (45) moves the second tubular actuator shaft (46) to correspondingly move the second piston (12) to reciprocally slidably engage and disengage the second piston sidewall (24) with the corresponding second terminal portion internal surface (20). As to the embodiment of the second piston actuator (45) shown in the Figures, the second tubular actuator shaft (46) can be responsive to the corresponding movement of a second actuator piston (47) that travels within a second actuator cylinder (48). The second actuator piston (47) divides the second actuator cylinder (48) to define first and second cylinder chambers (49)(50) on opposite sides of the second actuator piston (47). The second actuator piston (47) within the second actuator cylinder (48) can be reciprocally driven toward opposed second piston actuator cylinder ends (51)(52) by concurrent ingress of a first amount actuator fluid (53), whether liquid or gas, into the first cylinder chamber (49) and egress of a second amount of actuator fluid (54) from the second cylinder chamber (50) followed by concurrent ingress of the second amount of actuator fluid (54) into the second cylinder chamber (50) and egress of the first amount of actuator fluid (53) from the first cylinder chamber (49). A second conduit (55) can pass within the second tubular actuator shaft (46) and have a second conduit first end (56) sealably fitted to the second piston port (28). A second conduit second end (57) can be coupled to the fluid flow generator (44) adapted to allow a flow of supercritical fluid (4) from the extraction chamber (8). This illustrative example, is not intended to preclude other embodiments of the second piston actuator (45) which can reciprocally move the second piston (12) to sealably engage and disengage the second terminal portion internal surface (20) of the second terminal portion (18) of the extraction vessel (6) with the second conduit (55) sealably fitted to the second piston port (28) allowing conveyance of an amount of supercritical fluid (4) from the extraction chamber (8). The first and second piston actuators (31)(45) can in the alternative, as illustrative examples, be a push-pull solenoid, pneumatic cylinder, hydraulic cylinder, or the like.

Now referring primarily to FIGS. 6 through 8 and 10 through 12, particular embodiments can, but need not necessarily, include a first piston retaining assembly (58) which engages the first piston (11) to maintain sealed engagement of the first piston (11) with the first terminal portion internal surface (19) of the extraction vessel (6) under normal operating conditions and which disengages from the first piston (11) to allow the first piston (11) to be disengaged from the first terminal portion internal surface (19) of the extraction vessel (6). The first piston retaining assembly (58) acts on the first piston (11) to substantially eliminate movement of the first piston (11) sealably engaged with the first terminal portion internal surface (19) when the fluid pressure within the extraction chamber (8) is within the range of about zero psi and 20,000 psi.

Now referring primarily to FIG. 12, as to particular embodiments, the first piston retaining assembly (58) can include only a first piston retaining member (59) which engages the first piston (11) sealably engaged to the first terminal portion internal surface (19) of the extraction vessel (6). The first piston retaining member (59) can take any form adapted to be engaged and disengaged from the first piston (11). While the illustrative example shown in the Figures includes a first piston retaining member (59) configured as a substantially flat first piston retaining plate (60) having a bifurcated end (61) defining a piston retaining member slot (62) configured to receive the first tubular actuator shaft (32) between the two parts of the bifurcated end (61), this is not intended to preclude embodiments of the first piston retaining member (59) otherwise configured.

Again, referring primarily to FIG. 12, the first piston retaining assembly (58), can but need not necessarily further include, a first piston retaining member actuator (63) connected or directly connected to the first piston retaining member (59). The first piston retaining member actuator (63) can be operable to move the first piston retaining member (59) to engage the first piston (11). The first retaining member actuator (63) can have a structure and function the same or similar to the above described first and second piston actuators (31)(45); however, the first piston retaining assembly (58) could also take the form of push-pull solenoid, pneumatic cylinder, hydraulic cylinder, or the like.

Now referring primarily to FIGS. 6 through 9 and 12, the first piston retaining assembly (58) can, but need not necessarily, further include a first piston retaining member guide (64) including a first piston retaining member guide channel (65) into which the first piston retaining member (59) moves between a first piston position which engages the first piston (11) while sealably engaged with the first terminal portion internal surface (19) of the extraction vessel (6) and a second piston position which disengages the first piston retaining member (59) from the first piston (11). The first piston retaining member guide (64) can take any form adapted to guide the first piston retaining member (59) between the first piston position and the second piston position. While the Figures show the first piston retaining member guide (64) configured as a substantially flat piston retaining member guide plate (65) having a first piston retaining member channel (66) configured to receive a substantially flat piston retaining plate (60) having a bifurcated end (61) defining a piston retaining member slot (62) as above described, this is not intended to limit the first piston retaining member guide (64) solely to this configuration.

Again, referring to FIGS. 6 through 8 and 12, as to particular embodiments, the first piston retaining member guide (64) and the first piston retaining member (59) received in the first retaining member guide channel (65) can have substantially flat first and second faces (67)(68). The first piston retaining member guide (64) and the first piston retaining member (59) received in the first retaining member guide channel (65) can be disposed between a substantially flat first end plate (69) and a substantially flat first pressure receiving plate (70). The flat first end plate (69) can include a first piston aperture (71) in which the first piston (11) reciprocally moves. The piston height (72) between the first and second piston base (21)(22) can be matched to a combined thickness (73) of the first end plate (69) and the first piston retaining member guide (59). The first piston (11) can be moved in the first piston aperture (71) to engage the first base (21) with the first pressure receiving plate (70) to dispose the second base (22) in substantially flush or recessed relation to the surface of the flat first end plate (69) facing the extraction vessel first end (9) to allow the first piston (11) to disengage from the first terminal portion internal surface (19) of the extraction vessel (6)(as shown in the example of FIG. 8). The first piston (11) can be moved in the first piston aperture (71) to dispose the first base (21) in substantially flush or recessed relation to the surface of the flat first end plate (69) facing away from the vessel first end (9) and with the first piston (11) extending sufficiently outward of the flat first end plate (69) to sealably engage the first terminal portion internal surface (18) of the extraction vessel (6)(as shown in the example of FIG. 6).

Now referring primarily to FIG. 12, particular embodiments can, but need not necessarily, further include a second piston retaining assembly (74) which engages the second piston (12) when sealably engaged with the second terminal end portion internal surface (20) of the extraction vessel (6) and which disengages the second piston (12) to allow the second piston (12) to be disengaged from the second terminal end portion internal surface (20) of the extraction vessel (6). The second piston retaining assembly (74) acts on the second piston (12) to substantially eliminate movement of the second piston (12) when sealably engaged with the second terminal end portion internal surface (20) of the extraction vessel (6) when the fluid pressure within the extraction chamber (8) is within the range of about zero psi and 20,000 psi.

As to those embodiments which include a second piston retaining assembly (74), the second piston retaining assembly (74) can be configured in the same or similar manner as above described for the first piston retaining assembly (58) including one or more of: a second piston retaining member (76) which removably engages the second piston (12) when sealably engaged with the second terminal portion internal surface (20) of the extraction vessel (6), a second piston retaining member guide (77) including a second piston retaining member guide channel (78) in which the second piston retaining member (76) moves between a first piston position which engages the second piston (12) sealably engaged with the second terminal portion internal surface (20) of the extraction vessel (6) and a second piston position which disengages the second piston retaining member (76) from the second piston (12) when sealably engaged with the second terminal portion internal surface (20) of the extraction vessel (6).

As to particular embodiments, the second piston retaining member guide (77) and the second piston retaining member (76) received in the second piston retaining member guide channel (78) can have substantially flat first and second faces (79)(80). The second piston retaining member guide (77) and the second piston retaining member (76) received in the second piston retaining member guide channel (78) can be disposed between a substantially flat second end plate (81) and a substantially flat second pressure receiving plate (82). The second end plate (81) can include a second piston aperture (83) in which the second piston (12) reciprocally moves. The second piston height (84) between the first and second bases (21)(22) can be matched to the combined thickness of the second end plate (81) and the second piston retaining member guide (77). The second piston (12) can be moved in the second piston aperture (83) to engage the first base (21) with the second pressure receiving plate (82) to dispose the second base (22) in substantially flush or recessed relation to the surface of the flat second end plate (81) facing the extraction vessel second end (10). The second piston (12) can be moved in the second piston aperture (83) to dispose the first base (21) in substantially flush or recessed relation to the surface of the flat second end plate (81) facing away from the vessel second end (10) and with the second piston (12) extending sufficiently outward of the flat second end plate (81) to sealably engage the second terminal portion internal surface (20) of the extraction vessel (6).

Now referring primarily to FIGS. 1 through 5 and 12, embodiments can, but need not necessarily, include one or more connecting members (85) which interconnect the first and second pressure receiving plates (70)(82). Particular embodiments include first and second connecting members (86)(87) correspondingly fixedly connected to opposed sides of the first and second pressure receiving plates (70)(82). The extraction vessel (6) can be disposed between the first and second connecting members (86)(87) with the extraction vessel first and second ends (9)(10) correspondingly disposed adjacent the first and second piston retaining assemblies (58)(74) to allow corresponding sealable engagement of the first and second pistons (11)(12) with the first and second terminal portion internal surfaces (19)(20) of the extraction vessel (6).

Now referring primarily to FIGS. 11B and 12, embodiments can, but need not necessarily, further include a first or a second extraction vessel centering guides (88)(89)(or both a first and a second extraction vessel centering guides (88)(89)) correspondingly coupled to one or both of the first and second end plates (69)(81). The first and second extraction vessel centering guides (88)(89) can each be configured to engage a corresponding portion of the extraction vessel external surface (14) proximate or at the extraction vessel first or second ends (9)(10) to align the first and second terminal portion internal surfaces (19)(20) to correspondingly receive and sealably engage the first and second pistons (11)(12). As to particular embodiments, the first or second extraction vessel centering guides (88)(89) can each be configured to include a pair of opposed guide plate faces (90)(91) joined by a guide plate peripheral edge (92). A portion of the guide plate peripheral edge (92) can include a pair of converging edge portions (93)(94) fixedly located to engage a corresponding portion of the extraction vessel external surface (14) at or proximate the extraction vessel first or second ends (9)(10). Sliding engagement of the extraction vessel external surface (14) at or proximate the extraction vessel first or second ends (9)(10) with the pair of converging end portions (93)(94) until the extraction vessel (6) cannot be moved any further toward convergence of the pair converging edge portions (93)(94) disposes the extraction vessel (6) at a location at which the first and second pistons (11)(12) can slidably sealably engage the corresponding first and second terminal portion internal surfaces (19)(20) of the extraction vessel (6).

Figure 2:
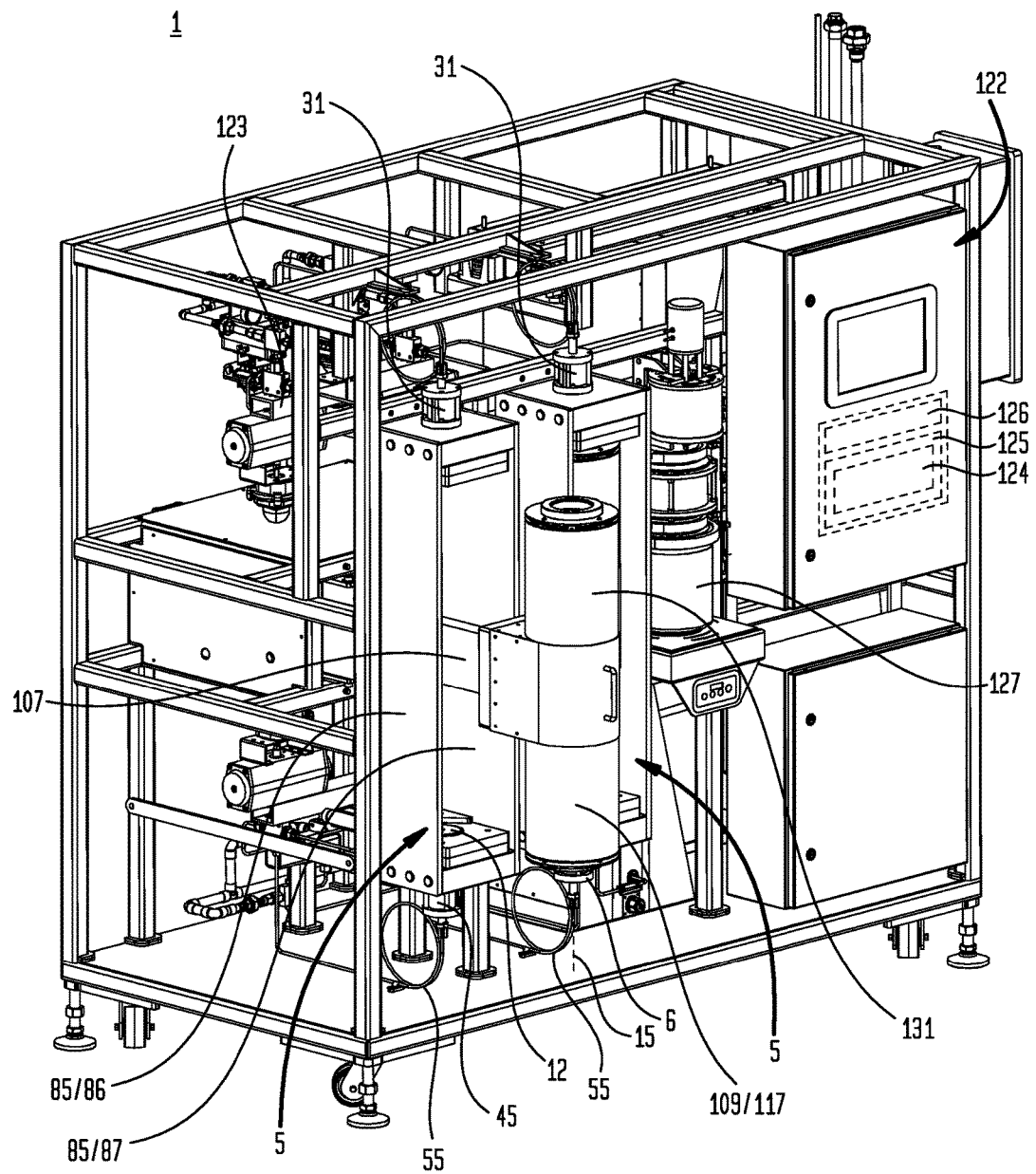
FIG. 2 is a left front side perspective view of an embodiment of the extraction system having the first extraction vessel in a second position having the longitudinal axis in a substantially vertical orientation.
Figure 5:
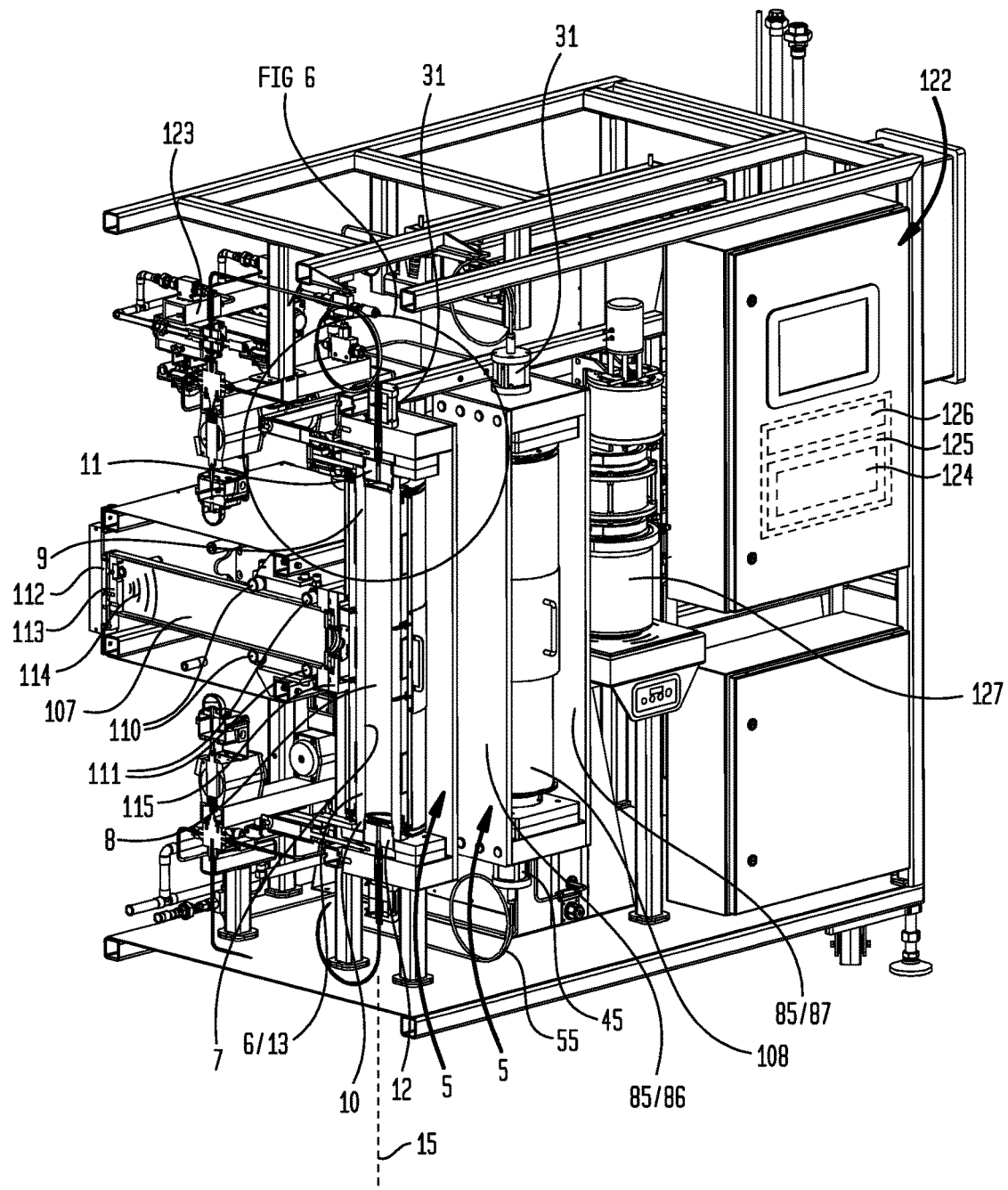
FIG. 5 is cross-sectional view 5-5 of the embodiment of the extraction system shown in FIG. 1.

Now referring to FIGS. 5 and 13, embodiments can, but need not necessarily, include an extraction vessel support (107) coupled to the extraction vessel external surface (14). The extraction vessel support (107) functions to support the extraction vessel (6) with the extraction vessel first and second ends (9)(10) correspondingly adjacent the first and second piston retaining assemblies (58)(74) to allow corresponding sealable engagement of the first and second pistons (11)(12) with the first and second terminal portion internal surfaces (19)(20) of the extraction vessel (6) (as shown in the example of FIG. 1). As to particular embodiments, the extraction vessel support (107) can be extended and retracted to allow corresponding movement of the extraction vessel (6) from an extraction vessel first position (108) at which the extraction vessel first and second ends (9)(10) are correspondingly adjacent the first and second piston retaining assemblies (58)(74) to allow corresponding slidable sealable engagement of the first and second pistons (11)(12) with the first and second terminal portion internal surfaces (19)(20) of the extraction vessel (6) (as shown in the example of FIG. 1) to an extraction vessel second position (109) a sufficient distance from the connecting members (86)(87) to allow loading or unloading of an amount of matrix (3) into or from the extraction chamber (8)(as shown in the example of FIG. 2). As an illustrative example, the extraction vessel external surface (14) can be engaged between two pairs of opposed roller elements (110)(111) spaced apart to allow the extraction vessel support (107) to travel upon forcible urging between the extraction vessel first position (108) and the extraction vessel second position (109). As another example, the extraction vessel support (107) can include telescopingly engaged portions which allow extension and retraction between the extraction vessel first position (108) and the extraction vessel second position (109).

Again, referring primarily to FIGS. 5 and 13, embodiments of the extraction vessel support (107) can, but need not necessarily, further include an extraction vessel support actuator (112) operable to draw the extraction vessel (6) toward the extraction vessel second position (109). As to particular embodiments, the extraction vessel support actuator (112) can engage the extraction vessel (6) with the first or second extraction vessel centering guides (88)(89) to draw the first and second terminal portion internal surfaces (20)(21) into axial alignment with the first and second pistons (11)(12). As to particular embodiments, the extraction vessel support actuator (112) can include a magnet (113) (or an electromagnet which can be energized) which generates a magnetic field (114) which acts on the extraction vessel support (107) or the extraction vessel (6) to draw the extraction vessel (6) toward the extraction vessel second position (109) and can further function to hold the extraction vessel (6) at the second position through a pre-selected operation cycle of the supercritical fluid extraction system (1) or until manually disengaged by de-energizing the electromagnet (113). Understandably, the extraction vessel support actuator (112) could take various forms including a push-pull solenoid, pneumatic cylinder, hydraulic cylinder, or the like.

Figure 3:
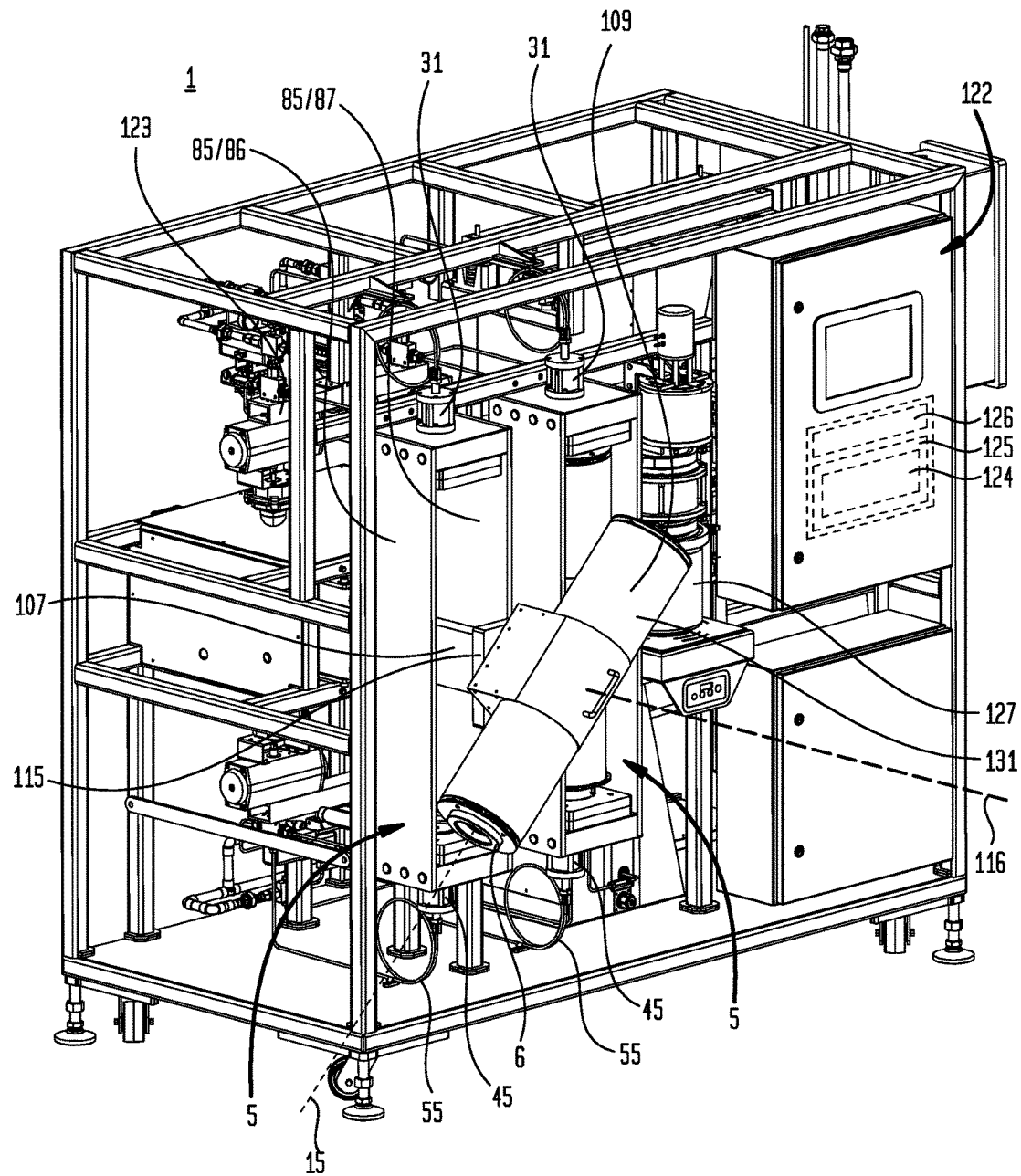
FIG. 3 is a left front side perspective view of an embodiment of the extraction system having a first extraction vessel in a second position rotated about an extraction vessel rotation element axis.
Figure 4:
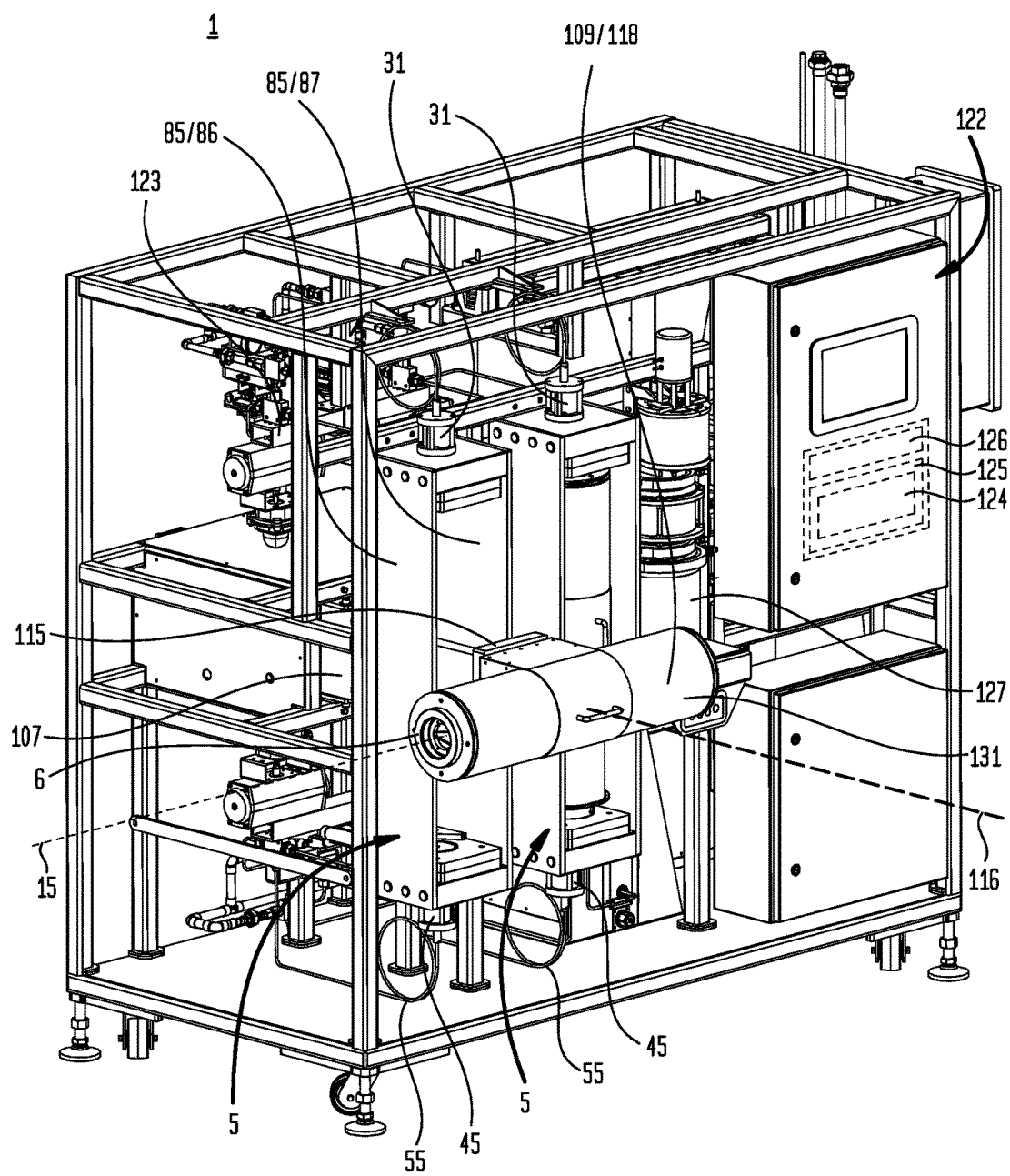
FIG. 4 is a left front side perspective view of an embodiment of the extraction system having a first extraction vessel in a second position having the longitudinal axis in a substantially horizontal orientation.

Now referring primarily to FIGS. 3 and 13, embodiments of the extraction vessel support (107) can, but need not necessarily, further include an extraction vessel rotation element (115) coupled to the extraction vessel (6). The extraction vessel rotation element (115) allows the extraction vessel (6) disposed in the second position (109), as above described, to rotate about an extraction vessel rotation element axis (116) to correspondingly rotate the longitudinal axis (15) of the extraction vessel (6) between a generally vertical orientation (117) (as shown in the example of FIG. 2) and a generally horizontal orientation (118) (as shown in the example of FIGS. 3 and 4).

Now referring primarily to FIGS. 6 and 13, a heat source (119) can be coupled to the extraction vessel external surface (14) to control the temperature of the extraction vessel (6) and the corresponding amount of extractant (4) flowing through the extraction chamber (8) of an extraction vessel (6) within a temperature range of between about 5° C. to about 150° C. While the figures show a plurality of heat bands coupled in spaced apart relation to the extraction vessel external surface (14), embodiments may include a single continuous band along the entire length or a portion of the length of the extraction vessel external surface (14) depending upon the thermal transfer properties of the material used for the extraction vessel (6). The heat source (119) can be coupled to a temperature adjustment element (120) which can monitor temperature of an amount of extractant (4) in the extraction chamber (8) to allow continuous adjustment of the temperature to maintain pre-selected subcritical conditions (129) or pre-selected supercritical conditions (130) of the extractant (4) in the extraction chamber (8). The temperature adjustment element (120) can maintain a pre-selected temperature or a preselected temperature profile (preselected temperature change over a period of time) during an operating cycle of the extraction system (1).

The temperature of the extractant can be selected from the group of temperature ranges comprising or consisting of: about 5° C. to about 15° C., about 10° C. to about 20° C., about 15° C. to about 25° C., about 20° C. to about 30° C., about 25° C. to about 35° C., about 30° C. to about 40° C., about 35° C. to about 45° C., about 40° C. to about 50° C., about 55° C. to about 65° C., about 60° C. to about 70° C., about 65° C. to about 75° C., about 70° C. to about 80° C., about 75° C. to about 85° C., about 80° C. to about 90° C., about 85° C. to about 95° C., about 90° C. to about 100° C., about 95° C. to about 105° C., about 100° C. to about 110° C., about 105° C. to about 115° C., about 110° C. to about 120° C., about 115° C. to about 125° C., about 120° C. to about 130° C., about 125° C. to about 135° C., about 130° C. to about 145° C., about 140° C. to about 155° C., or combinations thereof over a period of time.

Now referring primarily to FIGS. 6 and 12, the fluid flow generator (44) can regulate the pressure of the extractant (4) inside of the extraction chamber (8) in range of between about 500 psi (about 55 bar) to about 20,000 psi (about 1380 bar). The fluid flow generator (44) can coupled to a pressure monitor (121) which monitors the pressure inside the extraction chamber (8) to allow continuous adjustment of the pressure to maintain pre-selected subcritical or supercritical conditions (129)(130) inside of the extraction chamber (8). The pressure of the extractant (4) can be selected from the group of pressure ranges including or consisting of: about 500 psi to about 1500 psi, 1000 psi to about 2000 psi, about 1500 psi to about 2500 psi, about 2000 psi to about 3000 psi, about 2500 psi to about 3500 psi, about 3000 psi to about 4000 psi, about 3500 psi to about 4500 psi, about 4000 psi to about 5000 psi, about 5500 psi to about 6500 psi, about 6000 psi to about 7000 psi, about 6500 psi to about 7500 psi, about 7000 psi to about 8000 psi, about 7500 psi to about 8500 psi, about 8000 psi to about 9000 psi, about 8500 psi to about 9500 psi, about 9000 psi to about 10,000 psi, about 9500 psi to about 10,500 psi, about 10,000 psi to about 11,000 psi, about 10,500 psi to about 11,500 psi, about 11,000 psi to about 12,000 psi, about 11,500 psi to about 12,500 psi, about 12,000 psi to about 13,000 psi, about 12,500 psi to about 13,500 psi, about 13,000 psi to about 14,000 psi, about 13,500 psi to about 14,500 psi, about 14,000 psi to about 15,000 psi, about 14,500 psi to about 15,500 psi, about 15,000 psi to about 15,500 psi, about 15,500 psi to about 16,500 psi, about 16,000 psi to about 17,000 psi, about 16,500 psi to about 17,500 psi, about 17,000 psi to about 18,000 psi, about 17,500 psi to about 18,500 psi, about 18,000 psi to about 19,000 psi, about 18,500 psi to about 19,500 psi, and about 19,000 psi to about 20,000 psi, or combinations thereof over a period of time.

Now referring primarily to FIGS. 6, 9, and 13, an extraction vessel housing (131) can surround the extraction vessel external surface (14) to insulate the extraction vessel (6) provide the user a contact and gripping surface which remains substantially at ambient temperature.

Now referring primarily to FIGS. 1 through 5, the extraction system (1) can, but need not necessarily, include a programmable controller (122) operable to control the operation of one or more of an extraction vessel support actuator (112), the first piston actuator (31), the second piston actuator (45), the fluid flow generator (44), a plurality of conduits and valves (123) configured to allow transfer of the amount of extractant (4) into the one or more extraction chambers (8) and transfer the amount of extractant (4) entraining one or more extracts (2) removed from a matrix (3) away from the one or more extraction chambers (8).

As shown in the illustrative examples of FIGS. 1 through 4, the extraction system (1) can include two extraction vessels (6) inclusive of one or more of the components above described. However, this illustrative example is not intended to limit the extraction system (1) to embodiments having only two extraction vessels (6) and certain embodiments can include only one extraction vessel (6) while other embodiments may include two, three, four or more extraction vessels (6) each of which can be operated in unison by the controller (122) to process matrices (3) for the removal of one or more extracts (2) whether in serial, staggered parallel, or parallel application of one or more processing steps defined by one or more processing programs (124) contained in a controller memory (125) executable by a controller processor (126) communicatively coupled to the controller memory (125).

Now referring primarily to FIGS. 1, 12 and 13, the extraction system (1) as above described can be obtained and each of the one or more extraction vessels (6) can be disposed in the extraction first position (108) in which extraction vessel first and second ends (9)(10) are adjacent the first and second piston retaining assemblies (58)(74) to allow corresponding sealable engagement of the first and second pistons (11)(12) with the first and second terminal portion internal surfaces (19)(20) of each extraction vessel (6) (as shown in the example of FIG. 1).

Now referring primarily to FIGS. 2, 12 and 13, an extraction vessel (6) can be moved to the extraction vessel second position (109) a distance from the first and second piston retaining assemblies (58)(74)(as shown in the example of FIG. 2). The first or second porous end assemblies (95)(96) can be removed from one or both of the extraction vessel first or second ends (9)(10) (as shown in the example of FIG. 13). A first or second porous end assembly (95)(96) can be re-engaged with a corresponding extraction vessel first or second end (9)(10)(as shown in the examples of FIGS. 6 and 9). An amount of matrix (3) can be transferred into the extraction chamber (8) through the remaining open extraction vessel first or second end (9)(10) (as shown in the example of FIG. 6). The remaining first or second porous end assembly (95)(96) can be re-engaged with the extraction vessel first or second end (9)(10) (as shown in the example of FIG. 6 through 9).

Now referring primarily to FIGS. 3, 4, 12 and 13, as to particular embodiments, an extraction vessel (6) disposed in the extraction vessel second position (109) can be rotated from a substantially vertical orientation (117) (as shown in the example of FIG. 2) to a substantially horizontal orientation (118) to facilitate removal of the first and second porous end assemblies (95)(96), cleaning of the extraction vessel (6), or transfer of a matrix (3) to or from the extraction chamber (8) (as shown in the example of FIG. 4).

Now referring primarily to FIG. 1, the extraction vessel (6) can be returned to the extraction vessel first position (108) in which extraction vessel first and second ends (9)(10) are adjacent the first and second piston retaining assemblies (58)(74) to allow corresponding sealable engagement of the first and second pistons (11)(12) with the first and second terminal portion internal surfaces (19)(20) of each extraction vessel (6) (as shown in the example of FIGS. 6 through 9). The method can be performed with respect to additional extraction vessels (6) consistent with a selected serial, staggered parallel or parallel processing program (124).

Now referring primarily to FIGS. 1 and 6, depending upon the kind and amount of matrix (3) transferred to the extraction vessel chamber (8) and the specific extract or mixture of extracts (2) to be removed from the matrix (3), the controller (122) can control the fluid flow generator (44) and can control the heat source (119) to deliver a pre-selected amount of extractant (4) from a fluid source (44A) at pre-selected flow rates, pressures and temperatures to achieve pre-selected subcritical conditions (129) or pre-selected supercritical conditions (130), or a combination thereof, inside the extraction chamber (8) (as shown in the example of FIG. 6). While the figures illustrate the extractant (4) having a direction of flow within the extraction chamber from the second terminal portion (18) toward the first terminal portion (17), as to certain methods the extractant (4) can have a direction of flow in the extraction chamber (8) from the first terminal portion (17) toward the second terminal portion (18).

For example, the controller (122) can control a flow rate, pressure and temperature of carbon dioxide ("$CO_2$") to achieve pre-selected subcritical conditions (129) for a pre-selected period of time under which density of the subcritical carbon dioxide can be relatively low, and can remain relatively low even as the controller (122) increases pressure until the extraction system reaches the critical point of the $CO_2$. Thereafter, the controller (122) can control the flow rate, pressure and temperature of carbon dioxide to achieve and maintain pre-selected supercritical conditions (130) for a pre-selected period of time under which density of supercritical carbon dioxide can be relatively high, and can remain relatively high. Alternately, the controller (122) can control a flow rate, pressure and temperature of carbon dioxide ("$CO_2$") to initially achieve supercritical conditions (126) for a pre-selected period of time under which density of the subcritical carbon dioxide can be relatively high, and can remain relatively high as compared to subcritical conditions (125). The amount of extractant (4) under the pre-selected subcritical conditions (129) or pre-selected supercritical conditions (130) can fluidically engage the matrix (3) to remove selected extracts, a selected mixture of extracts, or substantially all the extracts extractable with one extractant (4) or combination of extractants (4) from the matrix (3) (as shown in the example of FIG. 6). While the solvating power of subcritical $CO_2$ may be reduced under subcritical conditions (129), a high degree of selectivity may be achieved, as only the most soluble components can be efficiently solubilized by the $CO_2$.

For example, with respect to botanical drug extracts derived from *cannabis* plant material, the cannabinoid fraction can be selectively obtained containing only a limited number of non-target compounds, many of which can be subsequently readily removed from the extract (2). In contrast, under supercritical conditions (130), $CO_2$ has an increased density which has the effect of greatly increasing the solvating power of the $CO_2$, which can confer an advantage in that more cannabinoids are solubilized achieving high yields in a lesser period of time. Accordingly, the extraction of botanical drug substances, including, but not limited to, cannabinoids from *cannabis* plant material can for example be accomplished with $CO_2$ under subcritical conditions (129) at a temperature of between about 5° C. to about 15° C. and at a pressure of between about 700 psi to about 1200 psi or under supercritical conditions (126) at temperatures of between about 90° C. to about 100° C. and at a pressure of between about 7,000 psi to about 8,500 psi, or even at temperatures of between about 80° C. to about 110° C. and at pressures of between about 9,000 psi to about 10,000 psi (or even greater pressures of up to 12,000 psi and even greater temperatures of up to about 120° C. can be utilized). The use of supercritical conditions (126) to extract botanical drug substances can afford advantageously lower extractant (4) to matrix (3) ratios of between about 5 to 1 to about 7 to 1. It is believed that these advantageous solvent-to-feed ratios of between 5 to 1 to about 7 to 1 have not been taught in association with the extraction of botanical drug substances.

Now referring primarily to FIGS. 6 and 12, extractant (4) (whether at subcritical conditions (129) or supercritical conditions (130) containing the selected extract or mixture of extracts (2) removed from the matrix (3) can egress through the second piston port (28) (as shown in the example of FIG. 6). The amount of extractant (4) containing the specific extract or mixture of extracts (2) can be transferred from the second piston port (28) to an extract receiving vessel (127). $CO_2$ can be subsequently removed under vacuum and the recovered extract held at a temperature in the range from −15° C. to −20° C.

In the preparation of a botanical drug substance from a *cannabis* plant, decarboxylation can be carried out prior to extraction with liquid $CO_2$. Decarboxylation can be achieved by heating the *cannabis* plant material to temperatures and for times which ensure at least 95% conversion of the acid cannabinoids from the acid form to their neutral form while ensuring thermal degradation of THC to CBN is less than 10%. For example, medicinal *cannabis* plant can be heated to a first temperature for a first time period to evaporate off retained water and allow for uniform heating of the plant material and the temperature is increased to a second temperature for a second time period until at least 95% conversion of the acid cannabinoids to their neutral form has occurred.

Now referring primarily to FIGS. 6 and 12, extractant (4) (whether at subcritical conditions (129) or supercritical conditions (130) containing the selected extract or mixture of extracts (2) removed from the matrix (3) can egress through the second piston port (28) (as shown in the example of FIG. 6). The amount of extractant (4) containing the specific extract or mixture of extracts (2) can be transferred from the second piston port (28) to an extract receiving vessel (127). $CO_2$ can be subsequently removed under vacuum and the recovered extract held at a temperature in the range from −15° C. to −20° C.

Figure 45:
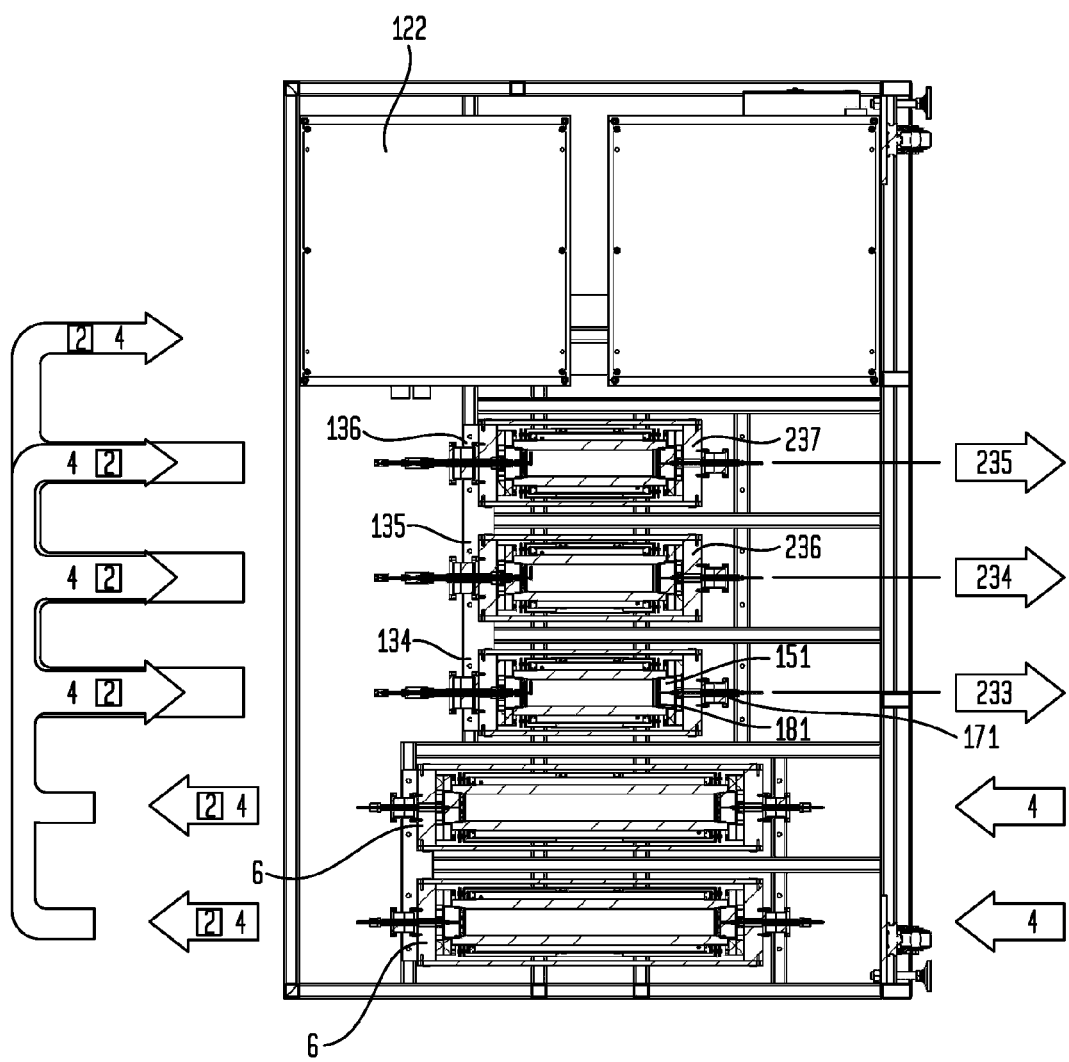
FIG. 45 is a cross-sectional view 45-45 of an embodiment of an extractor system coupled to a separator system as shown in FIG. 14 depicting concurrent parallel flow of an extractant through a pair of extractors and subsequent concurrent parallel flow of the extractant from the pair of extractors through three separators.
Figure 46:
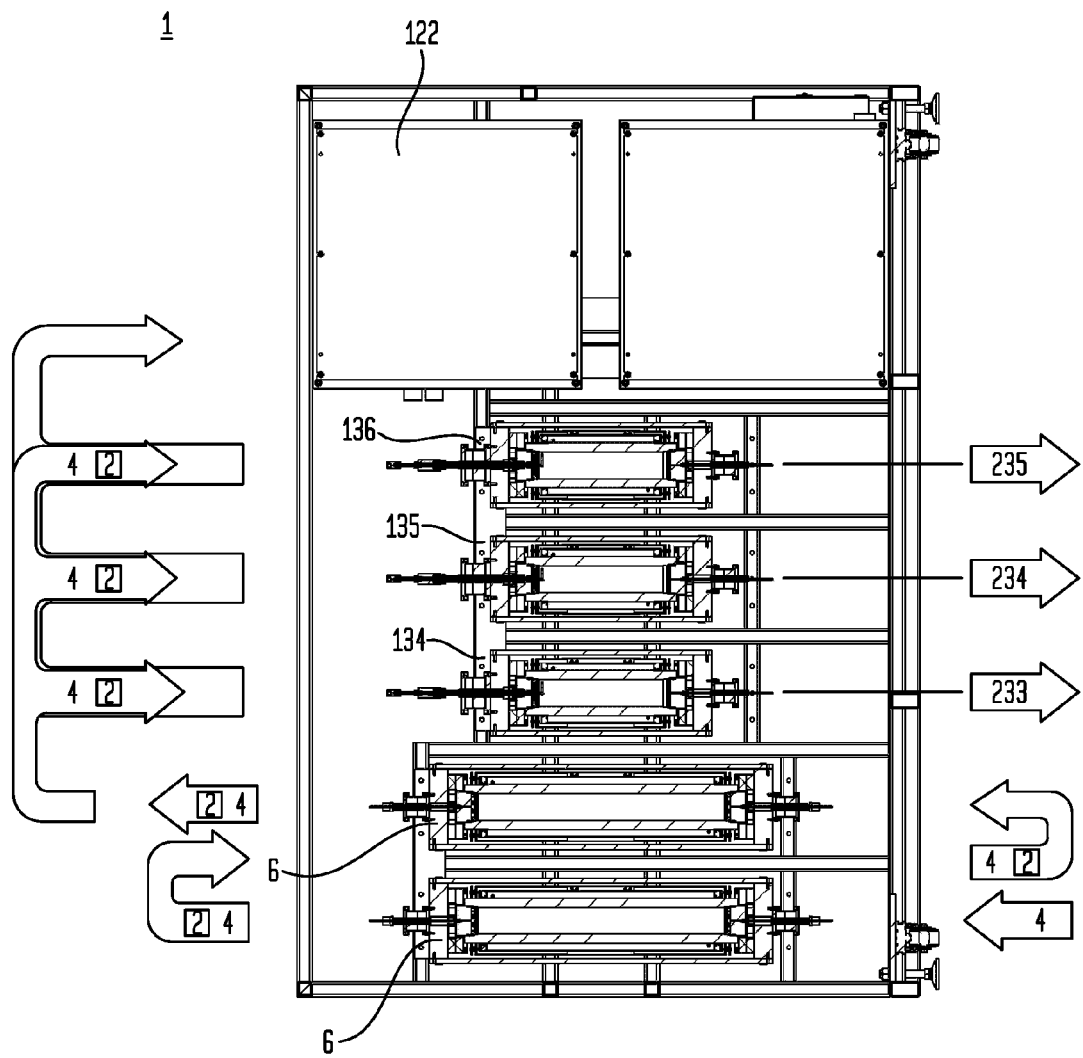
FIG. 46 is a cross-sectional view 45-45 of an embodiment of an extractor system coupled to a separator system as shown in FIG. 14 depicting serial flow of an extractant through a pair of extractors and subsequent concurrent parallel flow of the extractant from the second extractor through three separators.
Figure 47:
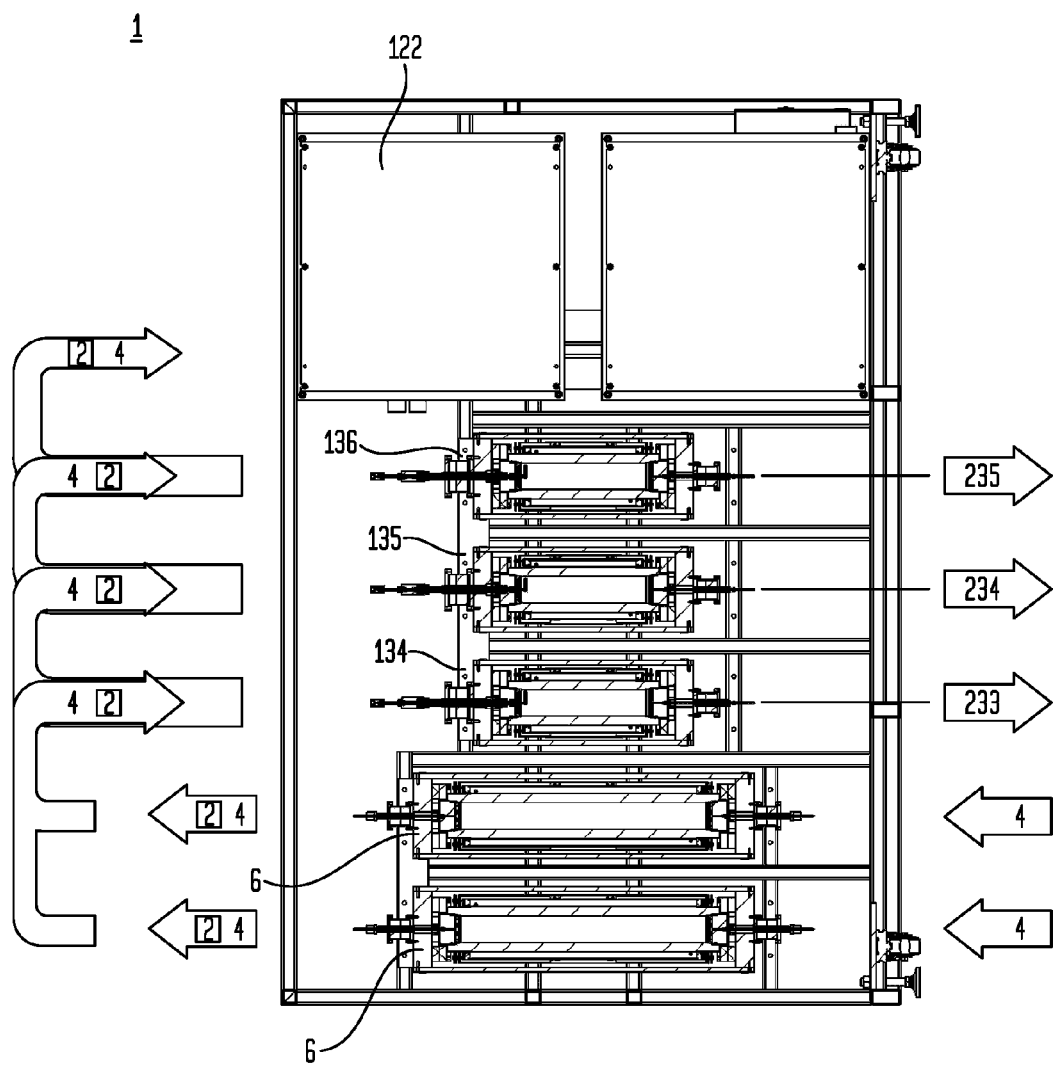
FIG. 47 is a cross-sectional view 45-45 of an embodiment of an extractor system coupled to a separator system as shown in FIG. 14 depicting concurrent parallel flow of an extractant through a pair of extractors and subsequent serial flow of the extractant from the pair of extractors through three separators.
Figure 48:
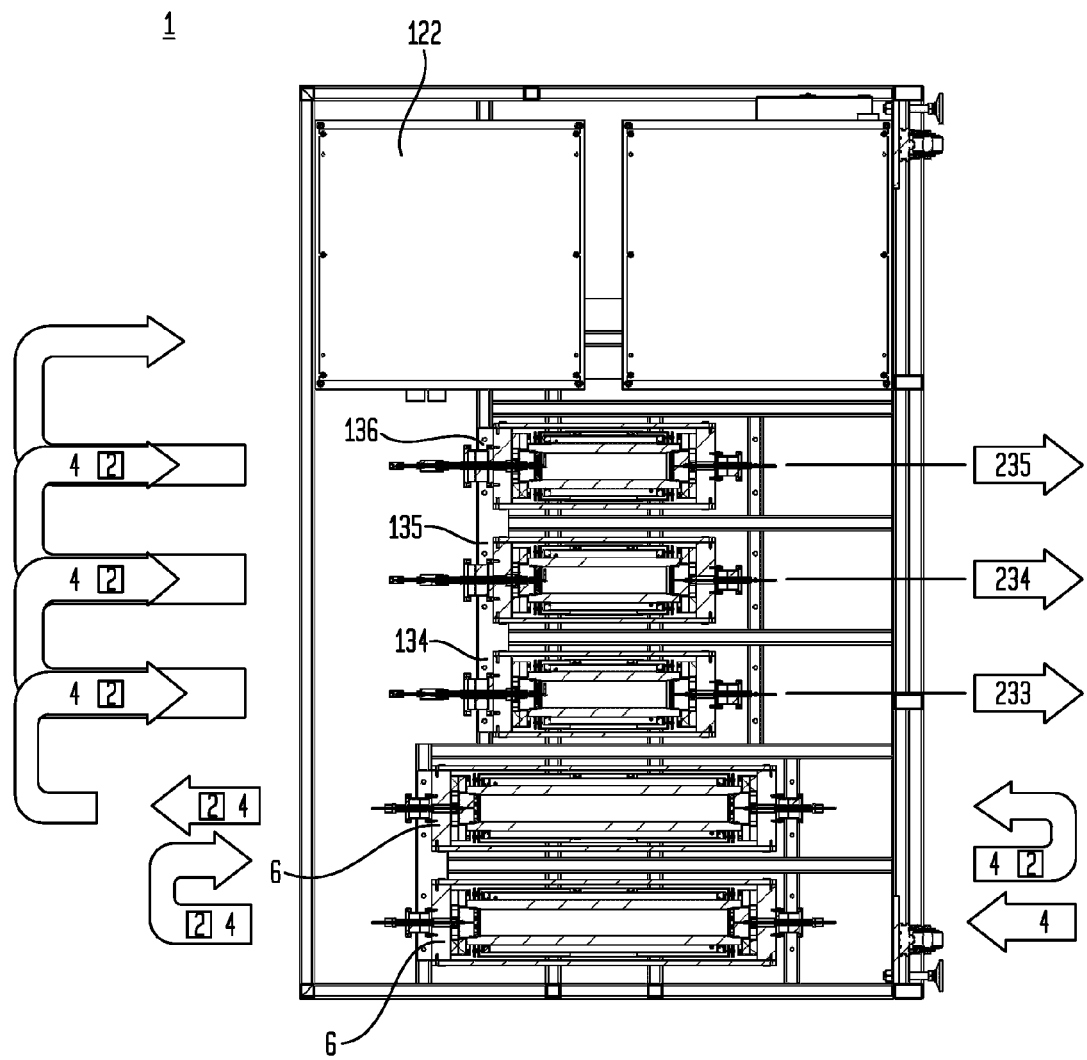
FIG. 48 is a cross-sectional view 45-45 of an embodiment of an extractor system coupled to a separator system as shown in FIG. 14 depicting serial flow of an extractant through a pair of extractors and subsequent serial flow of the extractant from the second extractor through three separators.

Now referring generally referring to FIGS. 14 to 48, particular embodiments can further include one or more separators (132) which can receive the extractant (4) containing an extract or mixture of extracts (2) removed from the matrix (3) one after the other in series, or receive the extractant (4) concurrently in parallel whether at subcritical conditions (129) or supercritical conditions (130)(which can be pre-selected conditions depending upon the application). A plurality of separator conduits and valves (144) can be configured to allow transfer of the extractant (4) serially between the one or more separators (132)(as shown in the example of FIGS. 47 and 48), or allow concurrent transfer of the extractant (4) into one or more separators (132)(as shown in the example of FIGS. 45 and 46), such as a first separator (134), a second separator (135), and a third separator (136) or additional separators. Even though the illustrative example of FIGS. 14 through 17 include three separators (132) or the transfer of the extractant (4) through one or more of a first separator (134), a second separator (135), and a third separator (136) (whether in series or in parallel), this is not intended to preclude embodiments including a lessor or greater number of separators (132).

Now referring primarily to FIGS. 18 through 22, in particular embodiments, the separator (132) can include at least one separator vessel (133) having a separator vessel side wall (137) disposed between separation vessel external and internal surfaces (138)(139). The separation vessel internal surface (138) defines a separation chamber (140) which communicates between open separation vessel first and second ends (141)(142). The separator vessel (133) can, but need not necessarily, have a cylindrical separator vessel side wall (137) defining in cross-section orthogonal to the separator vessel longitudinal axis (143) a circular separator vessel internal surface (139) between the separation vessel first and second ends (141)(142). As one example, the separator vessel side wall (137) can be configured as a cylinder having an internal diameter of about 3 inches (about 76 millimeters) to about 12 inches (about 300 millimeters) and having a length disposed between separation vessel first and second ends (141)(142) of between about 20 inches (about 500 millimeters) to about 60 inches (about 1,500 millimeters). The separator vessel side wall (137) can have a thickness disposed between the separator vessel internal surface (139) and separation vessel external surface (138) of about 1 inch (about 25 millimeters) to about 4 inch (about 100 millimeters) depending upon the material of the separator vessel (133) and the thickness to contain an extractant (4) having a pressure of between about 600 pounds per square inch ("psi") to about 20,000 psi at a temperature of between about 20° C. to about 150° C. depending upon the kind and amount of the extract(s) (2) being extracted from the matrix (3). However, this example is not intended to preclude other embodiments of the separator vessel (133) which can define cross-sections orthogonal to the separator vessel longitudinal axis (143) that can, but need not necessarily, be polygonal, such as a triangle, a square, a rectangle, or an oval, an ellipse, or combinations thereof.

Now referring primarily to FIGS. 18 through 22, embodiments of the separator vessel (133) can include a separator vessel medial portion (145) disposed between first and second separator vessel terminal portions (146)(147). One or both of the first and second terminal portions (146)(147) can corresponding have a first or second terminal portion internal surfaces (148)(149). One or both of a separator first piston (150) or a separator second piston (151) can correspondingly slidably sealably engage the first or second terminal portion internal surfaces (148) (149). As shown in the illustrative examples of FIGS. 18 through 22 (each providing an illustrative example of the separator first piston (150), and FIG. 43 (providing an illustrative example of separator first and second pistons) each of the separator first and second pistons (150) (151) can be generally configured as above described for the first and second pistons (11)(12) of an extractor (5) each including generally circular congruent first and a second bases (152)(153) disposed in opposed relation a distance apart connected by a corresponding first or second separator piston sidewalls (154)(155). The first or second separator piston sidewalls (154)(155) can be configured to reciprocally slidably engage and disengage the corresponding first or second terminal portion internal surfaces (148)(149) of the separator vessel (133).

Again, referring primarily to FIGS. 18-21 and 38, embodiments can, but need not necessarily, include a separator first piston actuator (156) connected to the separator first piston (150). The separator first piston actuator (154) operates to move the separator first piston (150) to slidably sealably engage the first terminal portion internal surface (148) of the separator vessel (133). In particular embodiments, the separator first piston actuator (156) can, but need not necessarily, include a concentric coaxial conduit (157) defining a concentric inner passage (158) terminating in a separator first piston inlet (159) and an annular concentric outer passage (160) directly or indirectly connected to a separator first piston outlet (161). The separator first piston actuator (156) moves the concentric coaxial conduit (157) to correspondingly move the separator first piston (150) to reciprocally slidably engage and disengage the separator first piston sidewall (152) with the corresponding first terminal portion internal surface (148) of the separator vessel (133). As to the embodiment of the separator first piston actuator (156) shown in the Figures, the concentric coaxial conduit (157) can be responsive to the corresponding movement of a first actuator piston (162) that travels within a first actuator cylinder (163), substantially as above described for the extractor first piston actuator (31).

Figure 38:
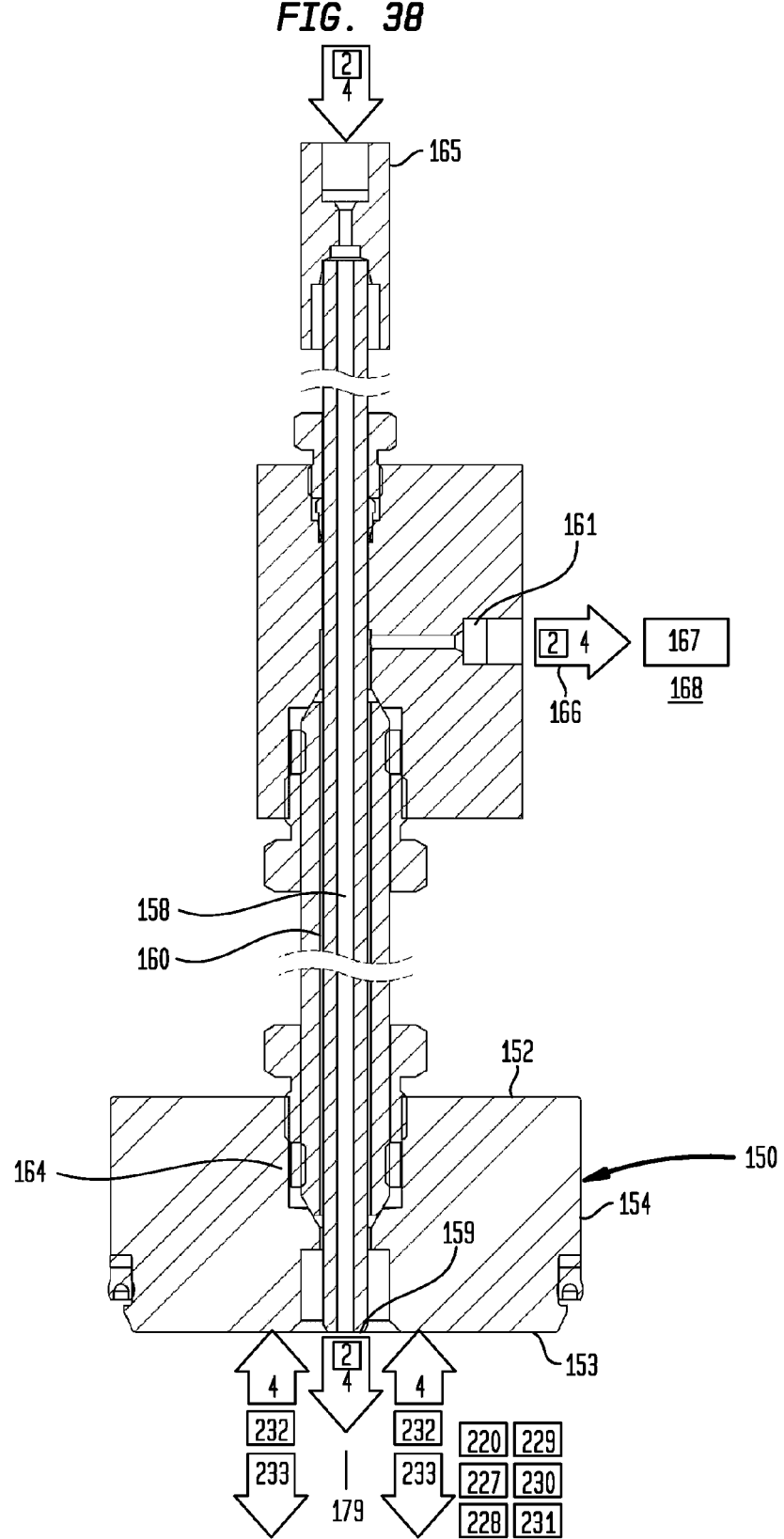
FIG. 38 is a cross-sectional view 38-38 of the particular embodiment of a concentric coaxial conduit defining a concentric inner passage terminating in a separator first piston inlet and an annular concentric outer passage directly or indirectly connected to a separator first piston outlet.
Figure 39:
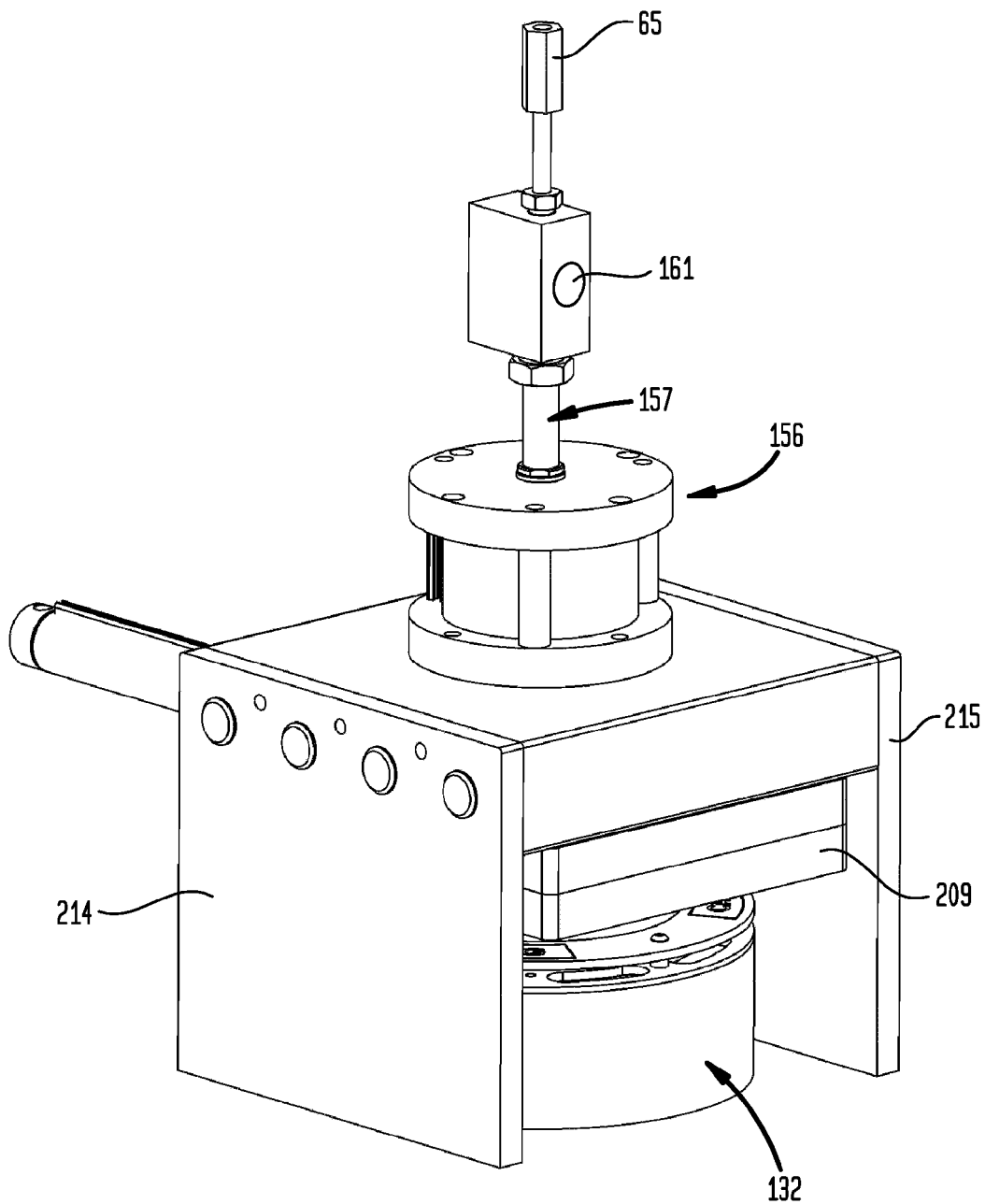
FIG. 39 is an enlarged perspective view of a portion of the first separation vessel shown in FIG. 14.
Figure 41:
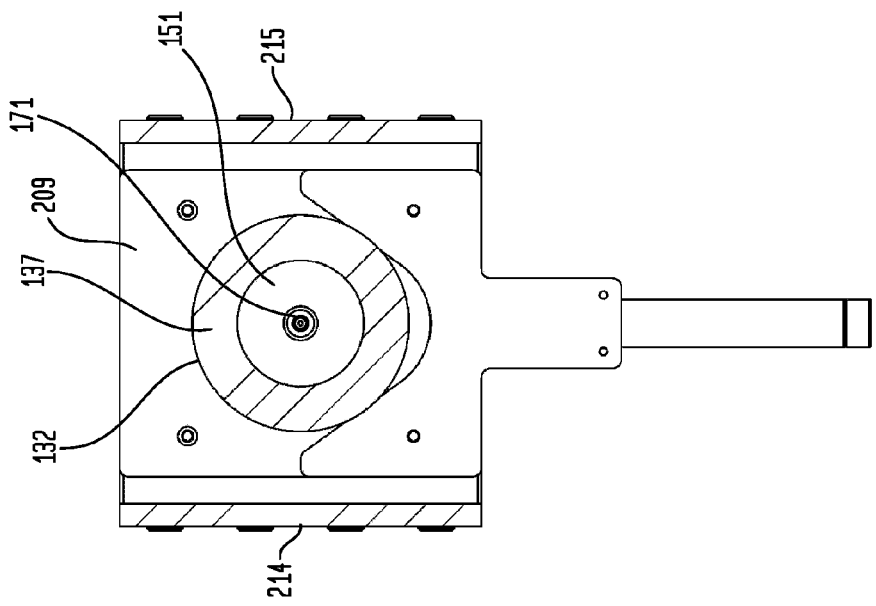
FIG. 41 is a cross-sectional view 41-41 of the portion of the first separator vessel shown in FIG. 40.
Figure 40:
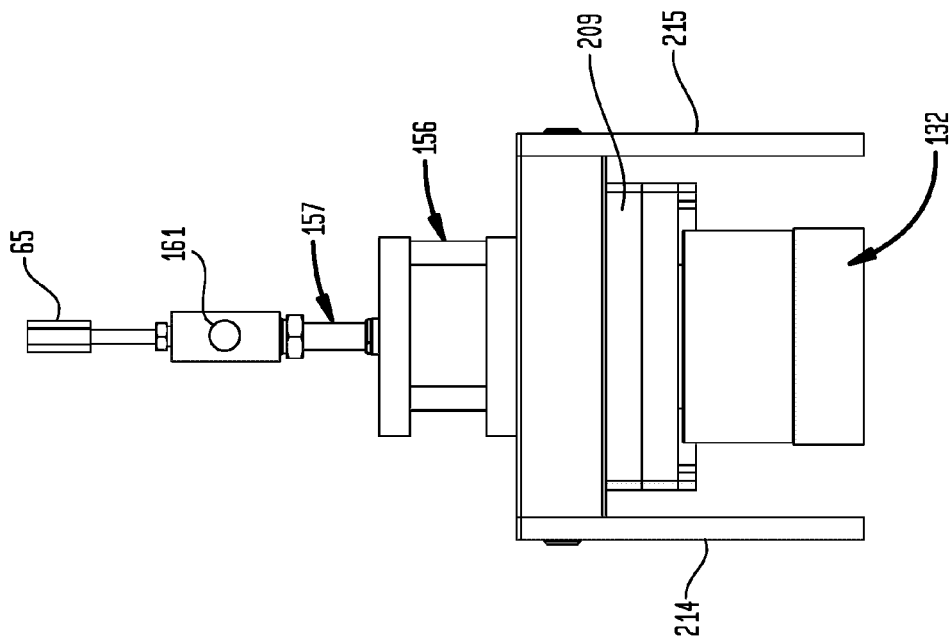
FIG. 40 is front elevation view of the portion of the first separator vessel shown in FIG. 14.
Figure 42:
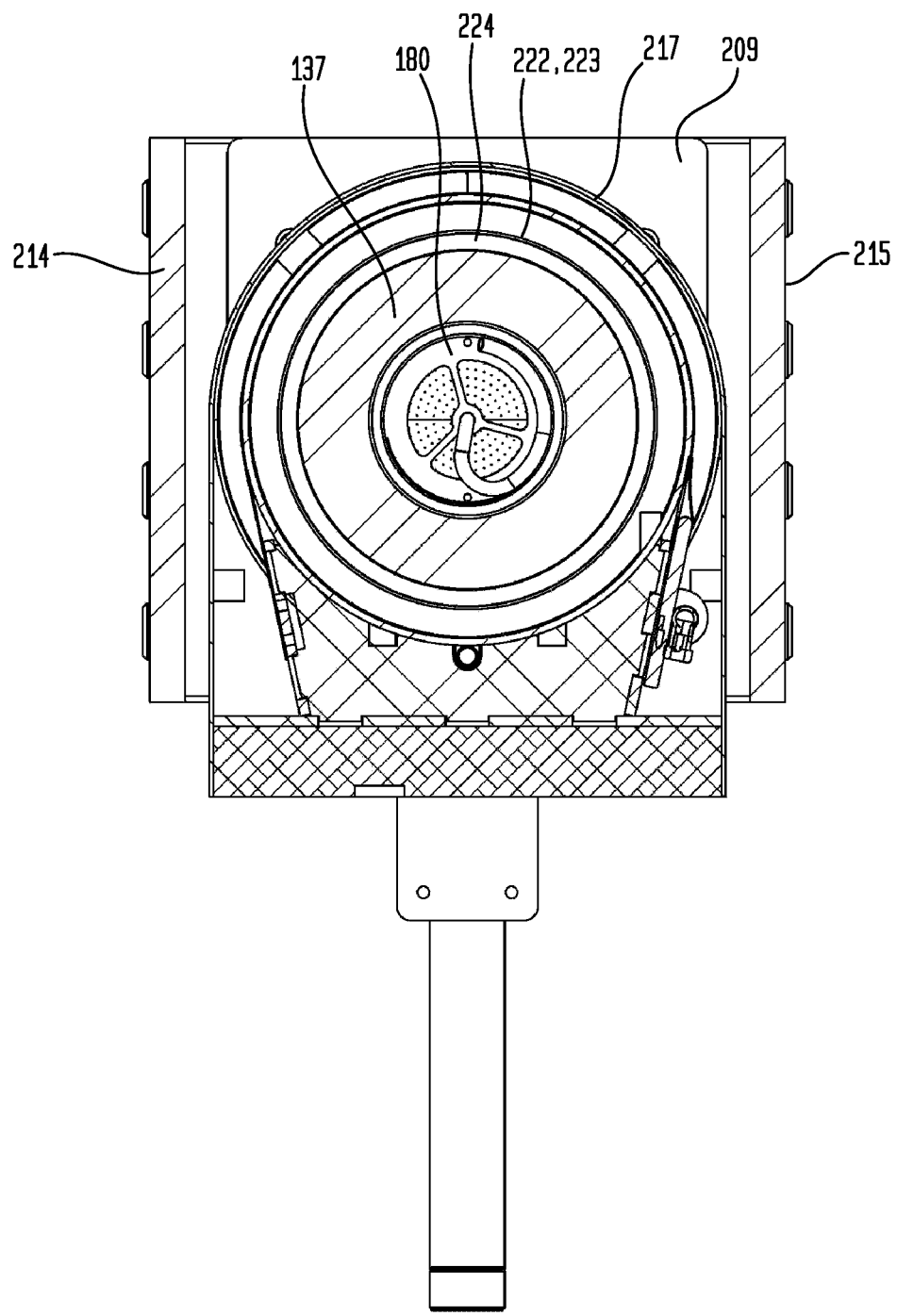
FIG. 42 is a cross-sectional view 42-42 of the portion of the first separator vessel shown in FIG. 40.

Now referring primarily to FIG. 38, whether or not embodiments include a separator first piston actuator (156), the concentric coaxial conduit (157) can have a concentric coaxial conduit first end (164) sealably fitted and communicating between the first and a second bases (152) (153) of the separator first piston (150). The concentric coaxial conduit (157) can have an inner coaxial conduit second end (165) coupled to one or more extractors (5). The inner coaxial conduit defines a concentric inner passage (158) which delivers the extractant (2) from the extractor (5) into a separator (132) (as illustrated by flow arrow (166)). The concentric coaxial conduit (157) defines an annular concentric outer passage (160) which terminates in a separator first piston outlet (161). The annular concentric outer passage (160) relieves the extractant (2) from the separator (132) which egresses from the separator first piston outlet (161) (as illustrated by flow arrows (166)). The separator first piston outlets (161) of one or more separators (132) can be coupled to a carbon dioxide recycle assembly (167) or communicate with the ambient environment (168).

Figure 43:
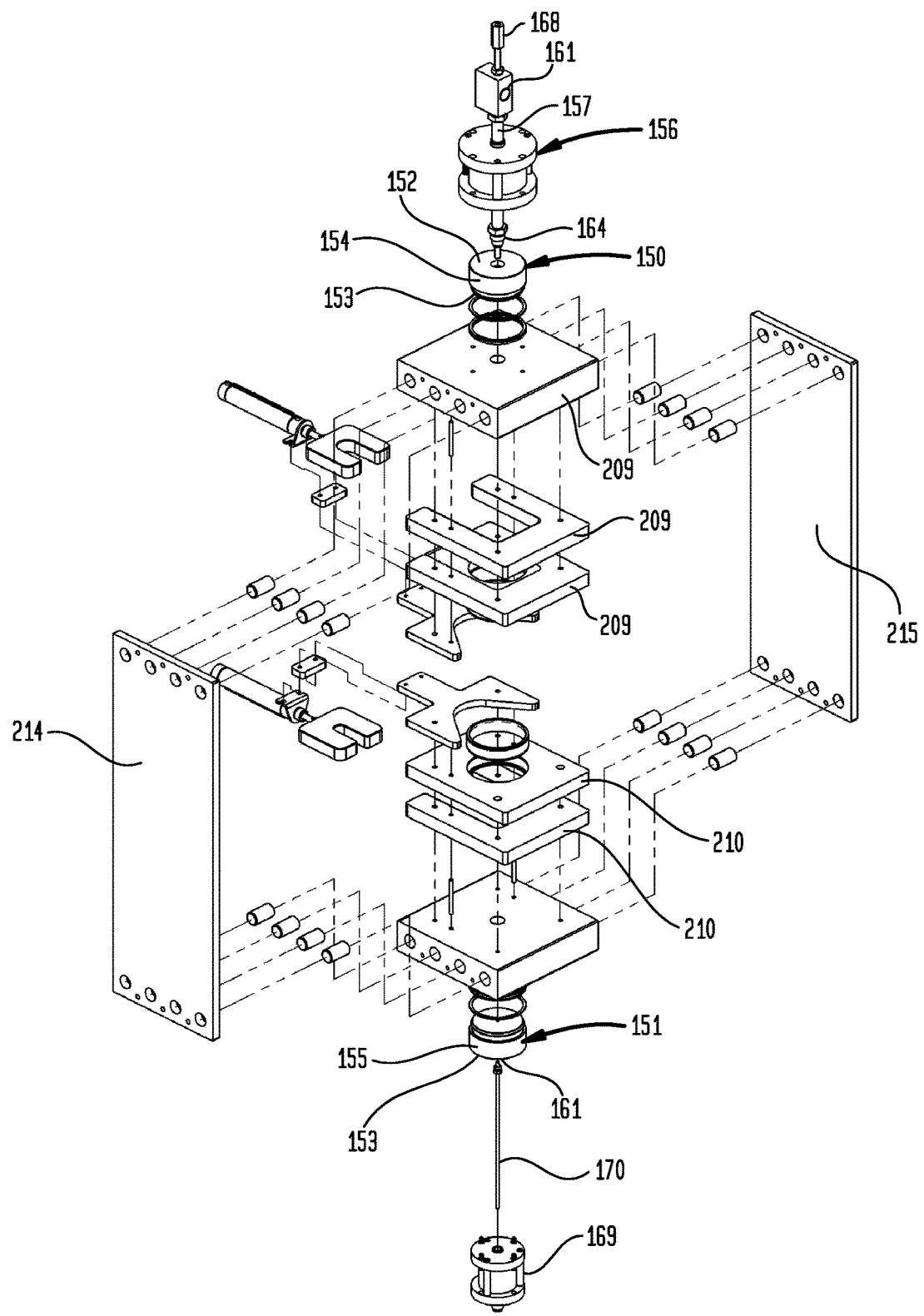
FIG. 43 is an exploded view of a portion of a separator assembly shown in FIG. 14 including separator first and second piston retaining assemblies and separator connecting plates.

Now referring primarily to FIG. 43, embodiments can, but need not necessarily, include a separator second piston actuator (169) connected to the separator second piston (151). The separator second piston actuator (169) operates to move the separator second piston (151) to sealably engage the separator second terminal portion internal surface (149) of the separator vessel (133). As to particular embodiments, the separator second piston actuator (169) can, but need not necessarily, include a tubular actuator shaft (170) directly or indirectly connected to the separator second piston port (171). Operation of the separator second piston actuator (169) moves the tubular actuator shaft (170) to correspondingly move the separator second piston (151) to reciprocally slidably engage and disengage the separator second piston sidewall (155) with the corresponding second terminal portion internal surface (149) of the separator vessel (133). As to the embodiment of the separator second piston actuator (169) shown in the Figures, the components and operation can be the substantially as described above for the extractor second piston actuator (45).

Now referring primarily to FIGS. 22 through 34, particular embodiments, can but need not necessarily include, an inlet extension conduit (172) fixedly coupled or removably sealably coupled to the concentric coaxial conduit (157) to extend the concentric inner passage (158) of the concentric coaxial conduit (157) a distance (177) into the separator chamber (140). The inlet extension conduit (172) can include an inlet extension coupling body (173) configured to sealably couple to an inner concentric coaxial conduit (174) and an extension conduit (175) extending from the inlet extension coupling body (173) and terminating at an extension conduit terminal end (176) at a distance (177) into the separator chamber (140). In particular embodiments, the extension conduit (175) can be generally linear and disposed centrally along the separator vessel longitudinal axis (143) of the separator vessel (133). In particular embodiments, the extension conduit (175) can extend from the extension coupling body (173) at an angle to separator vessel longitudinal axis (143) to dispose the conduit extension terminal end (176) a lesser distance from the separator vessel internal surface (139) than the inner concentric coaxial conduit (174). In particular embodiments, the extension conduit (175) can extend from the extension coupling body (173) in an arcuate winding (178) about the longitudinal axis (179) of the inner concentric coaxial conduit (174) either generally in a flat plane or along the longitudinal axis (179) of the inner concentric coaxial conduit (174) toward the separator vessel second end (142), and which can inwardly or outwardly spiral along the longitudinal axis (179) of the inner concentric coaxial conduit (174). The extension conduit (175) whether linear or arcuate can dispose the conduit terminal end (176) in a separator vessel medial portion (145) about one third to about two thirds the distance between the separator first end (141) and the separator second end (142); however, this is not intended to preclude embodiments, which do not include an inlet extension conduit (175) or which do not have an inlet extension conduit (175) in which the conduit extension terminal end (176) has a location at greater or lesser distance than about one third to about two thirds the distance between the first and second separator ends (141)(142). In particular embodiments having an angulated or arcuate extension conduit (175) the conduit extension terminal end (176) can be located proximate the separator vessel internal surface (149) to corresponding deliver the extractant (4) proximate the separator vessel internal surface (149). Additionally, the extension conduit (175) having an angulated or arcuate extension conduit (175) can generate rotation in the extractant (5) within the separator chamber (140). For example, the rotation in the extractant (5) can develop a vortex, or torus depending on the depending on the velocity and direction of the extractant (5) exiting the conduit extension terminal end (176) in relation to the separator vessel internal surface (149). There can be an advantage in generating a rotation, a vortex, or torus in the extractant (5) inside of the separator chamber (140) which can induce or initiate or expedite separation of extract fractions (185) from the extractant (5).

Again, referring primarily to FIGS. 32 through 37, embodiments of the separator vessel (133), can but need not necessarily, include first and second porous end assemblies (180)(181) that can be correspondingly removably sealably fitted proximate the separator vessel first and second ends (141)(142). As to particular embodiments, the first and second porous end assemblies (180)(181) can each correspondingly include a first or second frit (182)(183). The first and second frits (182)(183) can be made from a wide variety of materials, including for example, a glass, a plastic, or a metal in which frit pores (184) can be generated. The first frit (182) can have sufficiently large frit pores (184) to allow extractant (5) (whether subcritical fluids or supercritical fluids) to flow through the first frit (182). The second frit (183) can have sufficiently large frit pores (184) to allow an extract fraction (185) separated from the extractant (5) to flow through the second frit (183). The frit pores (184) of the first or second frits (182)(183)(or both) can be about 1 micrometer ("μm") to about 200 μm depending upon the corresponding type or kind of extractant (5) or extract fraction (185) or flow rate into and from the separator (132). In particular embodiments, the frit pore (184) can, but need not necessarily, be between about 1 μm to about 200 μm.

Now referring primarily to FIGS. 28 through 31, in particular embodiments, the first porous end assembly (180) can further include a selective flow barrier (186), typically disposed adjacent or abuttingly engaged or incorporated into the first frit (182), which allows extractant (5) to flow into and away from the separator chamber (140) but reduces or obviates flow of the extract fraction (185) separated from the extractant (5). An example of selective flow barrier (186) that allows extractant (5) to pass in both directions but obviates the flow of the separated extract fraction (185)(as a liquid) through the first porous end assembly (180). As an illustrative example, the selective flow barrier can comprise a sheet of porous plastic material including a multitude of interconnected pores that together define passages suitable to allow air or another gas to flow. The sheet can have one face heat-treated to partially close the passages to an extent sufficient to prevent a liquid from flowing across the sheet toward the other face.

Again, referring primarily to FIGS. 22 through 37, in particular embodiments, the first and second porous end assemblies (180)(181) can further include, an annular sealing element (187) having an inner periphery (188) which can be sealably fitted to or about the first or second frits (182)(183) (and in particular embodiments about the selective flow barrier (185)) and an outer periphery (189) which can be disposed in sealably fixed relation with the separator vessel internal surface (139) proximate the separator vessel first or second ends (141)(142).

Figure 22:
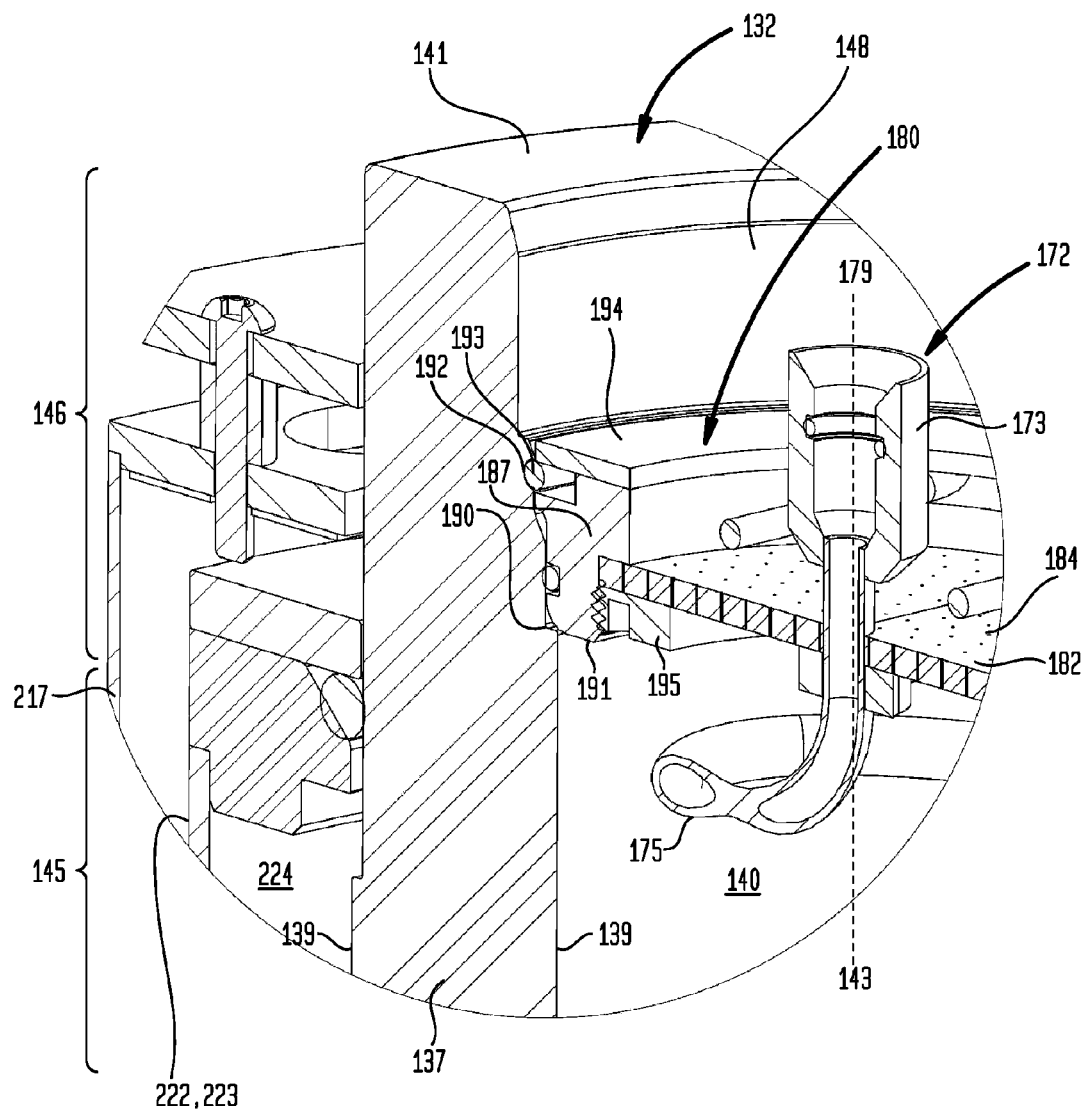
FIG. 22 is an enlarged portion of the cross-section of the first separator vessel shown in FIG. 21.
Figure 23:
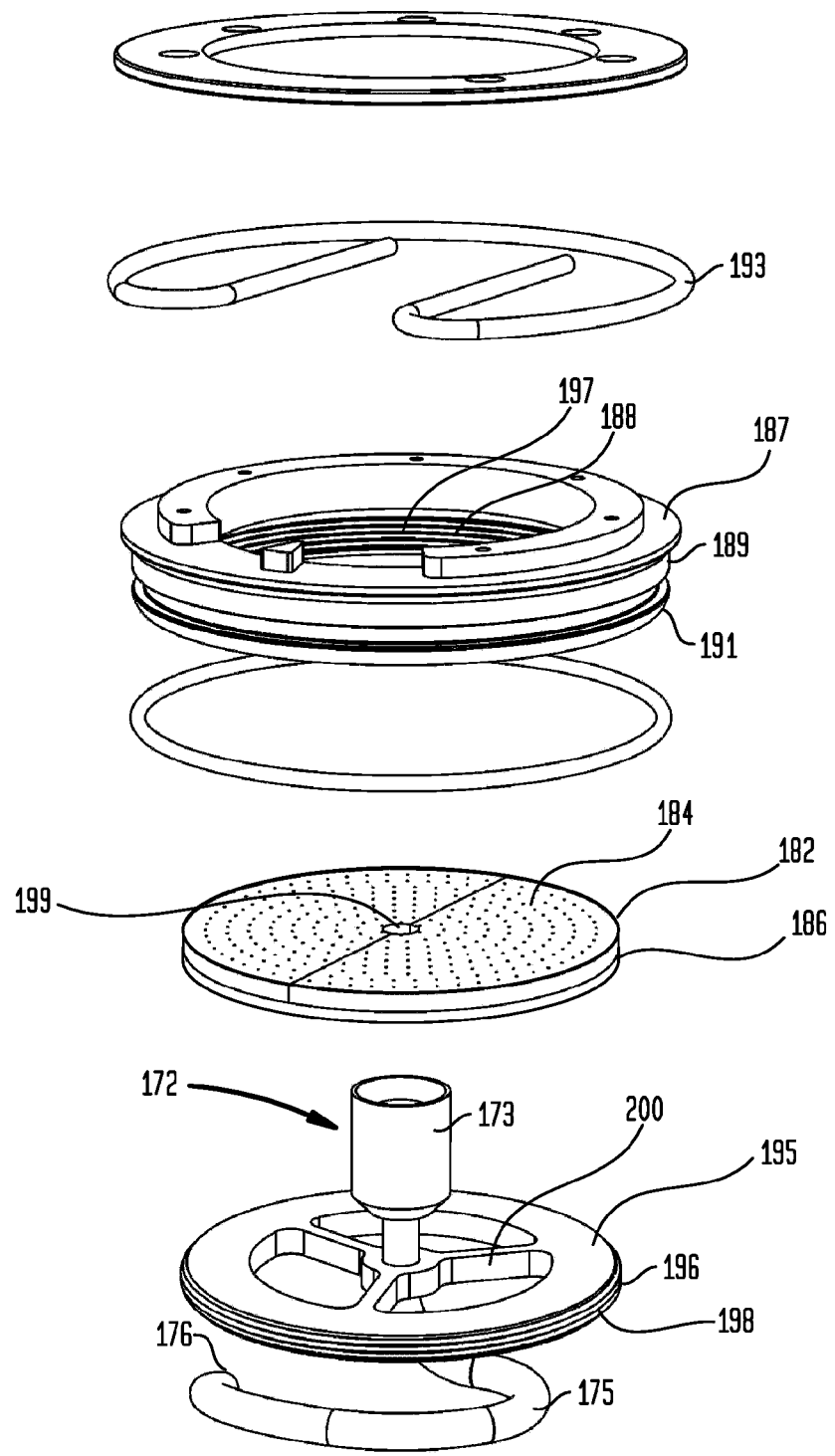
FIG. 23 is an exploded view of a particular embodiment of a first porous end assembly.
Figure 24:
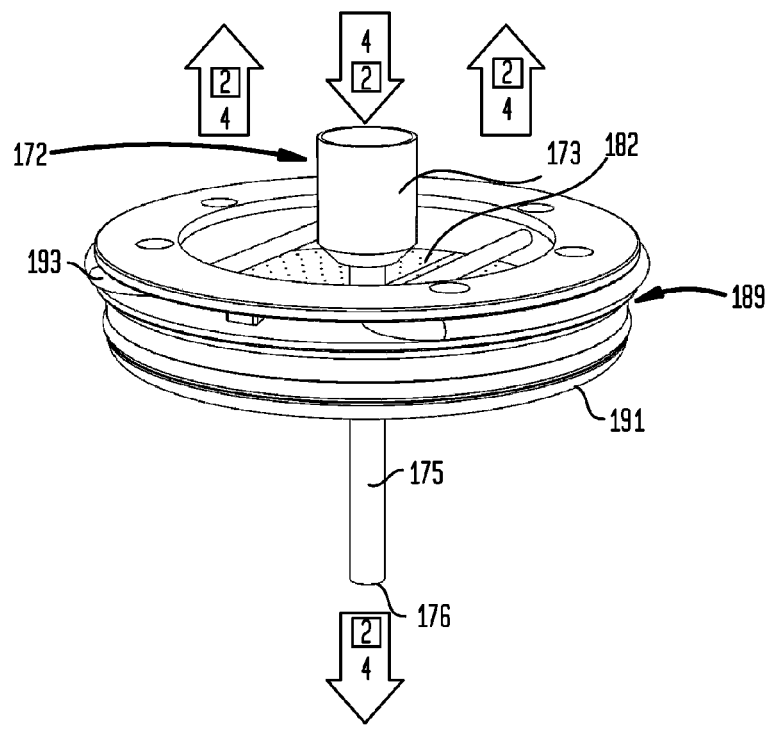
FIG. 24 is perspective view of a particular embodiment of a first porous end assembly having a generally linear inlet extension conduit.
Figure 25:
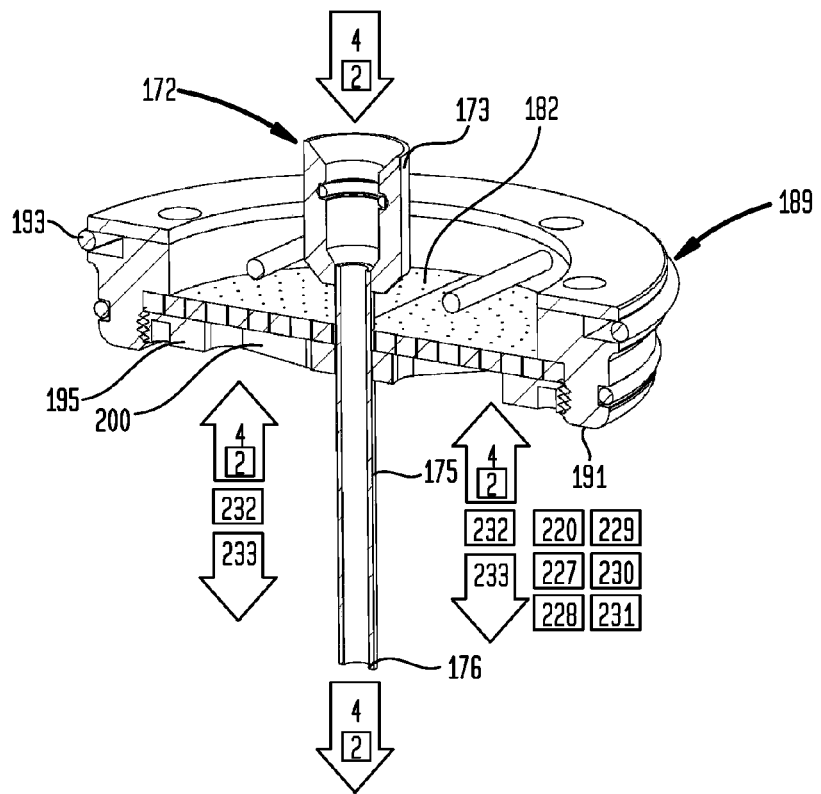
FIG. 25 is cross-sectional view 25-25 of the particular embodiment of the first porous end assembly having a generally linear inlet extension conduit shown in FIG. 24.
Figure 26:
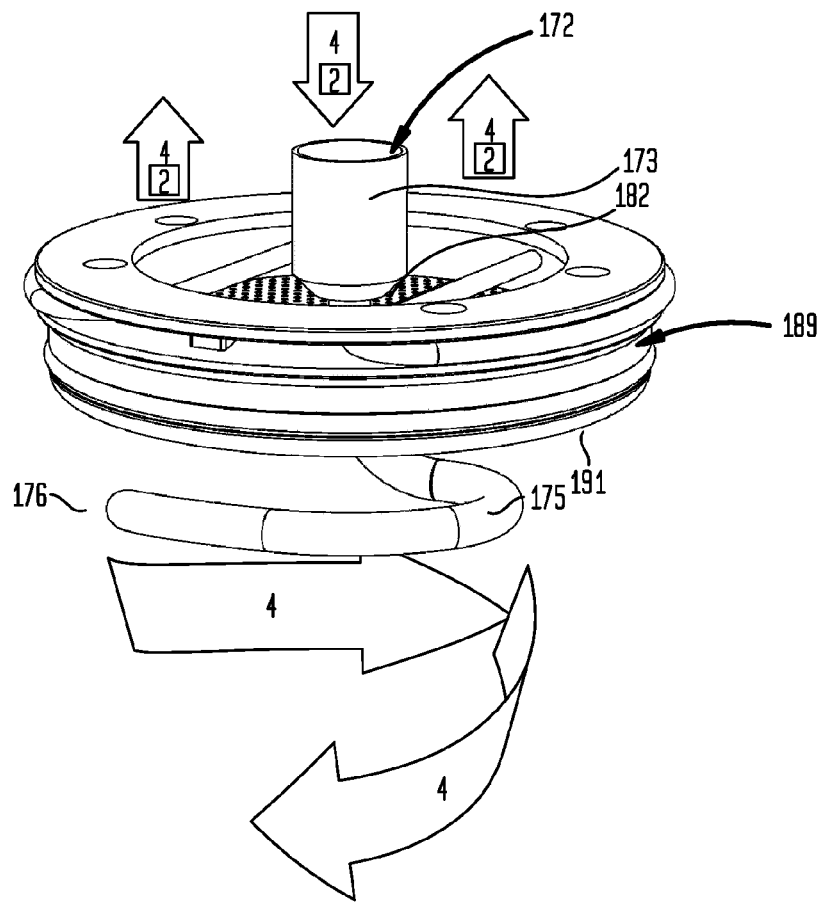
FIG. 26 is a perspective view of a particular embodiment of a first porous end assembly having an arcuate inlet extension conduit.
Figure 27:
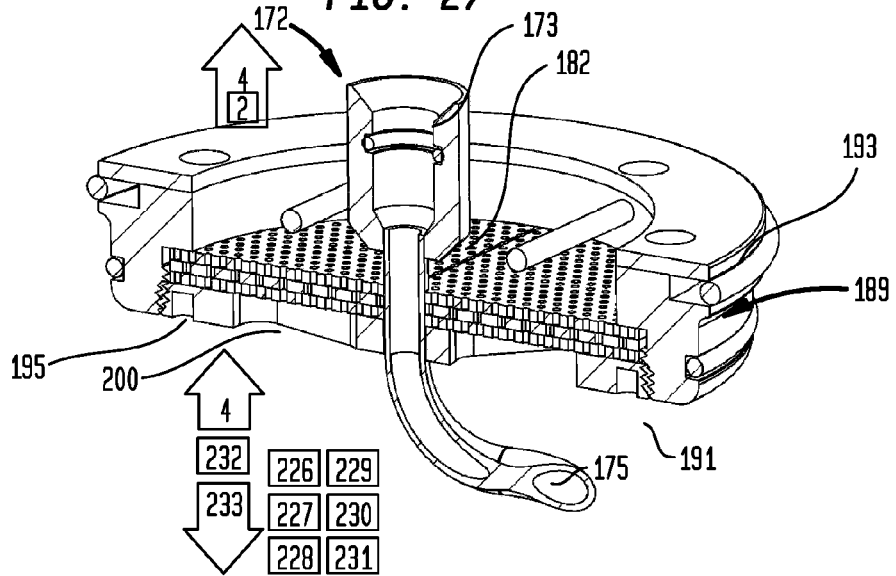
FIG. 27 is cross-sectional view 27-27 of the particular embodiment of the first porous end assembly having an arcuate inlet extension conduit shown in FIG. 26.
Figure 28:
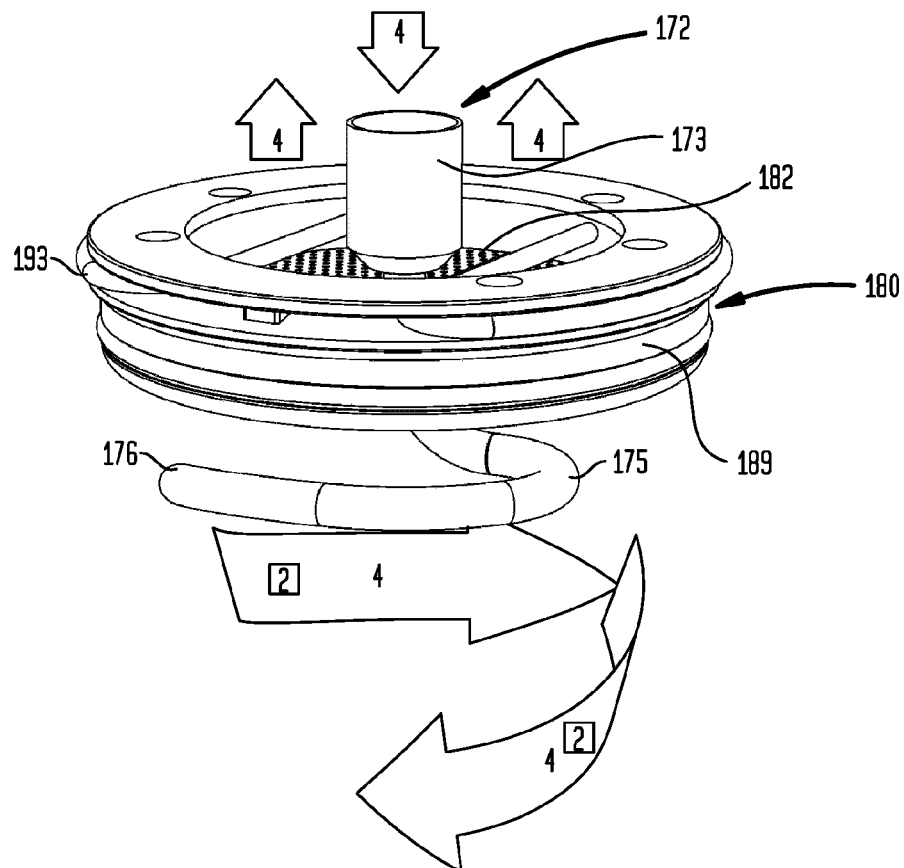
FIG. 28 is a perspective view of a particular embodiment of a first porous end assembly having an arcuate inlet extension conduit and a selective flow barrier.
Figure 29:
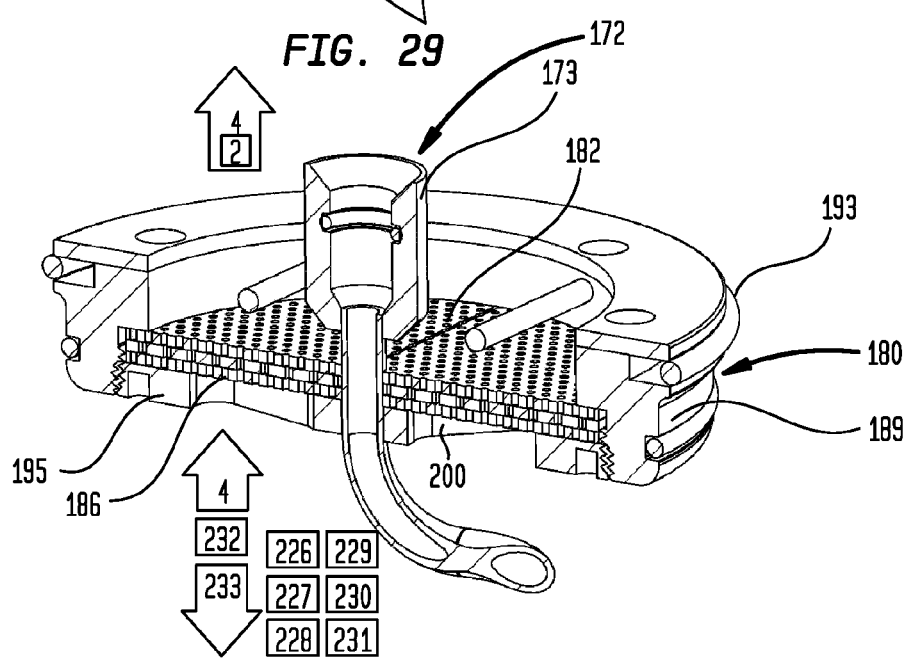
FIG. 29 is cross-sectional view 29-29 of the particular embodiment of the first porous end assembly having an arcuate inlet extension conduit and a selective flow barrier shown in FIG. 28.
Figure 30:
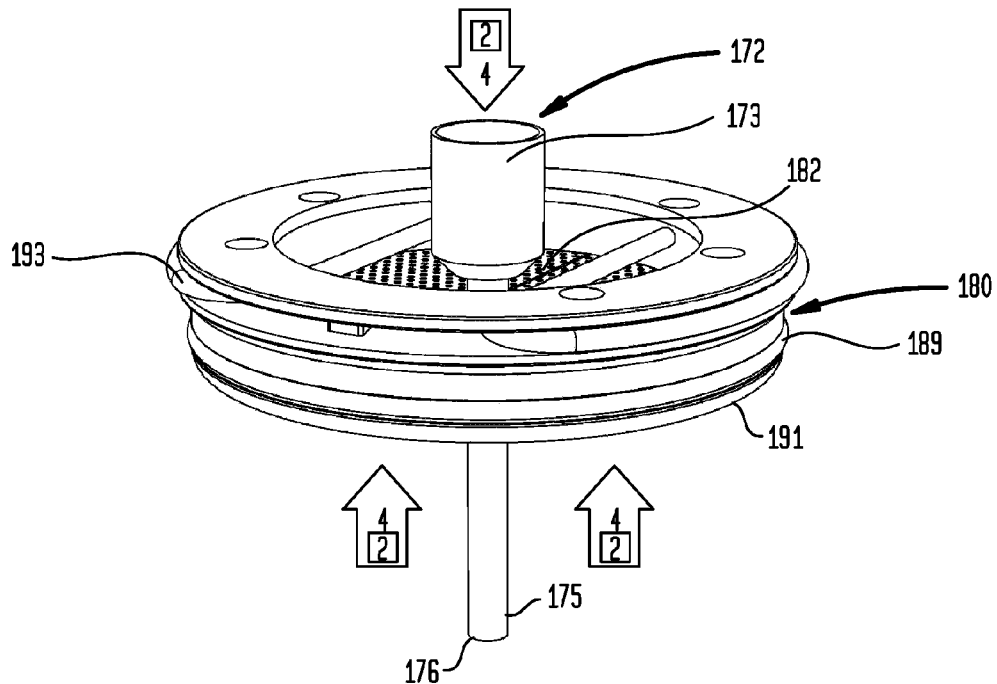
FIG. 30 is perspective view of a particular embodiment of a first porous end assembly having a generally linear inlet extension conduit and a selective flow barrier.
Figure 31:
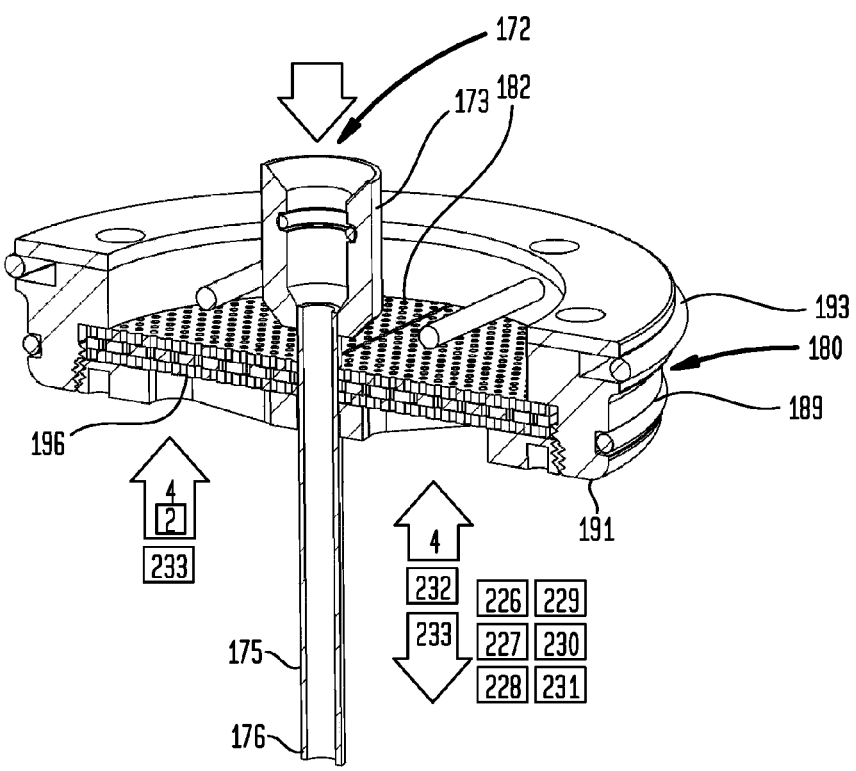
FIG. 31 is a cross-sectional view 31-31 of the particular embodiment of the first porous end assembly having a generally linear inlet extension conduit and a selective flow barrier shown in FIG. 30.
Figure 32:
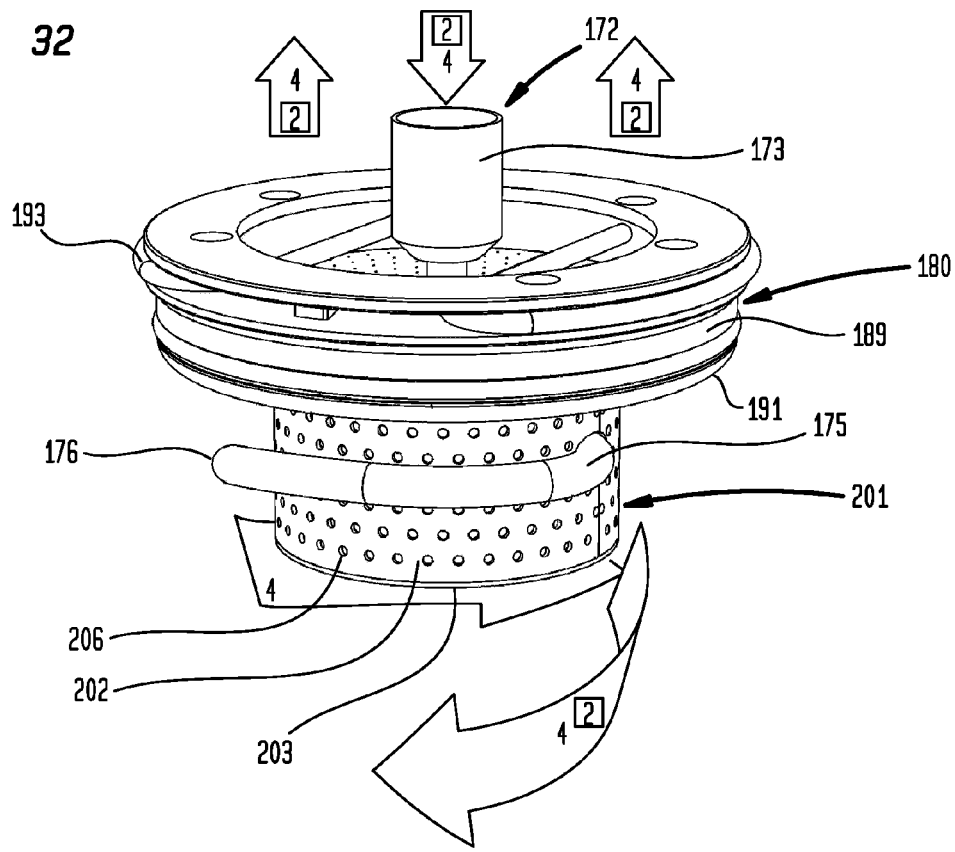
FIG. 32 is a perspective view of a particular embodiment of a first porous end assembly having an arcuate inlet extension conduit and a perforated tubular member.
Figure 33:
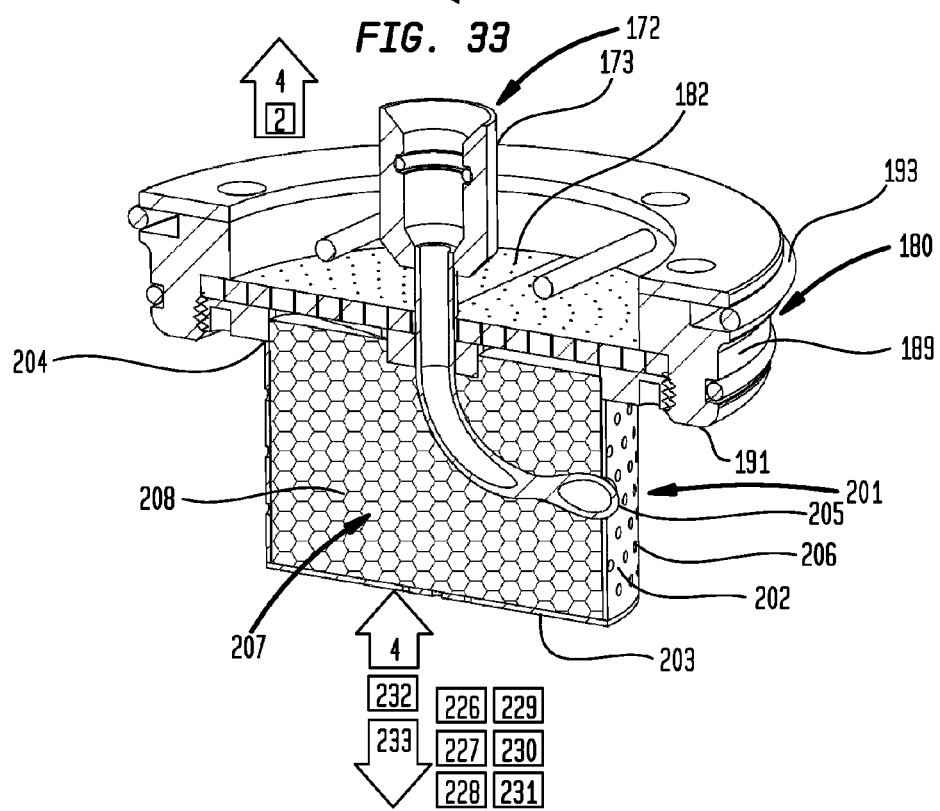
FIG. 33 is cross-sectional view 33-33 of a particular embodiment of a first porous end assembly having an arcuate inlet extension conduit and a perforated tubular member shown in FIG. 32.
Figure 34:
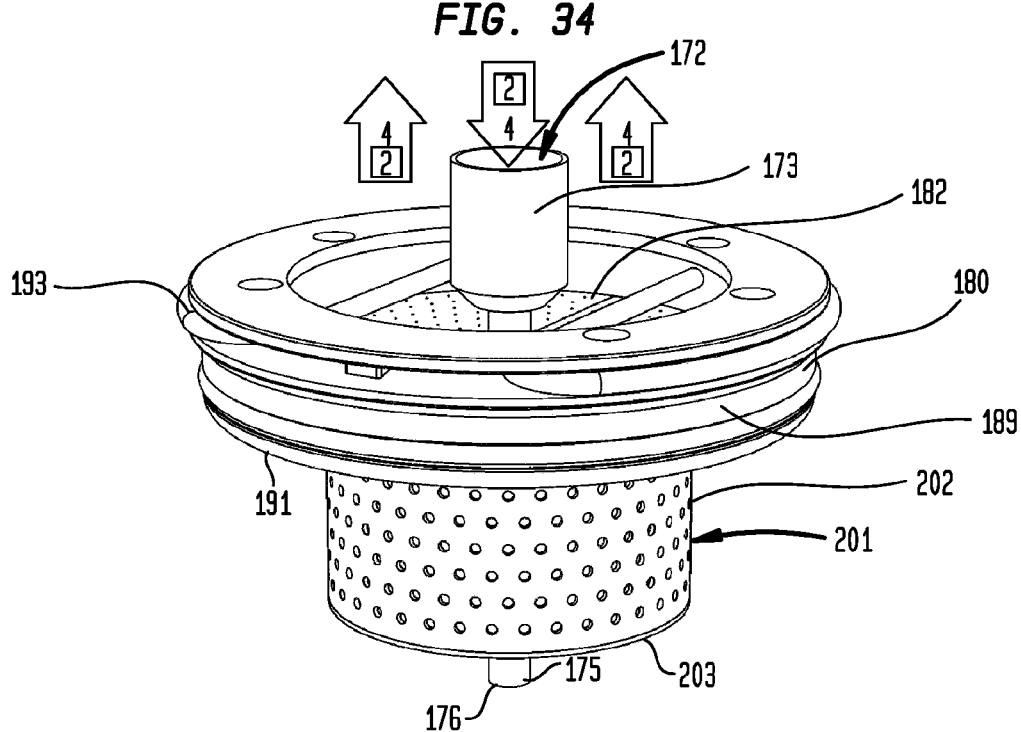
FIG. 34 is a perspective view of a particular embodiment of a first porous end assembly having a generally linear inlet extension conduit and a perforated tubular member.
Figure 35:
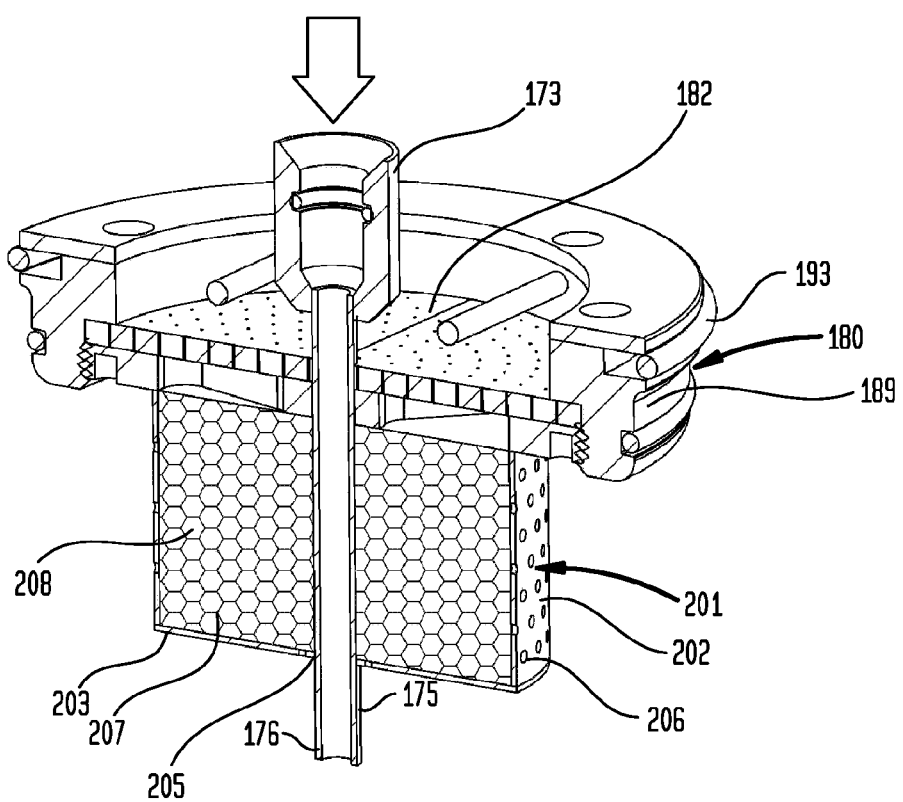
FIG. 35 is a cross-sectional view 35-35 of a particular embodiment of a first porous end assembly having an arcuate inlet extension conduit and a perforated tubular member shown in FIG. 34.
Figure 36:
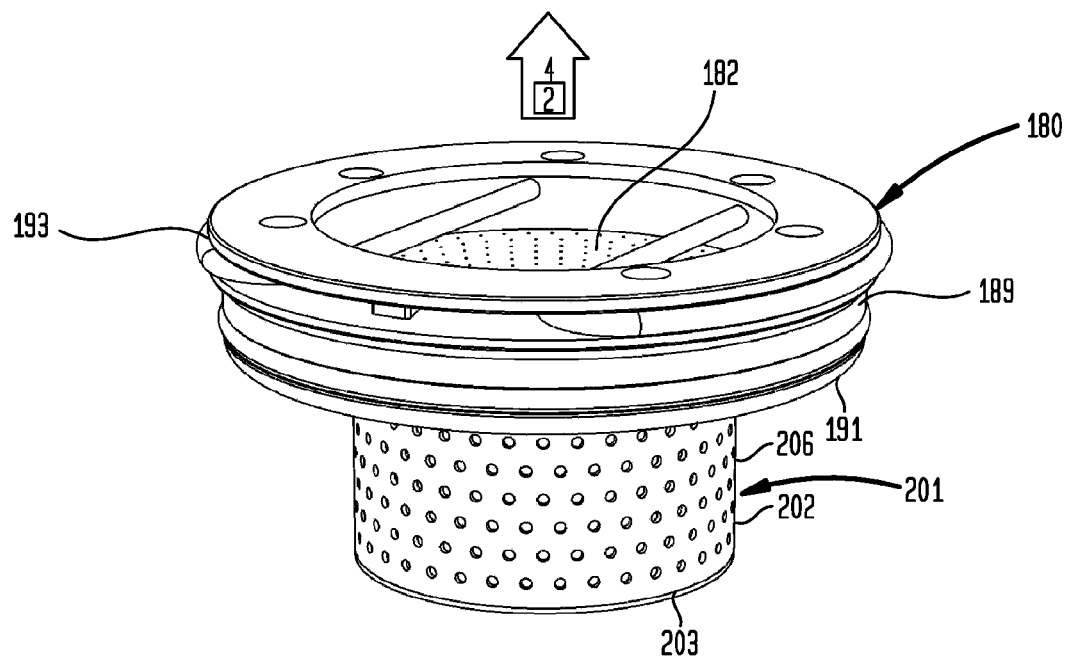
FIG. 36 is a perspective view of a particular embodiment of a first porous end assembly having a perforated tubular member.
Figure 37:
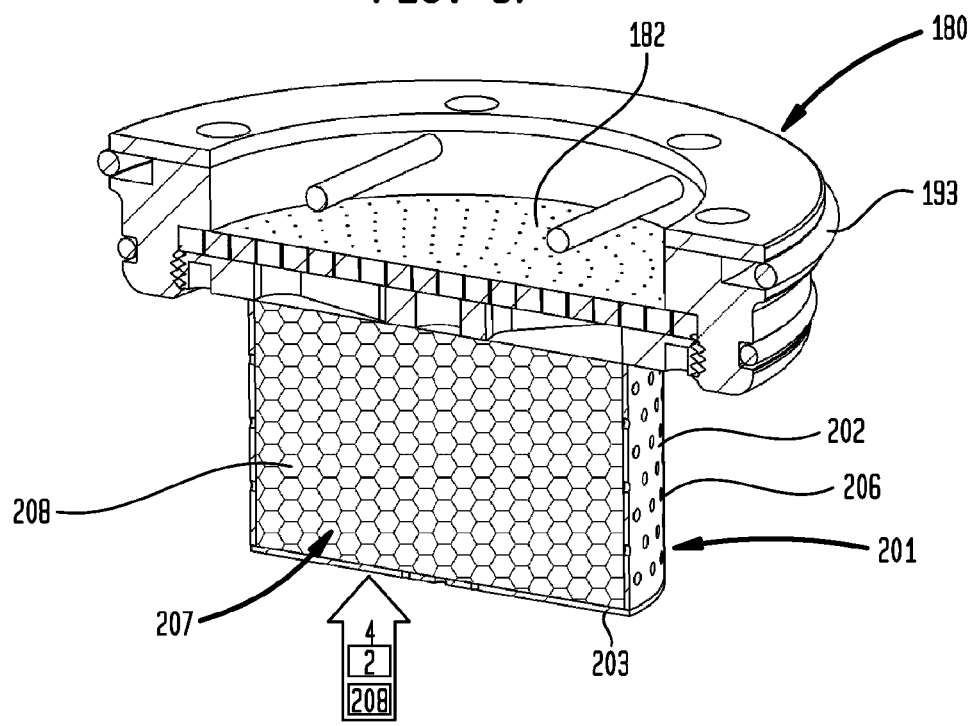

As shown in the example of FIG. 22, the separator vessel internal surface (139) can provide an annular shoulder (190) which can correspondingly engage a portion of the annular sealing element first face (191). The separator vessel internal surface (139) can be further provide an annular groove (192) in which a corresponding portion of a frit retaining clip (193) removably inserts to dispose the frit retaining clip (193) against an annular sealing element second face (194) of the annular sealing element (187) to fix the axial location of the annular sealing element (187) in the separator chamber (140).

Now referring primarily to FIGS. 22 through 37, embodiments can further include, an annular support member (195) which mateably secures to the inner periphery (188) of the annular sealing element (187). In particular embodiments, the annular support member (195) can, but need not necessarily, support or secure the first or second frit (182)(183) in sealably fitted engagement with the annular sealing element (187). As shown in the illustrative example of Figure, the inner periphery (188) of the annular sealing element (187) and the outer periphery (196) of the annular support member (195) can include rotatably mateable spiral threads (197)(198). However, this example is not intended to preclude other embodiments of securing the annular support member (195) with the annular sealing element (187), such as, interference fit.

Now referring primarily to FIGS. 24 through 31, embodiments which include both a first porous end assembly (180) and an inlet extension conduit (172), the first frit (182) can include a centrally located frit aperture (199) through which the extension conduit (175) passes and one or more radial support members (200) radially inwardly extend from the annular support member (195) and fixedly support the inlet extension conduit (175) within the frit aperture (199).

Now referring primarily to FIGS. 32 through 37, embodiments, can but need not necessarily, include a perforated tubular member (201) having tubular member side wall (202) disposed between a closed end (203) and an open-end periphery (204) sealably engaged to the annular support member (195). The first porous end assembly (180) fitted proximate the separator vessel first end (141) disposes the perforated tubular member (201) inside of the separator chamber (140) of the separator vessel (133). In embodiments which include both a perforated tubular member (201) and an inlet extension conduit (172), the perforated tubular member (201) can include a centrally located closed end aperture (205) through which the extension conduit (175) passes. Perforations in the perforated tubular member can be disposed in only the closed end (203) or only in the tubular member side wall (202), or in both. The perforations (206) can be between about 1 micrometer ("µm") to about 200 µm (or greater or lesser depending upon the application). In particular embodiments, a capture material (207) can be disposed in the perforated tubular member (201), including or consisting of: functionalized or non-functionalized silica, glass, plastic, metal beads, normal or reverse phase silica, non-silica aerogels, hydrogels, nitrocellulose, latex, or magnetic microspheres, or the like, or combinations thereof. The extractant (5) can flow through the capture material (207) and depending upon the capture material (207) one or a mixture of chemical moieties (208) can be fixedly or removably fixedly captured by the capture material (207). The functional moieties (208) on the capture material (207) can, as illustrative examples, include or consist of: a hydroxyl, an amines, a carboxylic acid, an aliphatic chain of one to about 18 carbon atoms, or combinations thereof.

Now referring primarily to FIGS. 18 through 21 and 43, particular embodiments of the separator (132) can, but need not necessarily, include a first and second separator piston retaining assemblies (209)(210)(which engage the first and second separator pistons (150)(151) to maintain sealed engagement of the first and second separator pistons (150)(151) with the corresponding first and second terminal portion internal surfaces (148)(149) of the separator vessel (133) under normal operating conditions. The first and second separator piston retaining assemblies (209)(210) can have a configuration and components substantially as described for the first and second extractor piston retaining assemblies (58)(74) and substantially operate as above described to substantially eliminate movement of the first and second separator pistons (150)(151) sealably engaged with the first and second terminal portion internal surfaces (148)(149) when the pressure within the separation chamber (133) falls within the range of about zero psi and about 20,000 psi.

Figure 14:
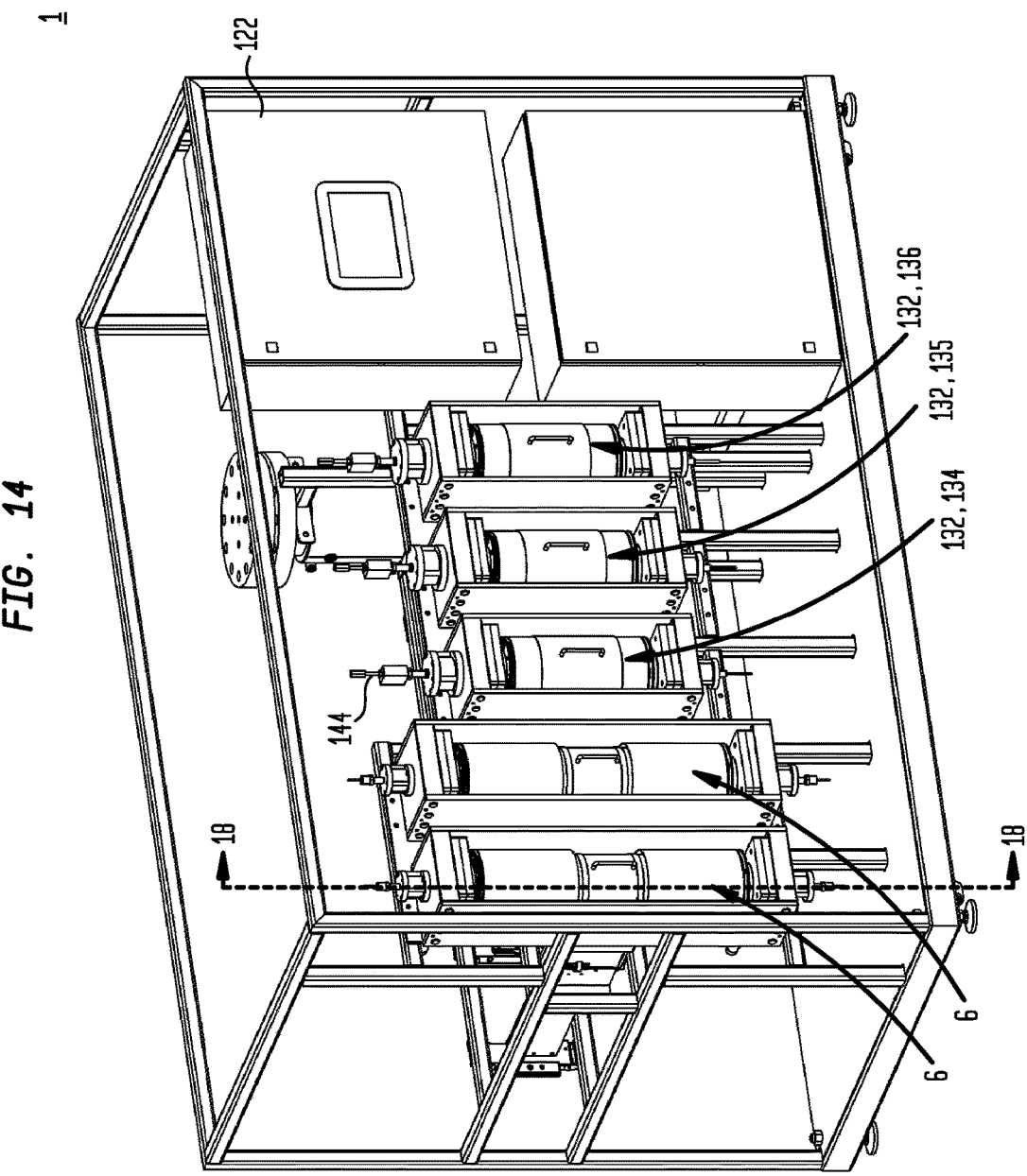
FIG. 14 is a left front side perspective view of an embodiment of separator system having a first separator vessel in a first position having the longitudinal axis in a substantially vertical orientation.
Figure 15:
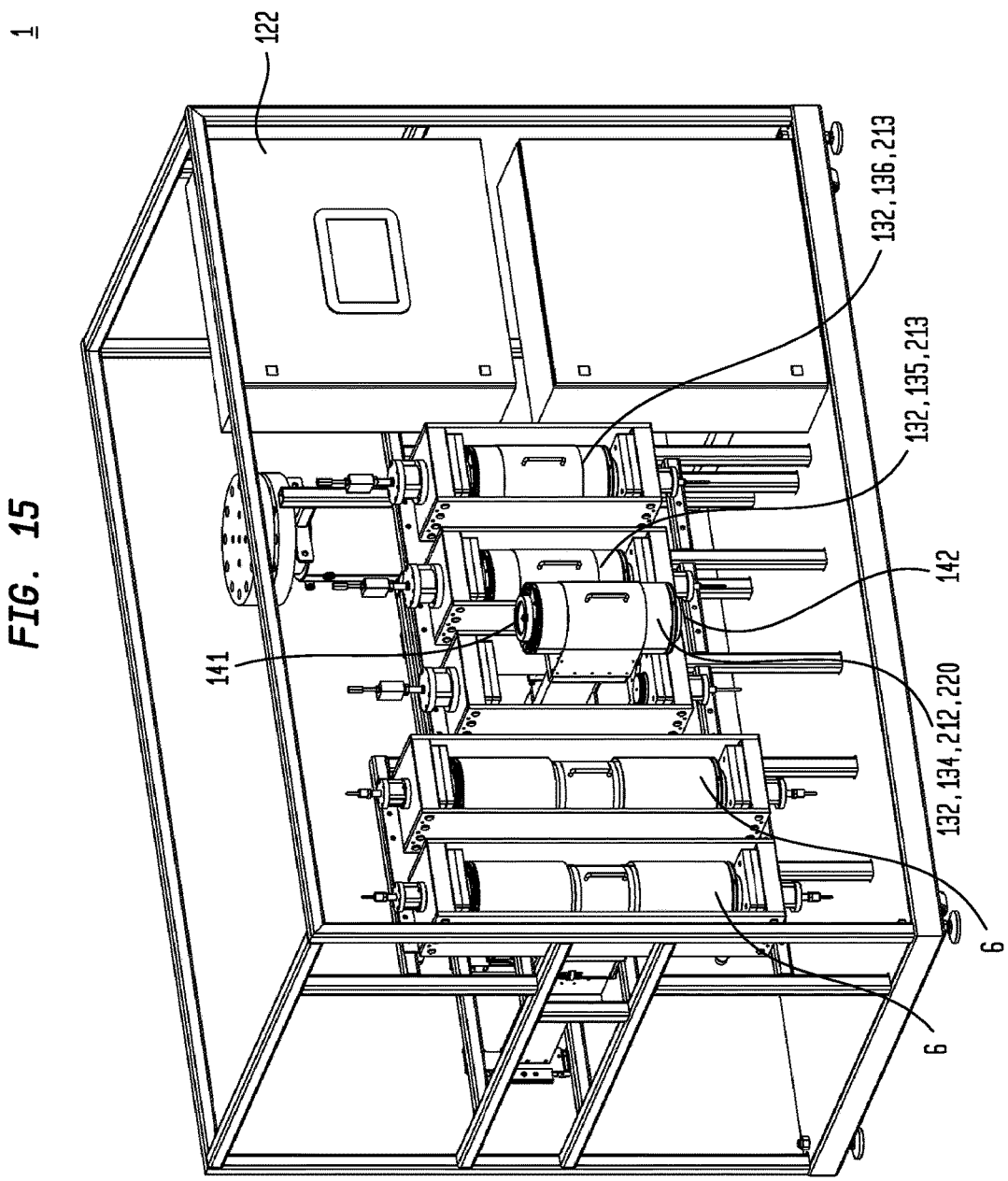
FIG. 15 is a left front side perspective view of an embodiment of the separator system having the first separator vessel in a second position having the longitudinal axis in a substantially vertical orientation.
Figure 16:
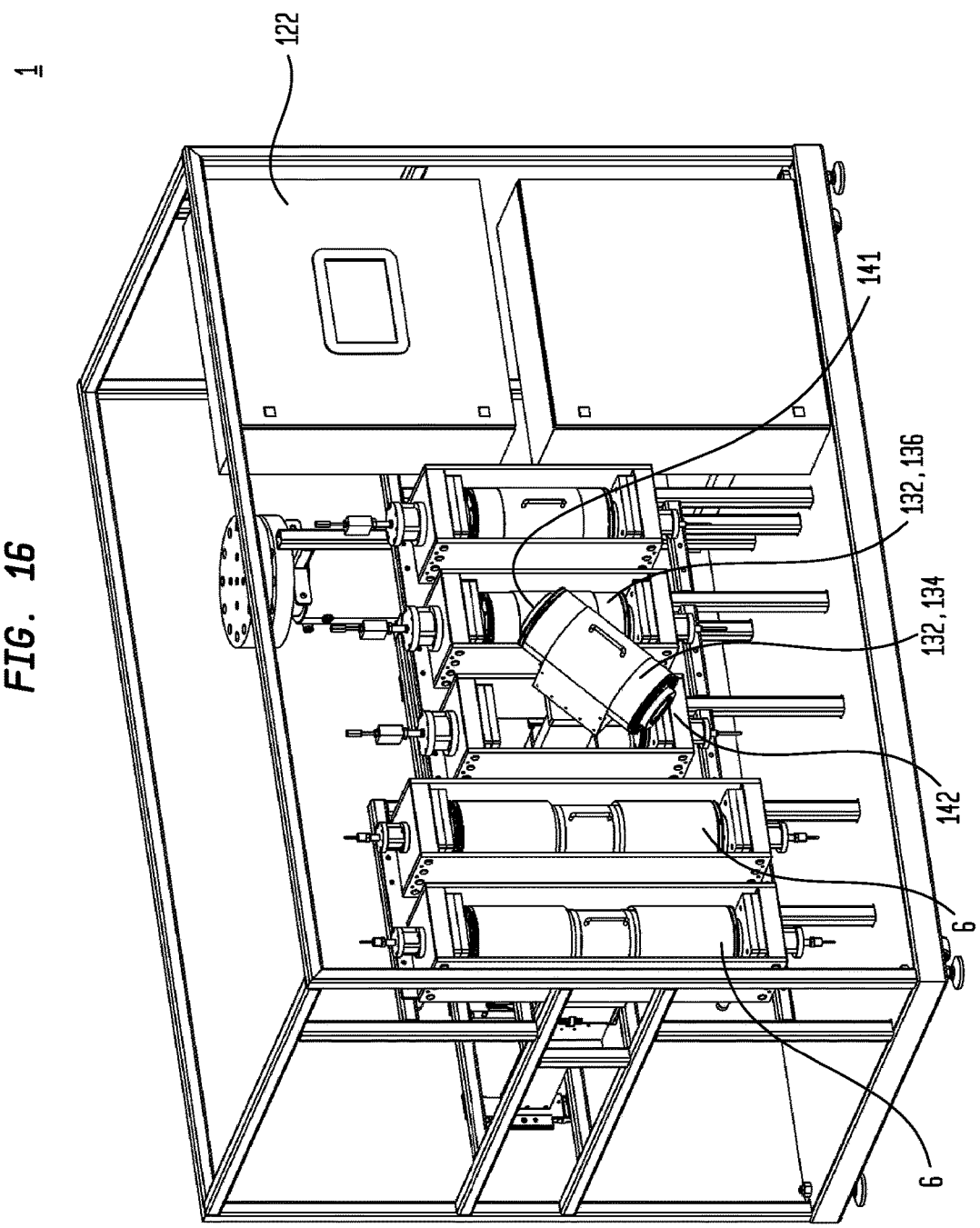
FIG. 16 is a left front side perspective view of an embodiment of the separator system having a first separator vessel in a second position rotated about a separator vessel rotation element axis.
Figure 18:
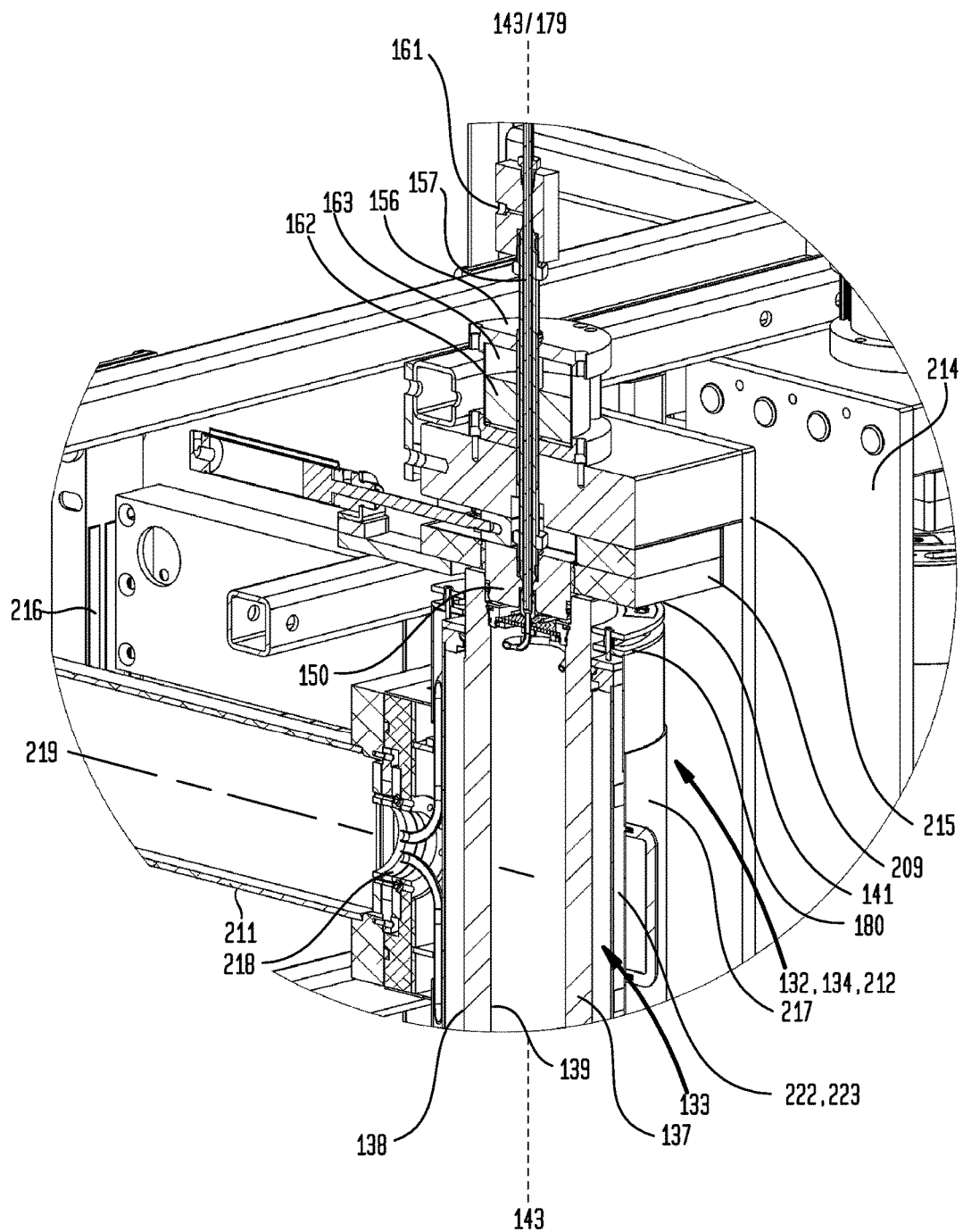
FIG. 18 is an enlarged cross-section view 18-18 of a portion of the separator system shown in FIG. 14 with a separator first piston sealably engaged with the internal surface of the first separator vessel at a separator first end and retained by a separator first piston retaining member.
Figure 19:
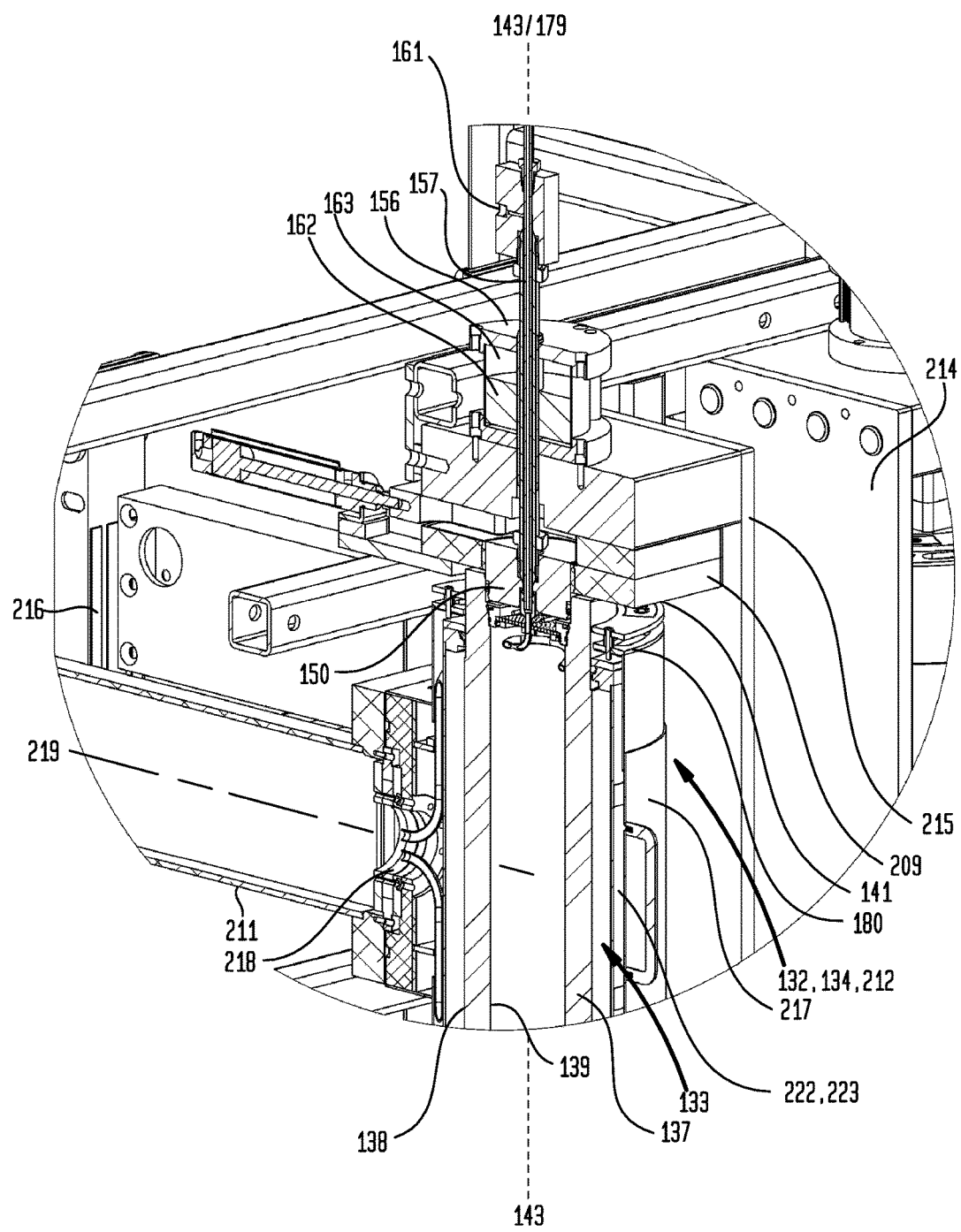
FIG. 19 is an enlarged cross-section view 18-18 of a portion of the separator system shown in FIG. 14 with the separator first piston sealably engaged with the internal surface of the first separation vessel at a separator first end with the separator first piston retaining member disengage from the first piston.
Figure 20:
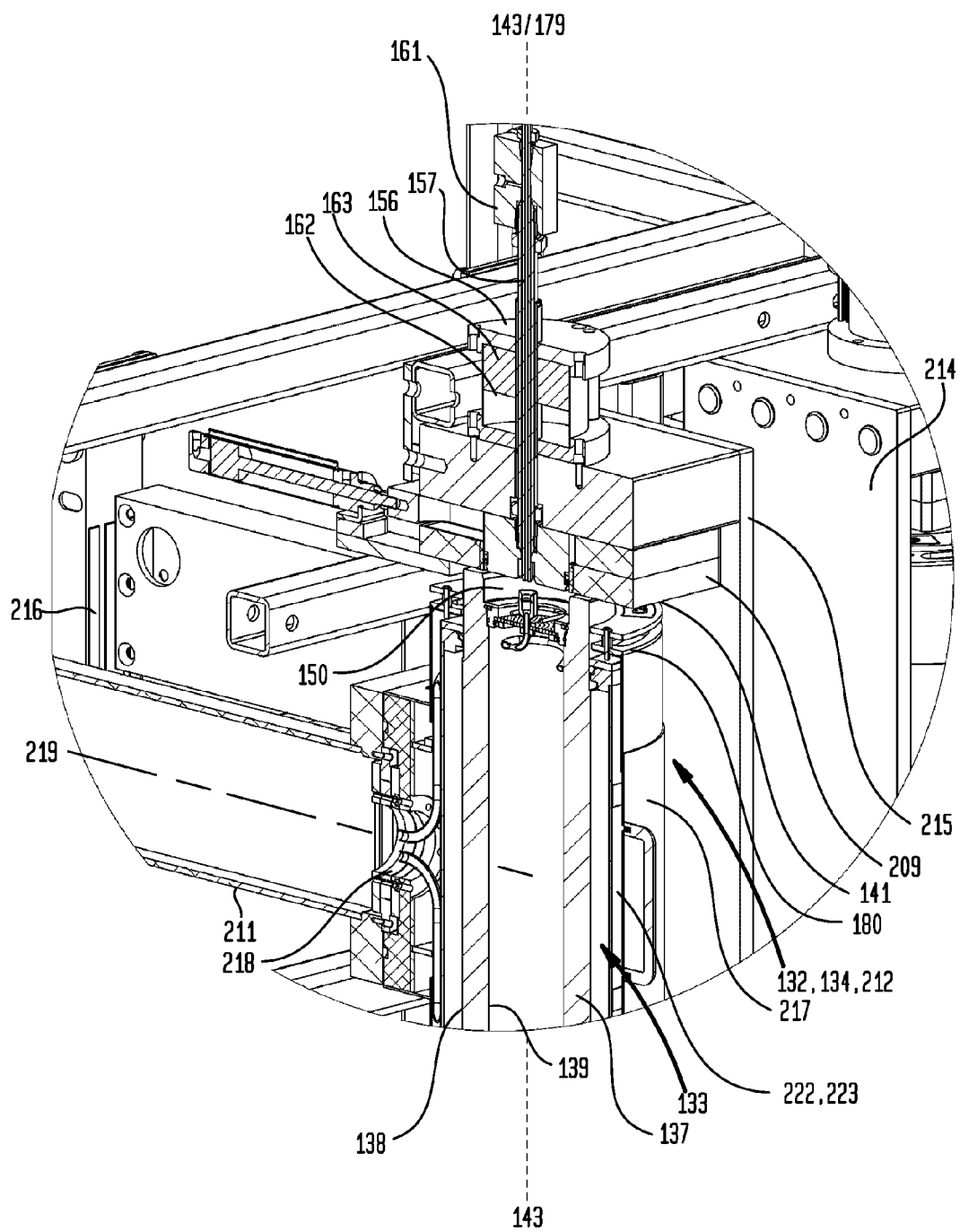
FIG. 20 is an enlarged cross-section view 18-18 of a portion of the separator system shown in FIG. 14 with the separator first piston disengaged from the internal surface of the first separation vessel at the separator first end.

Now referring primarily to FIGS. 18 through 21 and 44, embodiments can, but need not necessarily, include a separation vessel support (211) coupled to the separator vessel external surface (138). The separation vessel support (211) can be configured substantially as the above described for the extractor vessel support (107) and functions to support the separator (132) with the separator vessel first and second ends (141)(142) correspondingly adjacent the first and second separator piston retaining assemblies (209)(210) to allow corresponding sealable engagement of the first and second separator pistons (150)(151) with the first and second terminal portion internal surfaces (148)(149) of the separator vessel (133) (as shown in the example of FIGS. 14 and 18 through 19). As to particular embodiments, the separator vessel support (211) can be extended and retracted to allow corresponding movement of the separator vessel (133) from a separator vessel first position (212) at which the extraction vessel first and second ends (141)(142) are correspondingly adjacent the first and second separator piston retaining assemblies (209)(210) to allow corresponding slidable sealable engagement of the first and second separator pistons (150)(151) with the first and second terminal portion internal surfaces (148)(149) of the separator vessel (133) (as shown in the example of FIG. 14) to a separation vessel second position (213) a sufficient distance from the separator connecting members (214)(215) to allow access to a separator vessel chamber (140) (as shown in the example of FIG. 15).

Figure 21:
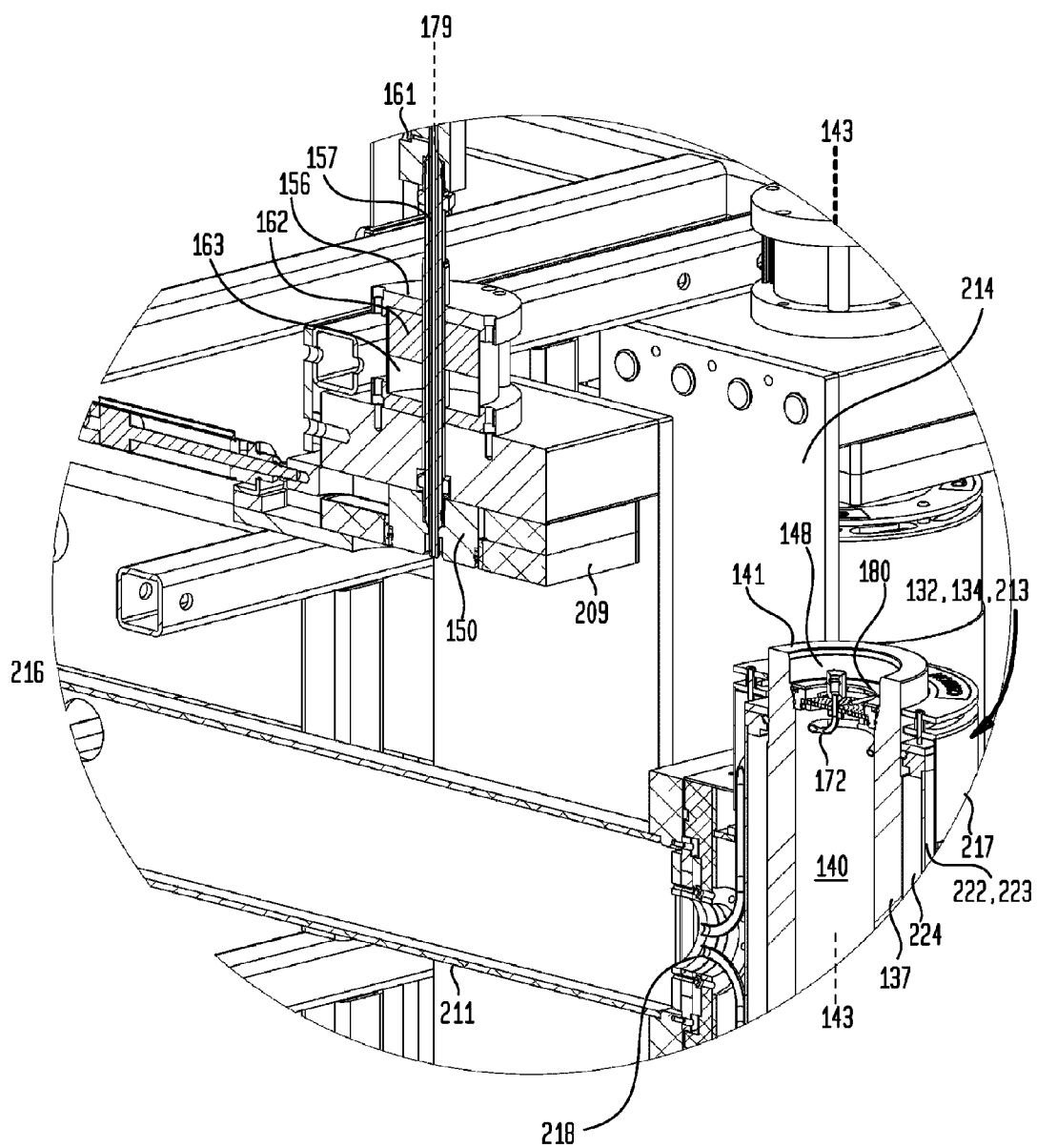
FIG. 21 is an enlarged cross-section view 18-18 of a portion of the separator system shown in FIG. 14 with the separator first piston disengaged from the internal surface of the first separation vessel at the separator first end and the separator vessel moved to the extraction vessel second position.
Figure 44:
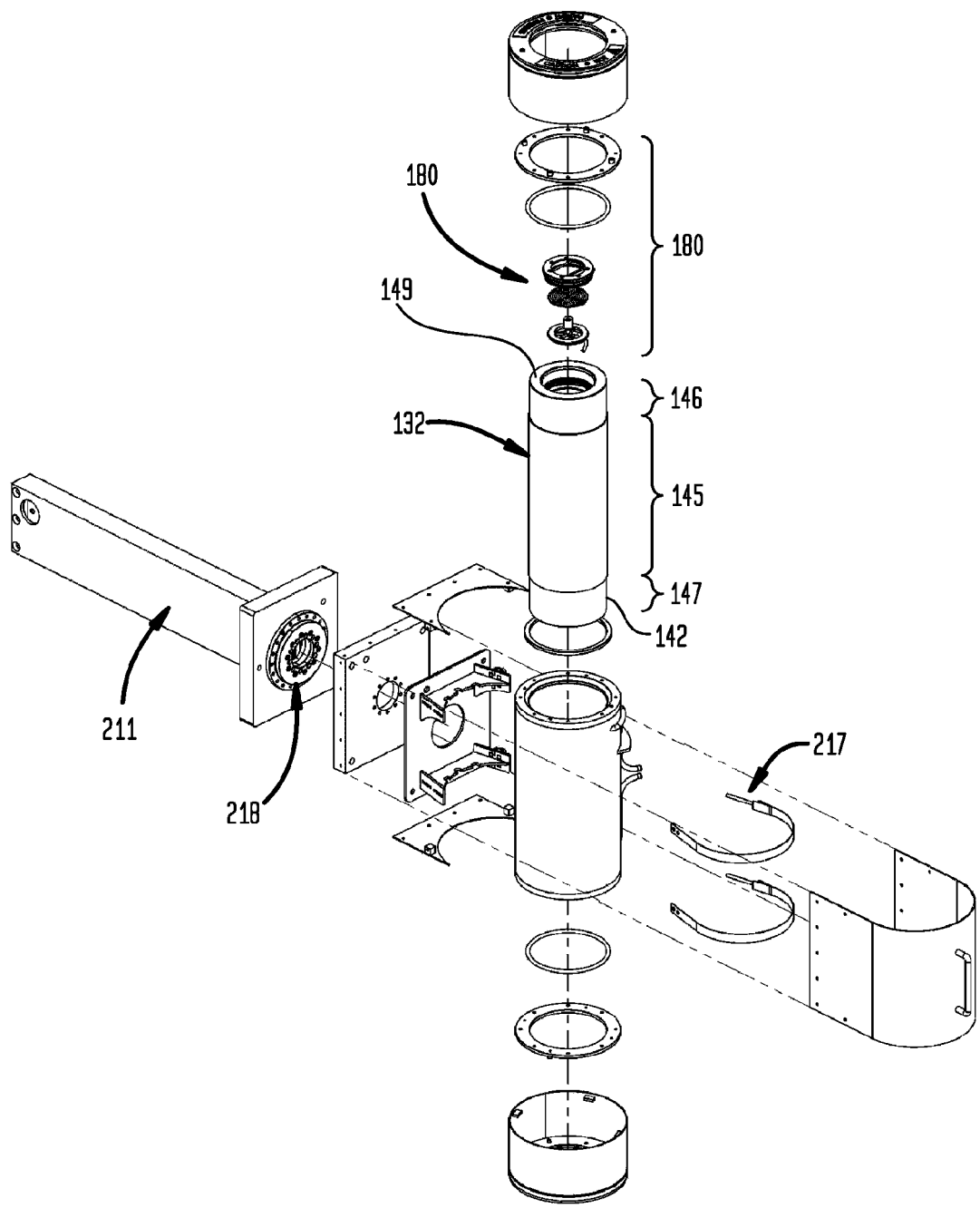
FIG. 44 is an exploded view of a portion of a separator assembly shown in FIG. 14 including the separator vessel, separator first and second porous end assemblies, separator extraction vessel housing, and separator vessel support.

Again, referring primarily to FIGS. 18, 21 and 44, embodiments of the separator vessel support (211) can, but need not necessarily, further include a separator vessel support actuator (216) operable to move the separator vessel (133) toward the separator vessel first position (213). As to particular embodiments, the separator vessel support actuator (216) can be in substantially the same configuration as the extraction vessel support (107) and operate substantially as above described.

Now referring primarily to FIG. 44, in particular embodiments, a separator vessel housing (217) can surround the separator vessel external surface (138) to insulate the extraction vessel (133) and provide the user with a contact and gripping surface which remains substantially at ambient temperature.

Figure 17:
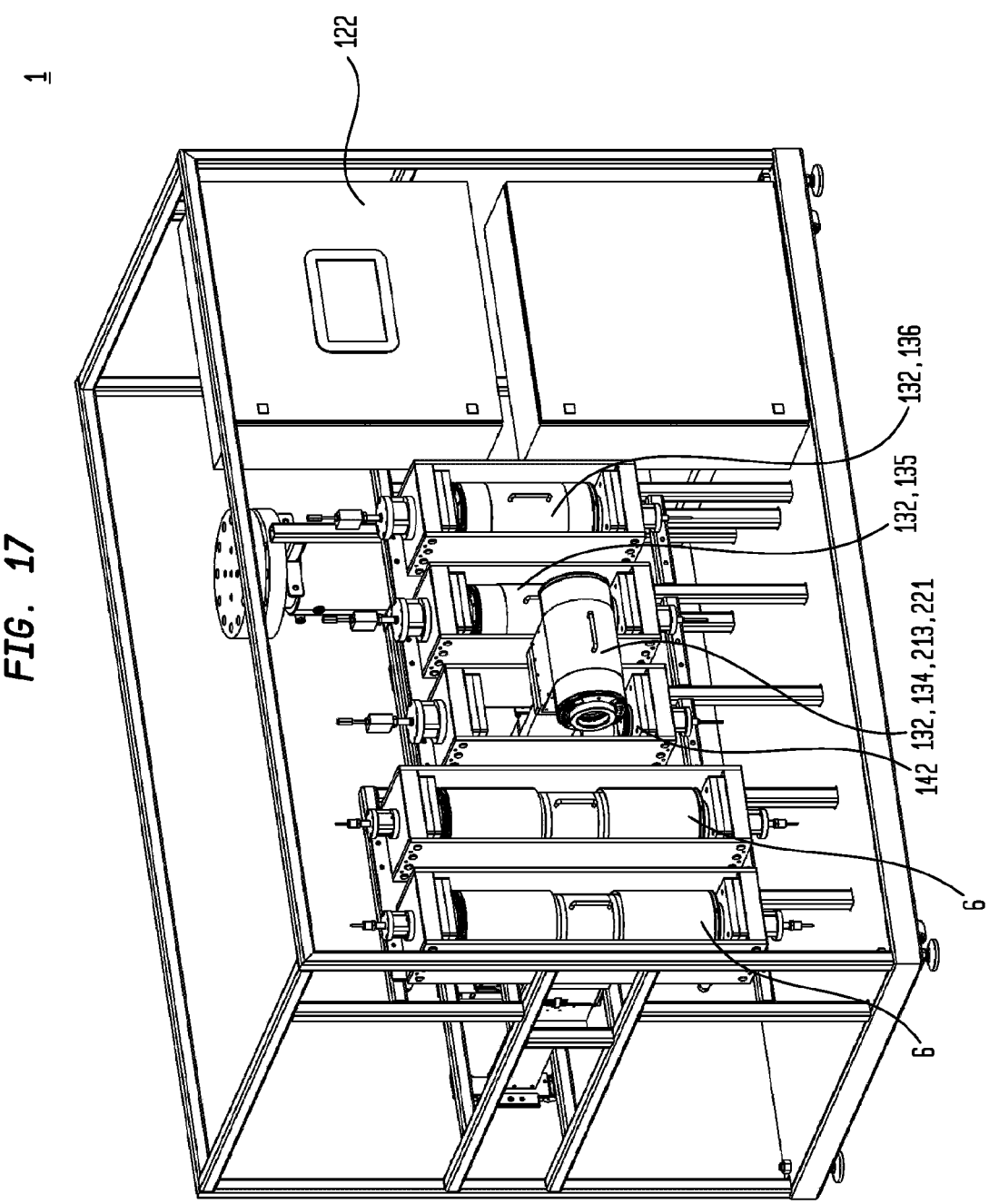
FIG. 17 is a left front side perspective view of an embodiment of the separator system having a first separator vessel in a second position having the longitudinal axis in a substantially horizontal orientation.

Now referring primarily to FIGS. 18 and 44, embodiments of the separator vessel support (211) can, but need not necessarily, further include a separator vessel rotation element (218) coupled to the separator vessel (133). The extraction vessel rotation element (218) allows the separator vessel (133) disposed in the second position (213), as above described, to rotate about a separator vessel rotation element axis (219) to correspondingly rotate the separator vessel longitudinal axis (143) of the separator vessel (133) between a generally vertical orientation (220) (as shown in the example of FIG. 14) and a generally horizontal orientation (221) (as shown in the example of FIG. 17).

Now referring primarily to FIGS. 18 through 22 and 44, a separator heat source (222) can be coupled to the extraction vessel external surface (138) to control the temperature of the separator vessel (133) and the corresponding amount of extractant (4) flowing through the separation chamber (140) of an extraction vessel (133) within a temperature range of between about 5° C. to about 150° C. While the Figures show a plurality of heat bands coupled in spaced apart relation to the extraction vessel external surface (138), or a single continuous band along the entire length or a portion of the length of the extraction vessel external surface (138), depending upon the thermal transfer properties of the material used for the extraction vessel (6) or the separator vessel (133), in particular embodiments, the corresponding heat source (119)(222) as to the extractor vessel (6) or the separator vessel (133) can, but need not necessarily, comprise a fluid passing over a portion of the external surface of the extractor vessel (6) or separator vessel (133). In particular embodiments, a jacket (223)(as shown in the example of FIGS. 18 through 22) can be coupled to the separator vessel external surface (138) or extractor vessel external surface (14). The jacket (223) defines a jacket flow path (224) through which a fluid (225)(whether a liquid or a gas or combination thereof) can flow to regulate temperature (226) of the extractor or separator vessel side wall (13)(137) and correspondingly regulate temperature (226) of the extractant (4) within the separator chamber (140) or extractant (4) or extract fraction (185).

As above described, the heat source (119) can be coupled to a temperature adjustment element (120) which can monitor temperature of an amount of extractant (4) in the separator chamber (140) to allow continuous adjustment of the temperature to maintain pre-selected fractionation conditions (227) of the extractant (4) in the separator chamber (140). The temperature adjustment element (120) can maintain a preselected temperature (227) or a preselected temperature profile (228) (preselected temperature (227) change over a period of time) during an operating cycle of the one or more separators (132).

The temperature (226)(227) of the extractant (4) in the separator chamber (140) can be selected from the group of temperature ranges comprising or consisting of: about 5° C. to about 15° C., about 10° C. to about 20° C., about 15° C. to about 25° C., about 20° C. to about 30° C., about 25° C. to about 35° C., about 30° C. to about 40° C., about 35° C. to about 45° C., about 40° C. to about 50° C., about 55° C. to about 65° C., about 60° C. to about 70° C., about 65° C. to about 75° C., about 70° C. to about 80° C., about 75° C. to about 85° C., about 80° C. to about 90° C., about 85° C. to about 95° C., about 90° C. to about 100° C., about 95° C. to about 105° C., about 100° C. to about 110° C., about 105° C. to about 115° C., about 110° C. to about 120° C., about 115° C. to about 125° C., about 120° C. to about 130° C., about 125° C. to about 135° C., about 130° C. to about 145° C., about 140° C. to about 155° C., or combinations thereof over a period of time.

Now referring primarily to FIG. 6, the fluid flow generator (44) can regulate the pressure of the extractant (4) inside of the separator chamber (140) in range of between about 500 psi (about 55 bar) to about 20,000 psi (about 1380 bar). The fluid flow generator (44) can coupled to a pressure monitor (121) which monitors the pressure inside the separator chamber (140) to allow continuous adjustment of the pressure (229) to maintain pre-selected pressures (230) or pre-selected pressure profiles (231) to generate pre-selected fractionation conditions (232)(temperature (227) or pressure (229) or both) inside of each separator chamber (140). The pressure of the extractant (4) in the separator chamber (140) can be selected from the group of pressure ranges including or consisting of: about 500 psi to about 1500 psi, 1000 psi to about 2000 psi, about 1500 psi to about 2500 psi, about 2000 psi to about 3000 psi, about 2500 psi to about 3500 psi, about 3000 psi to about 4000 psi, about 3500 psi to about 4500 psi, about 4000 psi to about 5000 psi, about 5500 psi to about 6500 psi, about 6000 psi to about 7000 psi, about 6500 psi to about 7500 psi, about 7000 psi to about 8000 psi, about 7500 psi to about 8500 psi, about 8000 psi to about 9000 psi, about 8500 psi to about 9500 psi, about 9000 psi to about 10,000 psi, about 9500 psi to about 10,500 psi, about 10,000 psi to about 11,000 psi, about 10,500 psi to about 11,500 psi, about 11,000 psi to about 12,000 psi, about 11,500 psi to about 12,500 psi, about 12,000 psi to about 13,000 psi, about 12,500 psi to about 13,500 psi, about 13,000 psi to about 14,000 psi, about 13,500 psi to about 14,500 psi, about 14,000 psi to about 15,000 psi, about 14,500 psi to about 15,500 psi, about 15,000 psi to about 15,500 psi, about 15,500 psi to about 16,500 psi, about 16,000 psi to about 17,000 psi, about 16,500 psi to about 17,500 psi, about 17,000 psi to about 18,000 psi, about 17,500 psi to about 18,500 psi, about 18,000 psi to about 19,000 psi, about 18,500 psi to about 19,500 psi, and about 19,000 psi to about 20,000 psi, or combinations thereof over a period of time.

Now referring primarily to FIGS. 46 through 48, as an illustrative example, the extractant (4) exiting the extractor (5) can pass through one or more separators (132) to generate or separate extract fractions (185) from the extractant (5) within the one or more separators (132). Each of the extract fractions (185) separated from the extractant (5) can become disposed proximate a corresponding separator second end (142) and can egress through the corresponding separator second piston outlet port (171). Each of the extract fractions (185) can include one or more extracts (2) depending on the temperature (226) or pressure (229)(or combinations of temperature (226) and pressure (229)) within the separator chamber (140). Accordingly, an extractant (4) which passes serially through each of a first separator (134), a second separator (135), and a third separator (136) (or an even greater number of separator vessels (132)) can be serially relieved of a first fraction (233), a second fraction (234), and a third fraction (235) (or a greater number of extract fractions (185) corresponding to a greater number of separator vessels (132)). Each separator (132) can be configured to establish pre-selected fractionation conditions (232) in the respective separators (134)(135)(136) by adjustment of the pressure (229) or temperature (227)(or both) applied to the extractant (4). For example, pressure (229) applied to the extractant (4) can be respectively fixed at about 200 bar to about 400 bar, about 150 bar and about 300 bar, and about 75 bar to about 100 bar and at temperatures (226) respectively fixed at about 60° C. to about 110° C., about 60° C. to about 100° C. and about 40° C. to about 70° C. However, in certain the embodiments the temperature (226) can remain constant and only the pressure (229) varied between separators (132), or in certain embodiments, the pressure (229) remains constant and the temperature (226) varied between separators (132).

As above described, the system (1) can, but need not necessarily, include a programmable controller (122) operable to control the operation of one or more of a separator vessel support actuator (216), the separator first piston actuator (156), the separator second piston actuator (169), the fluid flow generator (44), a plurality of conduits and valves (123)(144) configured to allow transfer of the amount of extractant (4) into the one or more separator chambers (140) and transfer an extract fraction (185) entraining one or more extracts (2) separated from the extractant (4) away from the one or more separation chambers (140).

Now referring primarily to FIGS. 46 through 48, the extractant (4) entering the first separator (134) can be maintained at a fixed pre-selected temperature (227) in the range of about 60° C. to about 110° C. and the pressure (229) of the extractant (4) can be variably adjusted between about 200 bar and about 400 bar to achieve a density of the extractant (4), typically supercritical carbon dioxide, of between about 0.75 g/mL and about 0.85 g/mL to produce a first fraction (223). The first fraction (223) which separates out of the extractant (4) in the first separator (134) can accumulate as a solid or liquid material proximate the separator second end (142) of the first separator (134) which can be periodically removed or exits through the first separator second piston port (171). In an illustrative example in which the matrix (3) comprises corn germ, the first fraction (223) can include one or a mixture of various phosphorous containing lipids (or phospholipids) commonly referred to as lecithin. However, this example is not intended to preclude fractions (223) obtained by extraction and subsequent fractionation of any one of a wide variety of botanical materials, as described above.

Again, referring primarily to FIGS. 46 through 48, the resulting extractant (4) can, but need not necessarily, proceed from the first separator (134) into a second separator (135). The temperature (226) of the extractant (4) can be adjusted and the pressure (229) of the extractant (4) in the second separator vessel (135) can be adjusted by a downstream pressure reduction generator. Fractionation conditions (232) in the second separator (135) can, as an illustrative example, be established to provide a fixed pre-selected temperature (227)) in the range of about 60° C. to about 100° C. and a pressure (229) adjusted within range of about 150 bar to about 300 bar to achieve a density of the supercritical fluid (typically supercritical carbon dioxide) of between about 0.62 g/mL and about 0.75 g/mL. In the illustrative example of corn germ, this fractionation condition (232) can produce second fraction (234) such as a triglyceride fraction. The triglyceride fraction which separates out of the extractant (4) in the second separator (135) exits through the second separator second piston port (236). This triglyceride fraction can comprise glyceride in which the glycerol is esterified with three fatty acids.

Now referring primarily to FIGS. 46 through 48, the resulting extractant (4) can, but need not necessarily, proceed from the second separator (135) into a third separator (136). As an example, fractionation conditions (232) in the third separator (136) can be established at a fixed preselected temperature (227) in the range of about 40° C. to about 70° C. and a pressure (229) can be adjusted within the range of about 75 bar to about 100 bar to achieve a density of the supercritical fluid (typically supercritical carbon dioxide) of between about 0.1 g/mL and about 0.3 g/mL. In the example of an extractant (4) obtained from corn germ, these conditions can allow separation of a third fraction (235) such as free fatty acid (FFA) fraction from the extractant (4). The FFA fraction which separates out of the extractant (4) in the third separator (136) exits through the third separator second piston port (237). This FFA fraction comprises a carboxylic acid often with a long unbranched aliphatic tail (chain), which is either saturated or unsaturated. Carboxylic acids as short as butyric acid (4 carbon atoms) are considered to be fatty acids, while fatty acids derived from natural fats and oils may be assumed to have at least 8 carbon atoms, such as caprylic acid (octanoic acid).

Now referring primarily to FIG. 46 through, the separators (132) can, but need not necessarily, be operated with additional separator vessels (133) under the same or similar fractionation conditions (232) to re-fractionate any of separated fractions (233)(234)(235) to further isolate additional extraction material fractions, or may be operated with additional separator vessels (133) in series to isolate additional extraction material fractions, or may be operated to by-pass the first separator vessel (234) or the second separator vessel (235) or both.

Again referring to FIGS. 1 and 46 through 48, the resulting extractant (4) can, but need not necessarily, proceed from the third separator (236)(or the last separator in the series) to the carbon dioxide recycle assembly (167)(see FIG. 1) which further include a condenser which provides condensing conditions to establish the amount of carbon dioxide in a phase compatible with a pressure generator (44) which establishes and maintains the extractant (4)(such as supercritical carbon dioxide) at pressures between about 7,000 psi and about 20,000 psi in the extraction chamber (8) of one or more extractors (5).

As can be easily understood from the foregoing, the basic concepts of the present invention may be embodied in a variety of ways. The invention involves numerous and varied embodiments of an extraction or separation system (1) and methods for making and using such extraction or separation system (1) including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of an "separator" should be understood to encompass disclosure of the act of "separating"—whether explicitly discussed or not—and, conversely, were there effectively disclosure of the act of "separating", such a disclosure should be understood to encompass disclosure of an "separator" and even a "means for separating." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the extraction or separation systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A separator operable to fractionate a mixture of extracts in an extractant, comprising:
    a separator vessel having an internal surface which defines a separator chamber which communicates between open separator vessel first and second ends;
    a separator first piston adapted to sealably engage said internal surface of said separator vessel first end;
    a separator first piston retaining member;
    a separator first piston retaining member guide including a separator first guide channel in which said separator first piston retaining member moves to engage said separator first piston sealably engaged with said internal surface of said separator vessel first end;

a separator first pressure receiving plate adjacently abuttingly engaging a first side of said separator first piston retaining member guide; and a separator first end plate adjacently abuttingly engaging a second side of said separator first piston retaining member guide, said separator first end plate having a separator first piston aperture through which said separator first piston moves to sealably engage said internal surface of said separator vessel first end.

2. The separator of claim 1, further comprising:

a separator first piston retaining member removably engaging said second piston sealably engaged with said internal surface of said extraction vessel second end;

a separator second piston retaining member guide including a separator second guide channel in which said separator second piston retaining member moves to engage said separator second piston sealably engaged with said internal surface of said separator vessel second end.

3. The separator of claim 1, further comprising a separator second piston adapted to sealably engage said internal surface of said separator vessel second end.

4. The separator of claim 3, further comprising a separator second pressure receiving plate adjacently abuttingly engaging a first side of said separator second piston retaining member guide in which said separator second piston retaining member moves to engage and disengage said separator second piston.

5. The separator of claim 4, further comprising a separator second end plate adjacently abuttingly engaged to a second side of said separator second piston retaining member guide in which said separator second piston retaining member moves to engage and disengage said separator second piston, said separator second end plate having a separator second piston aperture through which said separator second piston moves to sealably engage said internal surface of said separator vessel second end.

6. The separator of claim 5, further comprising separator first and second separator vessel centering guides correspondingly coupled to said separator first and second end plate, said separator first and second extraction vessel centering guides each configured to engage a corresponding portion of the external surface of said separator vessel proximate said separator vessel first and second ends to align said internal surface of said separator vessel first and second ends to correspondingly slidably receive said separator first and second pistons.

7. The separator of claim 6, further comprising a separator first piston actuator connected to said separator first piston, said separator first piston actuator operable to move said separator first piston to sealably engage said internal surface of said separator vessel first end.

8. The separator of claim 7, further comprising a separator second piston actuator connected to said separator second piston, said separator second piston actuator operable to move said separator second piston to sealably engage said internal surface of said separator vessel second end.

9. The separator of claim 8, wherein said separator first piston actuator includes a concentric coaxial conduit communicating between the first and a second bases of the separator first piston, said concentric coaxial conduit defining a concentric inner passage terminating in a separator first piston inlet and an annular concentric outer passage directly or indirectly connected to a separator first piston outlet, said concentric inner passage coveys an amount of extractant to said separator first piston inlet.

10. The separator of claim 9, further comprising an inlet extension conduit removably sealably coupled to said concentric coaxial conduit to extend said concentric inner passage of said concentric coaxial conduit a distance into said separator chamber.

11. The separator of claim 10, wherein said inlet extension conduit having a generally liner configuration disposed centrally along said separator vessel longitudinal axis.

12. The separator of claim 11, wherein said inlet extension conduit including an arcuate winding which winds generally in a flat plane or along the separator longitudinal axis toward the separator vessel second end.

13. The separator of claim 9, wherein said separator second piston actuator includes a tubular actuator shaft connected to a separator second piston outlet port, said tubular actuator shaft adapted to transfer an extract fraction from said separator second piston outlet port.

14. The separator of claim 13, further comprising a separator first retaining member actuator connected to said separator first piston retaining member, said separator first retaining member actuator operable to move said separator first piston retaining member to engage said separator first piston sealably engaged with said internal surface of said separator vessel first end.

15. The separator of claim 14, further comprising a separator second retaining member actuator connected to said separator second piston retaining member, said separator second retaining member actuator operable to move said separator second piston retaining member to engage said separator second piston sealably engaged with said internal surface of said separator vessel second end.

16. The separator of claim 15, further comprising a separator vessel support including a separator vessel rotation element, said separator vessel rotatable about a separator vessel support axis of said separator vessel support to position a longitudinal axis of said separator vessel in a generally horizontal orientation.

17. The separator of claim 16, further comprising a separation vessel linear actuator connected to said separator vessel, said separator vessel linear actuator operable to move said separator vessel to align said internal surface of said separator vessel first and second ends to correspondingly slidably receive said separator first and second pistons.

18. The separator of claim 17, further comprising a separator first connecting member interconnecting said separator first and second pressure receiving plates.

19. The separator of claim 18, further comprising a separator second connecting member interconnecting said separator first and second pressure receiving plate.

20. The separator of claim 19, further comprising a fluid flow generator capable of generating an extractant pressure inside of said separator chamber of between about 500 psi to about 20,000 psi.

21. The separator of claim 20, where said extractant pressure is selected from the group consisting of: about 500 psi to about 1500 psi, 1000 psi to about 2000 psi, about 1500 psi to about 2500 psi, about 2000 psi to about 3000 psi, about 2500 psi to about 3500 psi, about 3000 psi to about 4000 psi, about 3500 psi to about 4500 psi, about 4000 psi to about 5000 psi, about 5500 psi to about 6500 psi, about 6000 psi to about 7000 psi, about 6500 psi to about 7500 psi, about 7000 psi to about 8000 psi, about 7500 psi to about 8500 psi, about 8000 psi to about 9000 psi, about 8500 psi to about 9500 psi, about 9000 psi to about 10,000 psi, about 9500 psi to about 10,500 psi, about 10,000 psi to about 11,000 psi, about 10,500 psi to about 11,500 psi, about 11,000 psi to about 12,000 psi, about 11,500 psi to about 12,500 psi, about 12,000 psi to about 13,000 psi, about 12,500 psi to about 13,500 psi, about 13,000 psi to about 14,000 psi, about 13,500 psi to about 14,500 psi, about 14,000 psi to about 15,000 psi, about 14,500 psi to about 15,500 psi, about 15,000 psi to about 15,500 psi, about 15,500 psi to about 16,500 psi, about 16,000 psi to about 17,000 psi, about 16,500 psi to about 17,500 psi, about 17,000 psi to about 18,000 psi, about 17,500 psi to about 18,500 psi, about 18,000 psi to about 19,000, about 18,500 psi to about 19,500 psi, and about 19,000 psi to about 20,000 psi, or combinations thereof over a period of time.

22. The separator of claim 20, further comprising a separator heat source coupled to said extraction vessel external surface, wherein said separator heat source comprises a jacket coupled to said separator external surface, said jacket defining a jacked flow path through which a fluid flows to regulate temperature of said separator.

23. The separator of claim 22, further comprising a temperature adjustment element coupled to said heat source, said temperature adjustment element allows pre-selection of an extraction vessel temperature of between about 5° C. to about 155° C.

24. The separator of claim 23, wherein said separator vessel temperature is selected from the group consisting of: about 5° C. to about 15° C., about 10° C. to about 20° C., about 15° C. to about 25° C., about 20° C. to about 30° C., about 25° C. to about 35° C., about 30° C. to about 40° C., about 35° C. to about 45° C., about 40° C. to about 50° C., about 55° C. to about 65° C., about 60° C. to about 70° C., about 65° C. to about 75° C., about 70° C. to about 80° C., about 75° C. to about 85° C., about 80° C. to about 90° C., about 85° C. to about 95° C., about 90° C. to about 100° C., about 95° C. to about 105° C., about 100° C. to about 110° C., about 105° C. to about 115° C., about 110° C. to about 120° C., about 115° C. to about 125° C., about 120° C. to about 130° C., about 125° C. to about 135° C., about 130° C. to about 145° C., about 140° C. to about 155° C., or combinations thereof over a period of time.

25. The separator of claim 1, further comprising separator first and second porous end assemblies correspondingly removably sealably fitted proximate the separator vessel first and second ends.

26. The separator of claim 25, where said first porous end assembly comprises an annular sealing element having an outer periphery disposable in sealably fixed relation with said separator vessel internal surface proximate said separator vessel first end and an inner periphery sealably fitted to a first frit.

27. The separator of claim 26, further comprising a selective flow barrier sealably fitted in said first porous end assembly adjacent said frit, said selective flow barrier selectively resists a flow of liquid.

28. The separator of claim 26, where wherein said first porous end assembly further comprises a perforated tubular member having a tubular member side wall disposed between a closed end and an open-end periphery sealably engaged to an annular support member, said perforation tubular member defining an inside space.

29. The separator of claim 28, further comprising a capture material disposed within said inside space of said perforated tubular member.

* * * * *